(12) United States Patent
Kim et al.

(10) Patent No.: US 11,063,516 B1
(45) Date of Patent: Jul. 13, 2021

(54) POWER CONVERTERS WITH BOOTSTRAP

(71) Applicant: FARADAY SEMI, INC., Irvine, CA (US)

(72) Inventors: Seungbeom Kevin Kim, Whittier, CA (US); Jack Walter Cornish, III, Irvine, CA (US); Saurabh Anil Jayawant, Laguna Niguel, CA (US); Parviz Parto, Laguna Niguel, CA (US)

(73) Assignee: Faraday Semi, Inc., Irvine, CA (US)

( * ) Notice: Subject to any disclaimer, the term of this patent is extended or adjusted under 35 U.S.C. 154(b) by 0 days.

(21) Appl. No.: 16/942,602

(22) Filed: Jul. 29, 2020

(51) Int. Cl.
*H02M 3/158* (2006.01)
*H02M 1/08* (2006.01)

(52) U.S. Cl.
CPC ............. *H02M 3/158* (2013.01); *H02M 1/08* (2013.01)

(58) Field of Classification Search
CPC ......... H02M 3/158; H02M 1/08; H02M 3/156
See application file for complete search history.

(56) References Cited

U.S. PATENT DOCUMENTS

| | | |
|---|---|---|
| 3,327,202 A | 6/1967 | Mills |
| 3,329,887 A | 7/1967 | Schaeve |
| 3,474,289 A | 10/1969 | Stone |
| 3,678,937 A | 7/1972 | Cole et al. |
| 3,795,247 A | 3/1974 | Thaler |
| 3,888,260 A | 6/1975 | Fischell |
| 3,978,838 A | 9/1976 | Oister |
| 4,163,968 A | 8/1979 | Davis |
| 4,412,212 A | 10/1983 | Kolegraff et al. |
| 4,471,283 A | 9/1984 | Presley |
| 5,747,976 A | 5/1998 | Wong |
| 5,773,966 A | 6/1998 | Steigerwald |
| 5,949,264 A | 9/1999 | Lo |

(Continued)

FOREIGN PATENT DOCUMENTS

| | | |
|---|---|---|
| CN | 104143547 | 11/2014 |
| CN | 104158392 | 11/2014 |

(Continued)

OTHER PUBLICATIONS

"Bootstrap Circuit in the Buck Converter," ROHM Semiconductor, Switching Regulartor IC Series, in 5 pages.

(Continued)

*Primary Examiner* — Alex Torres-Rivera
(74) *Attorney, Agent, or Firm* — Knobbe, Martens, Olson & Bear, LLP

(57) ABSTRACT

A power converter can include first, second, third, and fourth power switches, and a driver for operating the drive switches to modify an input voltage. An AC coupling capacitor can be coupled between the first and fourth power switches. Bootstrap capacitors can be used for driving the first and second power switches, which can be high-side switches. In some embodiments, a current sensing circuit can be used to measure current through the third and/or fourth power switches and for determining the current through the power converter. In some embodiments, the power converter can monitor the voltage across the AC coupling capacitor and can determine the current through the power converter based on the monitored voltages. In some embodiments, the AC coupling capacitor can be pre-charged before the power converter begins normal operation.

27 Claims, 21 Drawing Sheets

(56) References Cited

U.S. PATENT DOCUMENTS

| | | |
|---|---|---|
| 6,278,264 B1 | 8/2001 | Burstein et al. |
| 6,342,822 B1 | 1/2002 | So |
| 6,366,070 B1 | 4/2002 | Cooke et al. |
| 6,377,032 B1 | 4/2002 | Andruzzi et al. |
| 6,381,159 B2 | 4/2002 | Oknaian et al. |
| 6,445,233 B1 | 9/2002 | Pinai et al. |
| 6,583,610 B2 | 6/2003 | Groom |
| 6,642,698 B2 | 11/2003 | Pohlman |
| 6,713,995 B2 | 3/2004 | Chen |
| 6,737,843 B2 | 5/2004 | Kanakubo et al. |
| 6,815,936 B2 | 11/2004 | Wiktor et al. |
| RE38,940 E | 1/2006 | Isham et al. |
| 7,002,328 B2 | 2/2006 | Kernahan et al. |
| 7,019,504 B2 | 3/2006 | Pullen et al. |
| 7,026,795 B2 | 4/2006 | So |
| 7,045,992 B1 | 5/2006 | Silva et al. |
| 7,057,380 B2 | 6/2006 | Kuo et al. |
| 7,058,373 B2 | 6/2006 | Grigore |
| 7,102,340 B1 | 9/2006 | Ferguson |
| 7,135,841 B1 | 11/2006 | Tomiyoshi et al. |
| 7,148,442 B2 | 12/2006 | Murai et al. |
| 7,157,889 B1 | 1/2007 | Kernahan |
| 7,173,403 B1 | 2/2007 | Chen et al. |
| 7,180,757 B2 | 2/2007 | Chen et al. |
| 7,196,503 B2 | 3/2007 | Wood et al. |
| 7,205,821 B2 | 4/2007 | Rutter |
| 7,230,405 B2 | 6/2007 | Jang et al. |
| 7,288,924 B2 | 10/2007 | Trandafir et al. |
| 7,298,122 B2 | 11/2007 | Bernacchia et al. |
| 7,342,385 B2 | 3/2008 | Capodivacca et al. |
| 7,372,241 B1 | 5/2008 | Tomiyoshi |
| 7,391,190 B1 | 6/2008 | Rajagopaian |
| 7,436,233 B2 | 10/2008 | Yee et al. |
| 7,439,721 B2 | 10/2008 | Weng et al. |
| 7,446,513 B2 | 11/2008 | Dikken et al. |
| 7,474,086 B2 | 1/2009 | Chen et al. |
| 7,482,791 B2 | 1/2009 | Stoichita et al. |
| 7,482,795 B2 | 1/2009 | Parto et al. |
| 7,508,181 B2 | 3/2009 | Chen et al. |
| 7,554,310 B2 | 6/2009 | Chapuis et al. |
| 7,567,067 B2 | 7/2009 | Lee et al. |
| 7,595,624 B2 | 9/2009 | Tateishi et al. |
| 7,638,987 B2 | 12/2009 | Sugiyama |
| 7,649,346 B2 | 1/2010 | Sohma |
| 7,710,084 B1 | 5/2010 | Guo |
| 7,714,547 B2 | 5/2010 | Fogg et al. |
| 7,764,057 B2 | 7/2010 | Groom |
| 7,777,587 B2 | 8/2010 | Stevenson et al. |
| 7,778,064 B2 | 8/2010 | Parkinson et al. |
| 7,834,606 B2 | 11/2010 | Liu et al. |
| 7,859,324 B2 | 12/2010 | Yamashita et al. |
| 7,868,599 B2 | 1/2011 | Rahman et al. |
| 7,902,803 B2 | 3/2011 | Peng et al. |
| 7,906,942 B2 | 3/2011 | Sugahara et al. |
| 7,919,952 B1 | 4/2011 | Fahrenbruch |
| 7,936,160 B1 | 5/2011 | Sheehan |
| 7,944,153 B2 | 5/2011 | Greenfeld et al. |
| 7,986,135 B2 | 7/2011 | Kenly et al. |
| 8,004,070 B1 | 8/2011 | Chen |
| 8,022,746 B1 * | 9/2011 | Signoretti .......... H03K 17/6871 327/423 |
| 8,040,121 B2 | 10/2011 | Ishida et al. |
| 8,054,639 B2 | 11/2011 | Hsu |
| 8,093,878 B2 | 1/2012 | Katsuya et al. |
| 8,120,345 B2 | 2/2012 | Akiyama et al. |
| 8,148,815 B2 | 4/2012 | Girdhar et al. |
| 8,154,268 B2 | 4/2012 | Philbrick et al. |
| 8,164,320 B2 | 4/2012 | Latham et al. |
| RE43,414 E | 5/2012 | Walters et al. |
| 8,198,880 B2 | 6/2012 | Ouyang |
| 8,248,046 B2 | 8/2012 | Hasegawa |
| 8,253,398 B2 | 8/2012 | Nakamura et al. |
| 8,278,898 B2 | 10/2012 | Davoudi et al. |
| 8,283,905 B2 | 10/2012 | Chang et al. |
| 8,330,435 B2 | 12/2012 | Qiu et al. |
| 8,344,709 B2 | 1/2013 | Zhang et al. |
| 8,400,129 B2 | 3/2013 | Ouyang |
| 8,410,765 B2 | 4/2013 | Hung et al. |
| 8,427,853 B2 | 4/2013 | Uno |
| 8,441,235 B2 | 5/2013 | Shi et al. |
| 8,446,135 B2 | 5/2013 | Chen et al. |
| 8,450,989 B2 | 5/2013 | Wiktor et al. |
| 8,476,882 B2 | 7/2013 | Luo et al. |
| 8,487,599 B2 | 7/2013 | Lee et al. |
| 8,508,206 B2 | 8/2013 | Wan et al. |
| 8,524,532 B1 | 9/2013 | Joshi |
| 8,570,020 B2 | 10/2013 | Tang et al. |
| 8,575,911 B2 | 11/2013 | Cheng et al. |
| 8,582,333 B2 | 11/2013 | Oraw et al. |
| 8,618,779 B2 | 12/2013 | Garrett et al. |
| 8,629,666 B2 | 1/2014 | Carroll et al. |
| 8,659,282 B2 | 2/2014 | Chen |
| 8,676,525 B2 | 3/2014 | Holmberg et al. |
| 8,679,896 B2 | 3/2014 | Joshi et al. |
| 8,698,475 B2 | 4/2014 | Dong et al. |
| 8,717,002 B2 | 5/2014 | Xi |
| 8,749,216 B2 | 6/2014 | Li et al. |
| 8,773,090 B2 | 7/2014 | Ouyang et al. |
| 8,786,267 B2 | 7/2014 | Lu et al. |
| 8,803,495 B2 | 8/2014 | Nguyen et al. |
| 8,810,294 B2 | 8/2014 | Lynch et al. |
| 8,860,387 B2 | 10/2014 | Kobayashi |
| 8,860,396 B2 | 10/2014 | Giuliano |
| 8,890,501 B2 | 11/2014 | Evans et al. |
| 8,901,911 B2 | 12/2014 | Wen et al. |
| 8,912,773 B2 | 12/2014 | Parto et al. |
| 8,941,367 B2 | 1/2015 | Li et al. |
| 8,957,653 B2 | 2/2015 | Yang et al. |
| 8,975,885 B2 | 3/2015 | Philbrick et al. |
| 8,994,346 B2 | 3/2015 | Rahardjo et al. |
| 9,030,177 B2 | 5/2015 | Nakashima |
| 9,035,624 B1 | 5/2015 | Rahimi et al. |
| 9,058,043 B2 | 6/2015 | Lin et al. |
| 9,065,337 B2 | 6/2015 | Tanabe et al. |
| 9,071,125 B2 | 6/2015 | Michishita |
| 9,077,260 B2 | 7/2015 | Zhao et al. |
| 9,088,202 B2 | 7/2015 | Mizutani et al. |
| 9,110,489 B2 | 8/2015 | Svorc |
| 9,190,383 B2 | 11/2015 | Cho et al. |
| 9,214,415 B2 | 12/2015 | Denison et al. |
| 9,231,471 B2 | 1/2016 | Cuk |
| 9,252,661 B2 | 2/2016 | Grbo et al. |
| 9,337,735 B2 | 5/2016 | Odaohhara |
| 9,389,625 B2 | 7/2016 | Hu et al. |
| 9,406,674 B2 | 8/2016 | Briere |
| 9,437,570 B2 | 9/2016 | Cho et al. |
| 9,502,980 B2 | 11/2016 | Rahimi et al. |
| 9,563,263 B2 | 2/2017 | Maiyuran et al. |
| 9,575,096 B2 | 2/2017 | Wang et al. |
| 9,577,522 B2 | 2/2017 | Jayawant et al. |
| 9,584,006 B2 | 2/2017 | McDonald et al. |
| 9,588,532 B2 | 3/2017 | Rahimi et al. |
| 9,653,996 B2 | 5/2017 | Parto et al. |
| 9,711,279 B2 | 7/2017 | Dodorov et al. |
| 9,729,059 B1 | 8/2017 | Parto |
| 9,767,947 B1 | 9/2017 | Ikriannikov |
| 10,193,442 B2 | 1/2019 | Parto |
| 10,234,930 B2 | 3/2019 | Lee et al. |
| 10,504,848 B1 | 12/2019 | Parto |
| 2005/0245001 A1 | 11/2005 | Hyvonen et al. |
| 2005/0280404 A1 | 12/2005 | LeFevre et al. |
| 2005/0286269 A1 | 12/2005 | Groom |
| 2006/0220629 A1 | 10/2006 | Saito et al. |
| 2008/0067666 A1 | 3/2008 | Hsu |
| 2008/0273314 A1 | 11/2008 | Cho et al. |
| 2009/0108908 A1 * | 4/2009 | Yamadaya .......... H02M 3/1588 327/390 |
| 2010/0001699 A1 | 1/2010 | Dragojevic |
| 2010/0033261 A1 | 2/2010 | Stevenson et al. |
| 2010/0134985 A1 | 6/2010 | Hsu |
| 2011/0058285 A1 | 3/2011 | Wibben |
| 2011/0227546 A1 | 9/2011 | Nishijima et al. |
| 2012/0049826 A1 | 3/2012 | Hsu et al. |
| 2012/0187928 A1 | 7/2012 | Parto et al. |

(56) References Cited

U.S. PATENT DOCUMENTS

| | | |
|---|---|---|
| 2012/0274296 A1 | 11/2012 | Higuchi |
| 2012/0302012 A1 | 11/2012 | Zeng |
| 2013/0074907 A1 | 3/2013 | Saunders |
| 2013/0249508 A1 | 9/2013 | Rahimi et al. |
| 2014/0084884 A1 | 3/2014 | Lee |
| 2014/0159689 A1 | 6/2014 | Chen |
| 2015/0062989 A1 | 3/2015 | Su |
| 2015/0077074 A1 | 3/2015 | Rahimi et al. |
| 2015/0115911 A1 | 4/2015 | Parto et al. |
| 2015/0116972 A1 | 4/2015 | Dodorov et al. |
| 2015/0162297 A1 | 6/2015 | Cho et al. |
| 2015/0180355 A1 | 6/2015 | Freeman et al. |
| 2015/0311792 A1* | 10/2015 | Amaro ................ H02M 3/1588 323/271 |
| 2015/0311797 A1* | 10/2015 | Okamatsu ............ H02M 3/1582 323/271 |
| 2016/0118325 A1 | 4/2016 | Wang et al. |
| 2016/0218559 A1 | 7/2016 | Mehas et al. |
| 2016/0261182 A1 | 9/2016 | Jayawant et al. |
| 2017/0231094 A1 | 8/2017 | Blackshear et al. |
| 2017/0331371 A1* | 11/2017 | Parto ........................ G05F 1/46 |
| 2018/0183330 A1* | 6/2018 | Assaad ................ H02M 3/158 |
| 2018/0204665 A1 | 7/2018 | Peng et al. |
| 2019/0229618 A1 | 7/2019 | Parto |
| 2019/0379272 A1* | 12/2019 | Carpenter ............. H02M 1/088 |
| 2020/0335446 A1 | 10/2020 | Standing |
| 2020/0350255 A1 | 11/2020 | Parto |
| 2021/0050779 A1* | 2/2021 | Deng ................... H02M 3/073 |

FOREIGN PATENT DOCUMENTS

| | | |
|---|---|---|
| CN | 110383661 A | 10/2019 |
| JP | 2006-223088 | 8/2006 |
| JP | 2008-235773 | 10/2008 |
| JP | 4427667 | 3/2010 |
| JP | 5433880 | 3/2014 |
| JP | 5474488 | 4/2014 |
| WO | WO 2008/013871 | 1/2008 |
| WO | WO 2010/139358 | 12/2010 |
| WO | WO 2018/148218 | 8/2018 |

OTHER PUBLICATIONS

Bryson: "Using auto-zero comparator techniques to improve PWM performance (Part 1 of 2), Jun. 23, 2008." www.eetimes.com.
Bryson: "Using auto-zero comparator techniques to improve PWM performance (Part 2 of 2), Jun. 23, 2008." www.eetimes.com.
Burton, Intel Corp. APEC 2015, Package and Platform View of Inters Fully Integrated Voltage Regulators (FIVR) (23 pgs).
Enhancement-Mode Gallium Nitride Technology, Efficient Power Conversion, product brief, 2016.
Intel, Dual Intel, Xeon, Processor Voltage Regulator Down (VRD) Design Guidelines, Jul. 2003, 22 pages.
Intel, Voltage Regulator-Down (VRD) 11.0, Processor Power Delivery Design Guidelines for Desktop LGA775 Socket, Nov. 2006 (88 pgs).
Jun. 8, 2018 Int'l Search Report & Written Opinion from PCT/US2018/017109 (16 pgs).
Aug. 13, 2019, International Preliminary Report on Patentability from PCT/US2018/017109 (13 pgs).
Nakanishi, "A two-stage converter with a coupled-inductor," Power Elec & Drive Sys, PEDS (2007) 7th Int'l conf of IEEE, pp. 653-657.
TPS54A20 8-V to 14-V Input, 10-A, up to 10-MHz SWIFT™ Step Down Converter, Texas Instruments, data sheet, Apr. 2016.
TPS8268x 1600-mA High Efficiency MicroSIP™ Step-Down Converter Module, Texas Instruments, data sheet, Oct. 2014.
Sep. 15, 2020, International Search Report and Written Opinion from PCT/US2020/028585 (12 pgs.).

* cited by examiner

POWER CONVERTERS WITH BOOTSTRAP

BACKGROUND OF THE INVENTION

Field of the Invention

This disclosure relates to electronic systems and power converters, such as direct current to direct current (DC-DC) buck converters.

Description of the Related Art

Although various power converters are known, there exists a need for improved power converters.

SUMMARY OF THE INVENTION

Certain example embodiments are summarized below for illustrative purposes. The embodiments are not limited to the specific implementations recited herein. Embodiments may include several novel features, no single one of which is solely responsible for its desirable attributes or which is essential to the embodiments.

Various embodiments disclosed herein can relate to a power converter, which can include an input configured to receive an input voltage, an output configured to output an output voltage that is different than the input voltage, a first inductor, and a second inductor. A first power switch can be a high-side switch, and a second power switch can be a high-side switch. The power converter can include a third power switch and a fourth power switch. The second power switch and the third power switch can be configured to control current through the second inductor. The first power switch and the fourth power switch can be configured to control current through the first inductor. A driver can be configured to operate the first, second, third, and fourth power switches to change the input voltage to provide the output voltage. A first bootstrap capacitor can be coupled to the first power switch. The first bootstrap capacitor can charge during a state when the first power switch is off. The first bootstrap capacitor can discharge during a state when the first power switch is on to provide an elevated voltage to maintain the first power switch on. A second bootstrap capacitor can be coupled to the second power switch. The second bootstrap capacitor can charge during a state when the second power switch is off. The second bootstrap capacitor can discharge during a state when the second power switch is on to provide an elevated voltage to maintain the second power switch on.

The power converter can include one or more switches that have a first configuration that couples the first bootstrap capacitor to ground so that the first bootstrap capacitor charges, and a second configuration that couples the first bootstrap capacitor to the first power switch so that the first bootstrap capacitor discharges to maintain the first power switch on. The power converter can include a first switch electrically coupled between the first bootstrap capacitor and ground. The power converter can include a second switch electrically coupled between a voltage source and the first bootstrap capacitor. The power converter can include a third switch electrically coupled between the first bootstrap capacitor and the source of the first power switch. The first switch and the second switch can be on while the third switch is off in a first configuration so that the first bootstrap capacitor is coupled between the voltage source and ground so that the first bootstrap capacitor charges. The first switch and the second switch can be off while the third switch is on in a second configuration so that the first bootstrap capacitor discharges to provide an elevated voltage to keep the first power switch on.

The power converter can include a first switch electrically coupled between the first bootstrap capacitor and ground, and a second switch electrically coupled to the first bootstrap capacitor. The first switch can be on while the second switch is off in a first configuration so that the first bootstrap capacitor is coupled between a voltage source and ground so that the first bootstrap capacitor charges. The first switch can be off while the second switch is on in a second configuration so that the first bootstrap capacitor provides an elevated voltage to keep the first power switch on. The power converter can include a diode between the voltage source and the first bootstrap capacitor. The diode can be configured to permit current to flow from the voltage source to the first bootstrap capacitor and to impede current from the first bootstrap capacitor to the voltage source.

The first bootstrap capacitor and the second bootstrap capacitor can be coupled so that the second bootstrap capacitor charges the first bootstrap capacitor in the state when the second power switch is on. The second bootstrap capacitor can have more capacitance than the first bootstrap capacitor. The first bootstrap capacitor can be electrically coupled to a source of the first power switch all the time.

The first bootstrap capacitor and the second bootstrap capacitor can be integrated into the same integrated circuit as the first power switch, the second power switch, the third power switch, the fourth power switch, and the driver. The first bootstrap capacitor can be integrated into the same integrated circuit as the first power switch and the driver. The driver can include an input for receiving a first drive signal that corresponds to the state when the first power switch is off, and a second drive signal that corresponds to the state when the first power switch is on, an output coupled to the first power switch, a high voltage supply, and a low voltage supply. The first bootstrap capacitor can be coupled between the high voltage supply and the low voltage supply. A pull-up switch can be coupled between the high voltage supply and the output. A pull-down switch can be coupled between the low voltage supply and the output. A pull-up drive signal generator can be configured to produce a pull-up signal pulse to turn on the pull-up switch in response to a transition from the first drive signal to the second drive signal, to thereby turn on the first power switch and charge up an internal capacitance of the first power switch to the elevated voltage provided by the first bootstrap capacitor. The pull-up drive signal generator can be configured to end the pull-up signal pulse and turn off the pull-up switch while the first drive signal is still being applied. The internal capacitance of the first power switch can keep the first power switch on until a transition from the second drive signal to the first drive signal. A pull-down drive signal generator can be configured to produce a pull-down signal pulse to turn on the pull-down switch in response to the transition from the second drive signal to the first drive signal, to thereby discharge the internal capacitance of the first power switch and turn off the first power switch. The integrated circuit can include a driver controller for producing the first driver signal and the second drive signal. The first drive signal can be a low signal and the second drive signal can be a high signal. The pull-up drive signal generator can be configured to produce the pull-up signal pulse in response to a rising edge transition from the low signal to the high signal. The pull-down drive signal generator can be configured to produce the pull-down signal pulse in response to the falling edge transition from the high signal to the low signal. The power converter can include a first amplifier between the pull-up drive signal generator and the pull-up switch. The first amplifier can be configured to amplify the pull-up signal pulse to turn on the pull-up switch. The power converter can include a second amplifier between the pull-down drive signal generator and the pull-down switch. The second amplifier can be configured to amplify the pull-down signal pulse to turn on the pull-down switch.

The driver can include a second input for receiving a third drive signal that corresponds to the state when the second power switch is off, and a fourth drive signal that corresponds to the state when the second power switch is on. The driver can include a second output that is coupled to the second power switch, a second high voltage supply, and a second low voltage supply. The second bootstrap capacitor can be coupled between the second high voltage supply and the second low voltage supply. A second pull-up switch can be coupled between the second high voltage supply and the second output. A second pull-down switch can be coupled between the second low voltage supply and the second output. A second pull-up drive signal generator can be configured to produce a second pull-up signal pulse to turn on the second pull-up switch in response to a transition from the third drive signal to the fourth drive signal, to thereby turn on the second power switch and charge up an internal capacitance of the second power switch to the elevated voltage provided by the second bootstrap capacitor. The second pull-up drive signal generator can be configured to end the second pull-up signal pulse and turn off the second pull-up switch while the third drive signal is still being applied. The internal capacitance of the second power switch can keep the second power switch on until a transition from the third drive signal to the fourth drive signal. A second pull-down drive signal generator can be configured to produce a second pull-down signal pulse to turn on the second pull-down switch in response to the transition from the fourth drive signal to the third drive signal, to thereby discharge the internal capacitance of the second power switch and turn off the second power switch. The second pull-down signal pulse can be longer than the first pull-down signal pulse.

The first power switch and the second power switch can be N-channel FETs. The power converter can be a buck converter configured so that the output voltage at the output is lower than the input voltage at the input. The driver can be configured to provide various states of operation. In a first state of operation the first power switch is on, the second power switch is off, the third power switch is on, and the fourth power switch is off. In a second state of operation the first power switch is off, the second power switch is off, the third power switch is on, and the fourth power switch is on. In a third state of operation the first power switch is off, the second power switch is on, the third power switch is off, and the fourth power switch is on. In a fourth state of operation, the first power switch is off, the second power switch is off, the third power switch is on, and the fourth power switch is on. The power converter can include an AC coupling capacitor that is coupled between the first power switch and the first inductor.

The power converter can include a printed circuit board (PCB) comprising a lower printed circuit board (PCB) part and an upper printed circuit board (PCB) part. Embedded circuitry can be between the lower PCB part and the upper PCB part. The embedded circuitry can include the first power switch, the second power switch, the third power switch, the fourth power switch, and/or the driver. The first inductor and the second inductor can be positioned over the upper PCB part. Vias can electrically couple the first inductor and the second inductor to the embedded circuitry. A footprint of the first inductor can at least partially overlap a footprint of the embedded circuitry. A footprint of the second inductor can at least partially overlap a footprint of the embedded circuitry. The embedded circuitry can include the first bootstrap capacitor and the second bootstrap capacitor.

The power converter can include a current sensing circuit for measuring a current through the fourth power switch. The power converter can include current sensing processing circuitry, which can be configured to determine a current through the power converter based at least in part on the measured current through the fourth power switch. The power converter can include a communication interface for outputting information regarding the determined current. The current sensing circuit can include a sensing switch in parallel with the fourth power switch. The sensing switch can be configured to be on when the second power switch and the fourth power switch are on. The sensing switch can be configured to be off when the either of the second power switch and the fourth power switch is off. The current sensing circuit can include a current mirror. The current sensing circuit can be configured to produce a voltage signal that is indicative of the current through the fourth power switch. The current sensing processing circuitry can be configured to apply a gain to increase the voltage signal. The current sensing processing circuitry can be configured to invert the voltage signal.

The power converter can include a first current sensing circuit for measuring a current through the third power switch and a second current sensing circuit for measuring a current through the fourth power switch. Current sensing processing circuitry can be configured to determine a power converter current based at least in part on the measured current through the third power switch and the measured current through the fourth power switch. A communication interface can output information regarding the determined power converter current. The first current sensing circuit can include a first sensing switch in parallel with the third power switch. The first sensing switch can be configured to be on when the third power switch and the fourth power switch are on. The first sensing switch can be configured to be off when the either of the third power switch and the fourth power switch is off. The second current sensing circuit can include a second sensing switch in parallel with the fourth power switch. The second sensing switch can be configured to be on when the third power switch and the fourth power switch are on. The second sensing switch can be configured to be off when the either of the third power switch and the fourth power switch is off. The first current sensing circuit can include a first current mirror. The second current sensing circuit can include a second current mirror. The first current sensing circuit can be configured to produce a first voltage signal that is indicative of the current through the third power switch. The second current sensing circuit can be configured to produce a second voltage signal that is indicative of the current through the fourth power switch. The current sensing processing circuitry can be configured to apply a gain to increase the first voltage signal and the second voltage signal. The current sensing processing circuitry can be configured to invert the first voltage signal and to invert the second voltage signal.

The power converter can include a capacitor that is coupled between the first power switch and the first inductor. Current sensing processing circuitry can be coupled to the capacitor and configured to monitor a voltage across the capacitor, and to determine a power converter current based at least in part on the monitored voltage across the capacitor. A communication interface can output information regarding the determined power converter current. The current sensing processing circuitry can identify a highest voltage across the capacitor and a lowest voltage across the capacitor during a switching cycle. The current sensing processing circuitry can determine the power converter current based as least in part on a difference between the highest voltage and the lowest voltage. The power converter can be configured to measure a first voltage across the capacitor at a first time, measure a second voltage across the capacitor at a second time, determine (e.g., using the current sensing processing circuitry) the power converter current based at least in part on a voltage difference between the first voltage and the second voltage and a time difference between the first time and the second time.

The power converter can include a capacitor that is coupled between the first power switch and the fourth power switch. A pre-charge circuit can be configured to charge the capacitor before the driver operates the first, second, third, and fourth power switches to change the input voltage to provide the output voltage. The pre-charge circuit can include a switch electrically coupled between the input and the capacitor and voltage monitoring circuitry for monitoring a voltage of the capacitor. The switch can be on when the monitored voltage is below a threshold, and the switch can turn off when the monitored voltage is above the threshold.

Various embodiments disclosed herein can relate to a power converter, which can include an input configured to receive an input voltage, an output configured to output an output voltage that is different than the input voltage, a first inductor, and a second inductor. The power converter can include a first power switch, a second power switch, a third power switch, and a fourth power switch. The first, second, third, and fourth power switches can be configured to control current through the first inductor and the second inductor. A driver can be configured to operate the first, second, third, and fourth power switches to change the input voltage to provide the output voltage.

The power converter can include a current sensing circuit for measuring a current through the fourth power switch, and current sensing processing circuitry configured to determine a power converter current based at least in part on the measured current through the fourth power switch. The power converter can include a communication interface for outputting information regarding the determined power converter current. The current sensing circuit can include a sensing switch in parallel with the fourth power switch. The sensing switch can be configured to be on when the second power switch and the fourth power switch are on. The sensing switch can be configured to be off when the either of the second power switch and the fourth power switch is off. The current sensing circuit can include a current mirror. The current sensing circuit can be configured to produce a voltage signal that is indicative of the current through the fourth power switch. The current sensing processing circuitry can be configured to apply a gain to increase the voltage signal. The current sensing processing circuitry can be configured to invert the voltage signal.

The power converter can include another current sensing circuit for measuring a current through the third power switch. The current sensing processing circuitry can be configured to determine the power converter current based at least in part on the measured current through the third power switch and the measured current through the fourth power switch. The current sensing circuit for the third power switch can include a first sensing switch in parallel with the third power switch. The first sensing switch can be configured to be on when the third power switch and the fourth power switch are on. The first sensing switch can be configured to be off when the either of the third power switch and the fourth power switch is off. The current sensing circuit for the fourth power switch can include a second sensing switch in parallel with the fourth power switch. The second sensing switch can be configured to be on when the third power switch and the fourth power switch are on. The second sensing switch can be configured to be off when the either of the third power switch and the fourth power switch is off. The current sensing circuit for the third power switch can include a first current mirror. The current sensing circuit for the fourth power switch can include a second current mirror. The current sensing circuit for the third power switch can be configured to produce a first voltage signal that is indicative of the current through the third power switch. The current sensing circuit for the fourth power switch can be configured to produce a second voltage signal that is indicative of the current through the fourth power switch. The current sensing processing circuitry can be configured to apply a gain to increase the first voltage signal and the second voltages signal. The current sensing processing circuitry can be configured to invert the first voltage signal and to invert the second voltage signal.

Various embodiments disclosed herein can relate to a power converter that includes an input configured to receive an input voltage, an output configured to output an output voltage that is different than the input voltage, a first inductor, a second inductor, a first power switch, a second power switch, a third power switch, and a fourth power switch. The first, second, third, and fourth power switches can be configured to control current through the first inductor and the second inductor. A driver can be configured to operate the first, second, third, and fourth power switches to change the input voltage to provide the output voltage. A capacitor that can be coupled between the first power switch and the first inductor. Current sensing processing circuitry can be coupled to the capacitor and configured to monitor a voltage across the capacitor, and to determine a power converter current based at least in part on the monitored voltage across the capacitor. A communication interface can output information regarding the determined power converter current.

The current sensing processing circuitry can identify a high voltage across the capacitor and a low voltage across the capacitor during a switching cycle. The current sensing processing circuitry can be configured to determine the power converter current based as least in part on a difference between the high voltage and the low voltage. The power converter of claim 54, configured to measure a first voltage across the capacitor at a first time, measure a second voltage across the capacitor at a second time, and determine, using the current sensing processing circuitry, the power converter current based at least in part on a voltage difference between the first voltage and the second voltage and a time difference between the first time and the second time.

Various embodiments disclosed herein can relate to a power converter, which can include an input configured to receive an input voltage, an output configured to output an output voltage that is different than the input voltage, a first inductor, a second inductor, a first power switch, a second power switch, a third power switch, and a fourth power switch. The first, second, third, and fourth power switches can be configured to control current through the first inductor and the second inductor. A driver can be configured to operate the first, second, third, and fourth power switches to change the input voltage to provide the output voltage. A capacitor can be coupled between the first power switch and the fourth power switch. A pre-charge circuit can be configured to charge the capacitor before the driver operates the first, second, third, and fourth power switches to change the input voltage to provide the output voltage.

The pre-charge circuit can include a switch electrically coupled between the input and the capacitor, and voltage monitoring circuitry for monitoring a voltage of the capacitor, wherein the switch is on when the monitored voltage is below a threshold, and wherein the switch turns off when the monitored voltage is above the threshold.

Various embodiments disclosed herein can relate to a power converter, which can include an input configured to receive an input voltage, an output configured to output an output voltage that is different than the input voltage, a first inductor, a second inductor, a first power switch, a second power switch, a third power switch, and a fourth power switch. The first, second, third, and fourth power switches can be configured to control current through the first inductor and the second inductor. A driver configured to operate the first, second, third, and fourth power switches to change the input voltage to provide the output voltage. A capacitor can be coupled between the first power switch and the first inductor. A bootstrap capacitor can be coupled to the first power switch. The bootstrap capacitor can charge during a state when the first power switch is off. The bootstrap capacitor discharges during a state when the first power switch is on to provide an elevated voltage to maintain the first power switch on.

The power converter can include another bootstrap capacitor coupled to the second power switch. Therein the other bootstrap capacitor can charge during a state when the second power switch is off. The other bootstrap capacitor can discharge during a state when the second power switch is on (e.g., to provide an elevated voltage to maintain the second power switch on). The bootstrap capacitor for the second power switch can be configured to charge the bootstrap capacitor for the first power switch. The first power switch and the bootstrap capacitor can be integrated into the same integrated circuit. The power converter can include a switch electrically coupled between the bootstrap capacitor and ground. The switch can have an on state for charging the bootstrap capacitor, and an off state that enables the bootstrap capacitor to discharge and produce the elevated voltage to keep the first power switch on.

Various embodiments disclosed herein can relate to a power converter, which can include an input configured to receive an input voltage, an output configured to output an output voltage that is different than the input voltage, a first inductor, and a second inductor. The power converter can have an integrated circuit that includes a first power switch, a second power switch, a third power switch, and a fourth power switch. The first, second, third, and fourth power switches can be configured to control current through the first inductor and the second inductor. A driver can be configured to operate the first, second, third, and fourth power switches to change the input voltage to provide the output voltage. The power converter can include a bootstrap capacitor.

The bootstrap capacitor can be coupled to the first power switch. The bootstrap capacitor can charge during a state when the first power switch is off. The bootstrap capacitor can discharge during a state when the first power switch is on to provide an elevated voltage. The bootstrap capacitor can be configured to provide the elevated voltage to charge up an internal capacitance of the first power switch, so that internal capacitance of the first power switch keeps the first power switch on after the bootstrap capacitor is disconnected from the first power switch. The driver can include an input for receiving a first drive signal that corresponds to the state when the first power switch is off, and a second drive signal that corresponds to the state when the first power switch is on. The driver can include an output coupled to the first power switch, a high voltage supply, and a low voltage supply. The first bootstrap capacitor can be coupled between the high voltage supply and the low voltage supply. A pull-up switch can be coupled between the high voltage supply and the output. A pull-down switch can be coupled between the low voltage supply and the output. A pull-up drive signal generator can be configured to produce a pull-up signal pulse to turn on the pull-up switch in response to a transition from the first drive signal to the second drive signal (e.g., to thereby turn on the first power switch and charge up an internal capacitance of the first power switch to the elevated voltage provided by the first bootstrap capacitor). The pull-up drive signal generator can be configured to end the pull-up signal pulse and turn off the pull-up switch while the first drive signal is still being applied. The internal capacitance of the first power switch can keep the first power switch on until a transition from the second drive signal to the first drive signal. A pull-down drive signal generator can be configured to produce a pull-down signal pulse to turn on the pull-down switch in response to the transition from the second drive signal to the first drive signal (e.g., to thereby discharge the internal capacitance of the first power switch and turn off the first power switch). The integrated circuit can include a first bootstrap capacitor for the first power switch and a second bootstrap capacitor for the second power switch.

Various method disclosed herein can relate to a method of operating a power converter. The method can include receiving an input voltage at an input, turning on a first power switch to provide an electrical path from the input, through an AC coupling capacitor, through an inductor, to an output. The method can include increasing a voltage signal using a first bootstrap capacitor to produce a first elevated voltage, and delivering the first elevated voltage to the first power switch to keep the first power switch on.

The method can include turning off the first power switch and turning on another switch to provide an electrical path from a voltage source, through the first bootstrap capacitor, to ground, so that the first bootstrap capacitor recharges. The method can include turning on a second power switch to provide an electrical path from the AC coupling capacitor, through another inductor, to the output. The method can include increasing a voltage signal using a second bootstrap capacitor to produce a second elevated voltage, and delivering the second elevated voltage to the second power switch to keep the second power switch on. The method can include delivering the second elevated voltage to the first bootstrap capacitor to recharge the first bootstrap capacitor. The method can include charging an internal capacitance of the first power switch using the elevated voltage from the first bootstrap capacitor, and disconnecting the first elevated voltage from the first power switch. The internal capacitance of the first power switch can keep the first power switch on. The method can include discharging the internal capacitance of the first power switch in response to a drive signal to turn off the first power switch. The first bootstrap capacitor and the first power switch can be parts of the same integrated circuit.

Various embodiments disclosed herein can relate to a DC-DC buck converter, which can include an input configured to receive an input voltage, an output configured to output an output voltage that is lower than the input voltage, a first inductor, a second inductor, a first power switch, a second power switch, a third power switch, a fourth power switch, and a driver configured to send drive signals to the power switches to operate the buck converter in multiple states of operation. In a first state of operation that drives current through the first inductor, the first power switch is on, the second power switch is off, the third power switch is on, and the fourth power switch is off. In a second state of operation the first power switch is off, the second power switch is off, the third power switch is on, and the fourth power switch is on. In a third state of operation, which drives current through the second inductor, the first power switch is off, the second power switch is on, the third power switch is off, and the fourth power switch is on. In a fourth state of operation the first power switch is off, the second power switch is off, the third power switch is on, and the fourth power switch is on.

A first bootstrap capacitor can be configured to provide an elevated voltage for keeping the first power switch on during the first state of operation. The first bootstrap capacitor can discharge during the first state of operation to provide the elevated voltage. The first bootstrap capacitor can recharge during one or more of the second, third, and fourth states of operation. A second bootstrap capacitor can be configured to provide an elevated voltage for keeping the second power switch on during the third state of operation. The second bootstrap capacitor can discharge during the third state of operation to provide the elevated voltage. The second bootstrap capacitor can recharge during one or more of the first, second, and fourth states of operation. The second bootstrap capacitor can be configured to recharge the first bootstrap capacitor. The first bootstrap capacitor can be integrated into the same integrated circuit with the first power switch.

BRIEF DESCRIPTION OF THE DRAWINGS

Certain embodiments will be discussed in detail with reference to the following figures, wherein like reference numerals refer to similar features throughout. These figures are provided for illustrative purposes and the embodiments are not limited to the specific implementations illustrated in the figures.

DETAILED DESCRIPTION OF THE PREFERRED EMBODIMENT

AC Coupled Power Converters

Figure 1:
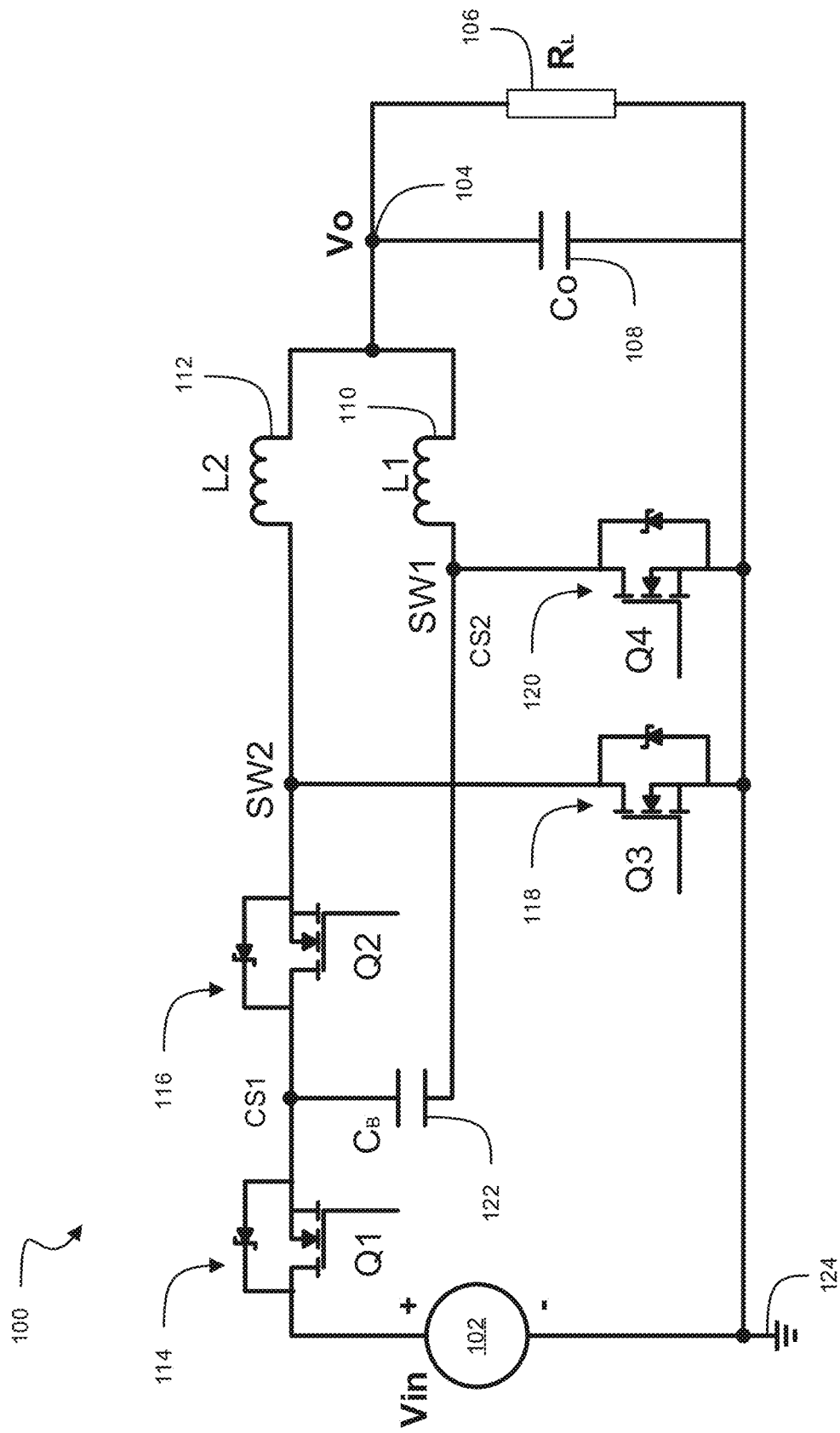
FIG. 1 shows an example embodiment of a power converter.

FIG. 1 shows a schematic diagram of an example embodiment of a power converter 100. The power converter 100 can be a direct current to direct current (DC-DC) power converter, such as a buck converter. The power converter 100 can be used as a point-of-load converter that receives power from a power supply of an electronic device and supplies a particular voltage to a component of the electronic device. The power converter 100 can include an input 102, which can receive an input voltage $V_{in}$. The input voltage $V_{in}$ can be received from a power supply of an electronic device, a battery, an external power source, etc. The input 102 can receive a direct current DC voltage. The power converter 100 can have an output 104, which can provide an output voltage $V_o$. The output 104 can be coupled to a device, such as a load $R_L$, that receives power from the power converter 100. The power converter 100 can operate so that the output voltage $V_o$ is different than the input voltage $V_{in}$. For a power converter 100 that is a buck converter, the output voltage $V_o$ can be lower than the input voltage $V_{in}$. The power converter can include an output capacitor $C_o$ 108, which can smooth the output voltage $V_o$ provided by the output. The output voltage $V_o$ can be a direct current DC voltage.

The power converter 100 can include a first inductor L1 110 and a second inductor L2 112. The first inductor 110 can include a first winding of wire around a core (e.g., a magnetic core), and the second inductor 112 can include a second winding of wire around the same core. Alternatively, the first inductor 110 and the second inductor 112 can have separate cores (e.g., magnetic cores). Any suitable type of inductors can be used.

The power converter 100 can include power switches, which can operate to direct current so as to change the input voltage $V_{in}$ to the output voltage $V_o$. The power converter 100 can include a first power switch Q1 114, a second power switch Q2 116, a third power switch Q3 118, and fourth power switch Q4 120. The first power switch 114 and the second power switch 116 can be high-side switches, which can be on the high voltage side of the circuit between the input 102 and the output 104 to the powered device 106 or load $R_L$. The third power switch 118 and the fourth power switch 120 can be low-side switches, which can be on the low voltage side of the circuit between the output 104, or powered device 106, or load $R_L$ and ground 124 or low voltage side of the power source. The power switches 114, 116, 118, and 120 can be N-channel transistors, such as N-channel metal-oxide-semiconductor field-effect transistors (MOSFETs), or gallium-nitride field-effect transistors (GaN FETs), or enhanced-gallium-nitride field-effect transistors (eGaN FETs), or any combination thereof. In some embodiments, P-channel transistors (e.g., P-channel MOSFETs, GaN FETs, or eGaN FETs), or any other suitable type of switching devices can be used for one or more of the power switches 114, 116, 118, and 120.

The first power switch Q1 114 can have a drain that is coupled to the input 102, such as to a positive voltage side of a power source. The source of the first power switch 114 can be coupled to the drain of the second power switch Q2 116. The drain of the second power switch 116 can be coupled to the second inductor 112. Additionally, a first side of a capacitor $C_B$ 122 can be coupled to the source of the first power switch 114 and to the drain of the second power switch 116, and the second side of the capacitor 122 can be coupled to the first inductor 110. The inductors 110 and 112 can be coupled to the output 104. The inductors 110 and 112 can be coupled in parallel to the output 104.

The third power switch Q3 118 can have a drain that is coupled to the source of the second power switch Q2 and to the second inductor 112. The source of the third power switch 118 can be coupled to ground 124 and/or to the low voltage side of a power source. The fourth power switch Q4 120 can have a drain that is coupled to the capacitor 122 (e.g., the second side thereof) and to the first inductor 110. The source of the fourth power switch 120 can be coupled to ground 124 and/or to the low voltage side of a power source. The power switches 114, 116, 118, 120 can each have a gate for receiving drive signals, which can be used to turn on the corresponding switch (e.g., making the switch conductive to enable current to flow through the switch), and to turn off the corresponding switch (e.g., making the switch nonconductive to prevent or impede current from flowing through the switch). The power converter 100 can include a driver (not shown in FIG. 1), which can send drive signals to the gates of the power switches 114, 116, 118, and 120 to turn the corresponding switches on and off.

The capacitor 122 can be between the first power switch 114 and the fourth power switch 120, for example to AC couple the first power switch 114 to the fourth power switch 120. The capacitor 122 can be between the first power switch 114 and the first inductor 110, for example to AC couple the first power switch 114 to the first inductor 110. The capacitor 122 can be between the second power switch 116 and the fourth power switch 120, for example to AC couple the second power switch 116 to the fourth power switch 120. The capacitor 122 can be between the second power switch 116 and the first inductor 110, for example to AC couple the second power switch 116 to the first inductor 110. The capacitor 122 can AC couple components so as to permit alternating current (AC) signals to be transferred between the components, while generally impeding direct current (DC) signals from being transmitted.

Figure 2A:
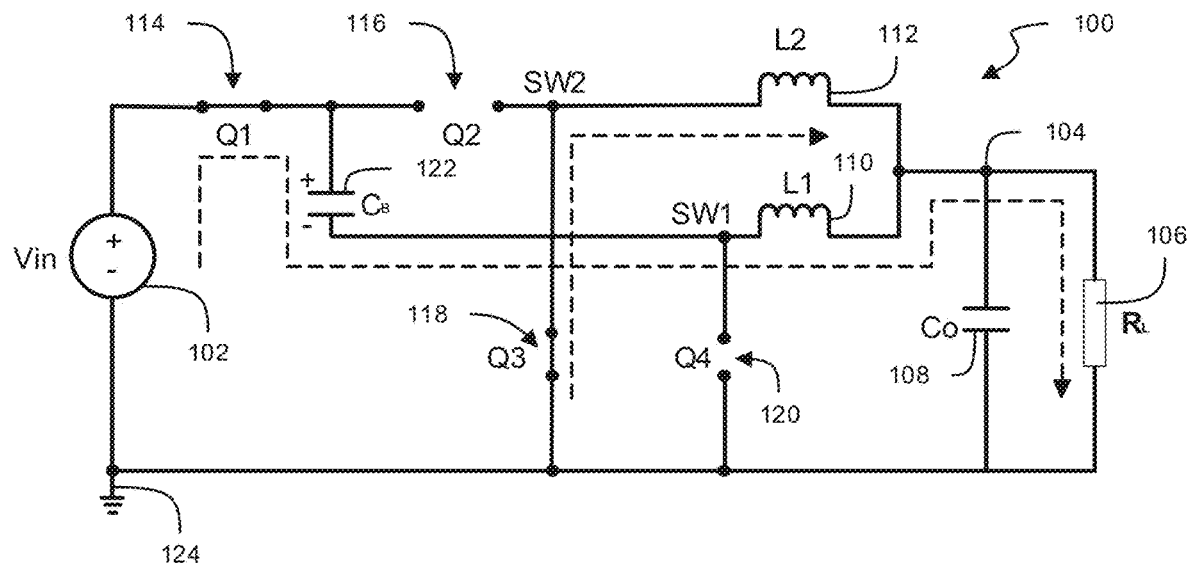
FIG. 2A shows an example embodiment of a power converter in a first state of operation.

FIGS. 2A-D show four states of operation for the power converter 100. FIG. 2A shows a first state of operation where the first power switch 114 and the third power switch 118 are on, and where the second power switch 116 and the fourth power switch 120 are off. In the first state of operation (FIG. 2A), current can flow from the input 102, through the first power switch 114, through the capacitor 122, through the first inductor 110, to the output 104 and the load device 106. During the first state of operation (FIG. 2A), the second inductor 112 can draw a current through the third power switch 118. During the first state of operation, the input voltage can cause the current through the first inductor 110 to increase, thereby storing energy in the first inductor 110. During the first state of operation, the voltage across the capacitor 122 can increase, thereby storing energy in the capacitor 122.

The capacitor 122 can have sufficient capacity (e.g., can store enough charge) that it can supply a current to the inductor 112 when the power switch 116 is conductive (e.g., at the third state of operation in FIG. 2C), without the conductor 122 becoming substantially discharged. The power converter can transition to the fourth state of operation (e.g., FIG. 2D) before the capacitor 122 become substantially discharged.

Figure 2B:
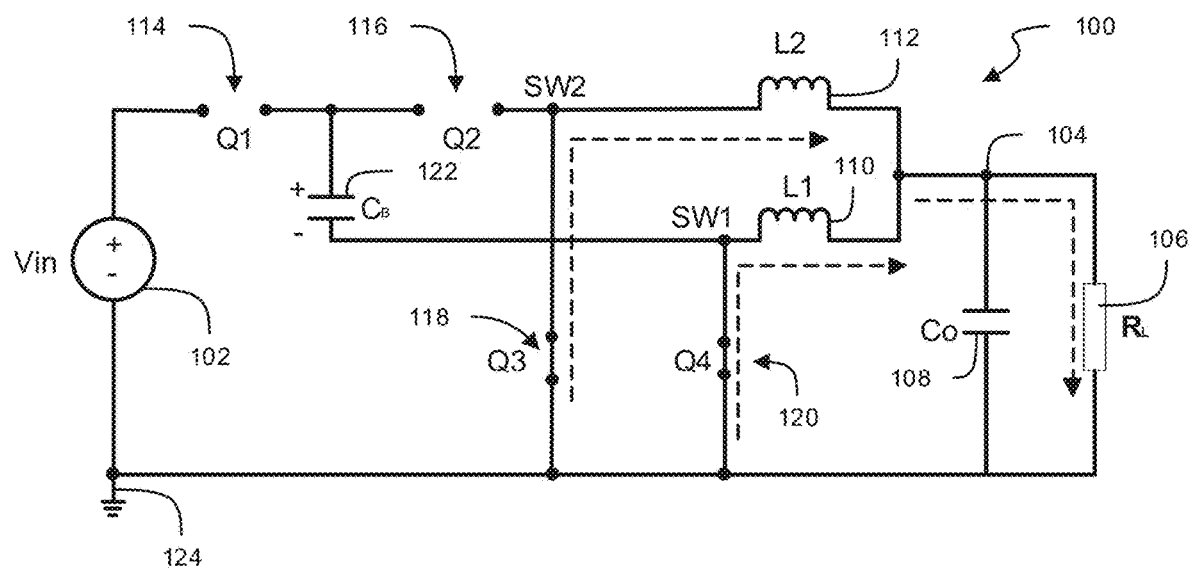
FIG. 2B shows an example embodiment of a power converter in a second state of operation.

FIG. 2B shows a second state of operation where the third power switch 118 and the fourth powers switch 120 are on, and where the first power switch 114 and the second power switch 116 are off. The first inductor 110 can draw a current through the fourth power switch 120, and the second inductor 112 can draw a current through the third power switch 118. The current through the first inductor 110 can decrease as the first inductor 110 outputs some of its stored energy, and the current through the second inductor 112 can decrease as the second inductor 112 outputs some if its stored energy.

Figure 2C:
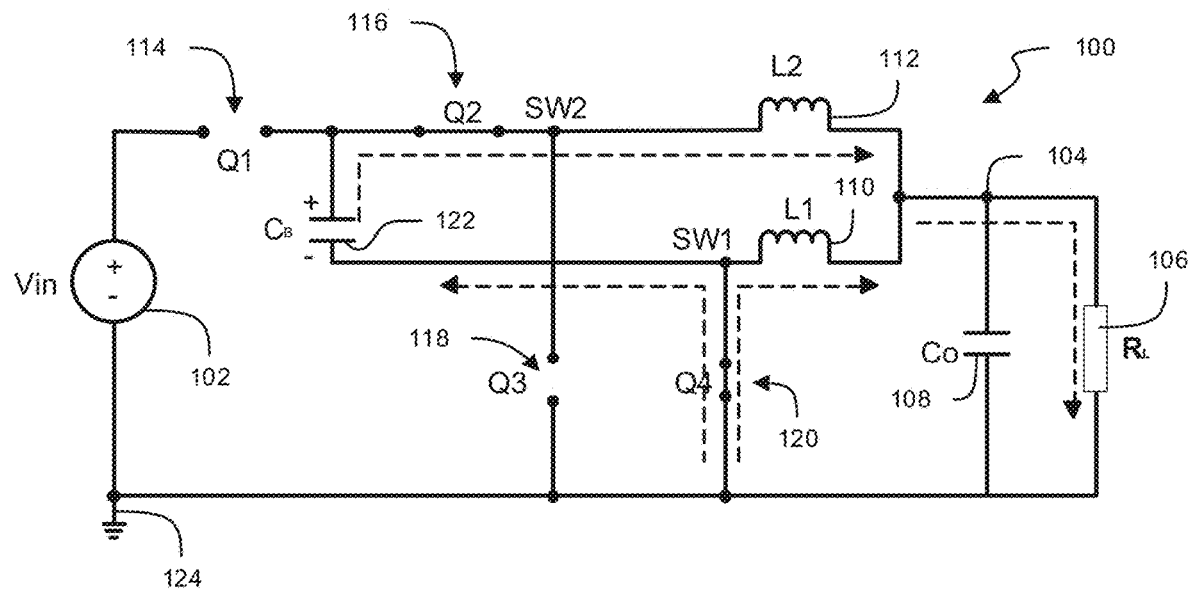
FIG. 2C shows an example embodiment of a power converter in a third state of operation.

FIG. 2C shows a third state of operation where the second power switch 116 and the fourth power switch 120 are on, and where the first power switch 114 and the third power switch 118 are off. At least some of the energy stored in the capacitor 122 (during the first state) can be output in the third stage of operation, and some of that energy can be stored in the second inductor 112. The voltage from the capacitor can cause the current through the second inductor to increase, thereby storing energy in the second inductor 112. The first inductor 110 can draw a current through the fourth power switch 120. Also, current through the fourth power switch 120 can be directed to the capacitor 122.

Figure 2D:
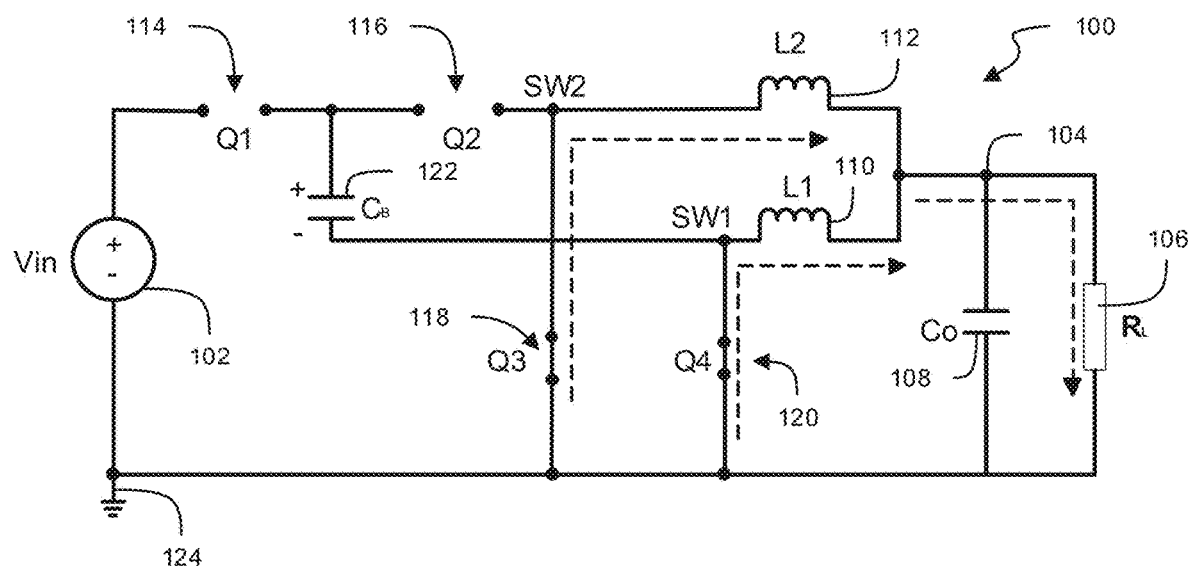
FIG. 2D shows an example embodiment of a power converter in a fourth state of operation.

FIG. 2D shows a fourth state of operation where the third power switch 118 and the fourth powers switch 120 are on, and where the first power switch 114 and the second power switch 116 are off. The first inductor 110 can draw a current through the fourth power switch 120, and the second inductor 112 can draw a current through the third power switch 118. The current through the first inductor 110 can decrease as the first inductor 110 outputs some of its stored energy, and the current through the second inductor 112 can decrease as the second inductor 112 outputs some if its stored energy.

By controlling the timing of the four states of operation (FIGS. 2A-D), the power converter can set an output voltage that is different (e.g., lower) than the input voltage. The value of the output voltage can depend on the relative amounts of time that the system spends in the different states of operation. The power converter 100 can include controller components that are not shown in FIGS. 2A-D, such as a driver configured to generate drive signals for turning the power switches 114, 116, 118, and 120 on and off, and a controller (e.g., a pulse width modulator (PWM) controller) configured to control the timing of the drive signals provided by the driver. In some embodiments, an integrated circuit (IC) can include the first power switch 114, the second power switch 116, the third power switch 118, the fourth power switch 120, the driver, the PWM controller, or any combinations thereof. In some cases, a PWM controller can be external to the IC, for example, a shared PWM controller could be used to control multiple power converter stages.

In some embodiments, the power converter 100 can include a chip-embedded IC, or embedded circuitry. For example, the IC or circuitry can be embedded inside a printed circuit board (PCB). For example a multi-layer PCB can include an upper PCB layer above the embedded IC or circuitry and a lower PCB layer below the embedded IC or circuitry. In some embodiments, the first inductor 110 and/or the second inductor 112 can be external to the PCB (e.g., mounted on a top side of the PCB). The first inductor 110 and/or the second inductor 112 can have a footprint that at least partially overlaps the embedded IC or embedded circuitry. The overlap can be a portion of, the majority of, or the entirety of the footprint of the first inductor 110 and/or the second inductor 112, or of the embedded IC or circuitry. The output capacitor 108 can be external to the PCB (e.g., mounted on a top side of the PCB). The output capacitor 108 can have a footprint that at least partially, majoritarily, or entirely overlaps the embedded IC or circuitry. The capacitor 122 can be external to the PCB (e.g., mounted on a top side of the PCB). The capacitor 122 can have a footprint that at least partially, majoritarily, or entirely overlaps the embedded IC or circuitry. One or more of the first inductor 110, the second inductor 112, the output capacitor 108, and the capacitor 122, or any combinations thereof can be coupled to the embedded IC or circuitry by one or more vias. The power converters disclosed herein can use the features and details disclosed in U.S. Pat. No. 10,193,442, issued Jan. 29, 2019, and titled CHIP EMBEDDED POWER CONVERTERS, which is hereby incorporated by reference for all that it discloses, including the details and features related to chip-embedded power converters.

Figure 3:
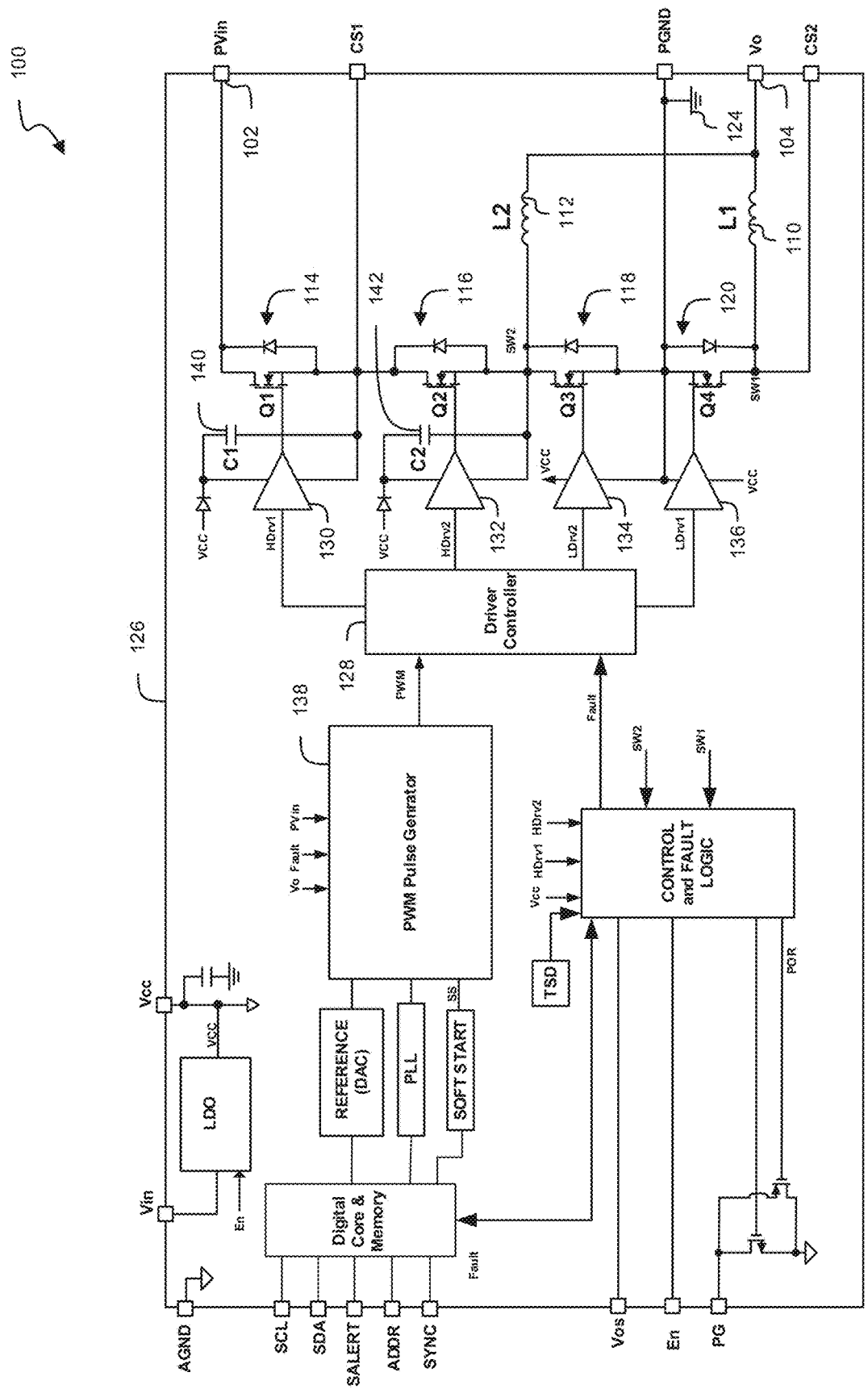
FIG. 3 shows an example embodiment of portions of a power converter that includes bootstrap capacitors.

FIG. 3 shows a schematic diagram of an example embodiment of a power converter 100. The power converter 100 can include an input 102, and output 104, a first inductor 110, a second inductor 112, a first power switch 114, a second power switch 116, a third power switch 118, a fourth power switch 120, and a ground 124 or low voltage connection, which can be similar to the embodiments of FIGS. 1 and 2A-D. The power converter 100 can include an integrated circuit 126, which can be chip-embedded, such as inside a printed circuit board, as discussed herein. The integrated circuit 126 can include terminals for inputting and/or outputting signals, and the terminals are represented in FIG. 3 by squares on the boarder of the integrated circuit 126. For example, the integrated circuit 126 can include terminals for the input 102 for power voltage in $PV_{in}$ and the output 104 for voltage out $V_o$. A terminal can be included for ground 124. Although not shown in FIG. 3, a capacitor 122 can be coupled between the terminals CS1 and CS2. The capacitor 122 can be external to the integrated circuit 126, such as mounted to the exterior of the PCB (e.g., at least partially overlapping the integrated circuit 126). Locations corresponding to CS1 and CS2 are also shown in FIG. 1, for reference. The capacitor 122 can AC couple the first power switch 114 to the fourth power switch 120, or other components similar to the discussion in connection with FIG. 1. Although not shown in FIG. 3, the power converter 100 can include an output capacitor 108, such as coupled to the output 104 or $V_o$ terminal. The output capacitor 108 can be external to the integrated circuit 126, such as mounted to the exterior of the PCB (e.g., at least partially overlapping the integrated circuit 126). FIG. 3 shows the first inductor 110 and the second inductor 112 as being part of the integrated circuit 126. In some embodiments, one or both of the inductors 110, 112 can be external to the integrated circuit 126, such as mounted to the exterior of the PCB (e.g., at least partially overlapping the integrated circuit 126). The integrated circuit 126 can include terminals for providing signals to or from one or both of the external inductors 110, 112 (e.g., similar to the terminals CS1 and CS2). The first inductor 110, second inductor 112, output capacitor 108, capacitor 122, or any combination thereof can be coupled to the integrated circuit 126 by vias, such as extending through the PCB.

The power converter 100 can include driver circuitry for sending drive signals to the power switches 114, 116, 118, 120, and in some embodiments, the driver circuitry can be included in the integrated circuit 126. The driver circuitry can include a driver controller 128, which can be configured to output signals that are delivered to, or otherwise control, the respective gates of the power switches 114, 116, 118, 120. The driver controller 128 can include gate drive logic. The driver controller 128 can output a first drive signal HDrv1 for controlling the first power switch Q1 114, a second drive signal HDrv2 for controlling the second power switch Q2 116, a third drive signal LDrv2 for controlling the third power switch Q3 118, and a fourth drive signal LDrv1 for controlling the fourth power switch Q4 120. The driver circuitry can include one or more amplifiers for amplifying the drive signals. The drive signals output by the driver controller can be logic signals, which in some cases can have voltages below the voltage values that operate the power switches 114, 116, 118, 120. The amplifiers 130, 132, 134, 136 can amplify the corresponding drive signals (e.g., HDrv1, HDrv2, LDrv2, and LDrv1) to appropriate voltages for operating the power switches 114, 116, 118, 120. The amplifiers 130, 132, 134, 136 can be operational amplifiers.

The power converter 100 can include a pulse width modulation (PWM) pulse generator 138, which can provide PWM signals to the driver controller, which can control the duty cycle or timing of the drive signals, for example. Although PWM is disclosed in connection with this embodiment, any suitable modulation or control approach can be used to generate drive signals to operate the power switches 114, 116, 118, 120.

The integrated circuit 126 can include additional features. In some cases, components not shown in FIG. 3 can be included in the integrated circuit 126. Components that are shown as part of the integrated circuit 126 in FIG. 26 could be outside the integrated circuit 126 or in a different integrated circuit. In some embodiments, some or all of the components disclosed in connection with FIG. 3 can be embedded circuitry (e.g., inside a PCB) that is not integrated into an IC. In some embodiments, the IC or circuitry is not chip embedded and can be external to a PCB (e.g., mounted thereto).

High-Side Power Switch Drivers

In some embodiments, N-channel transistors or FETs can be used for the first power switch 114, the second power switch 116, the third power switch 118, the fourth power switch 120, or any combinations thereof. Although some embodiments are discussed herein as using MOSFETs, it will be understood that GaN FETs or eGaN FETs or other types of transistors could be used instead. In some embodiments, it can be advantageous to use an N-channel FET rather than a P-channel FET (e.g., for the power switches 114, 116, 118, 120), such as to reduce chip size, to reduce cost, and/or to increase performance and/or efficiency. An N-channel MOSFET is on (e.g., conductive) when the voltage at the gate is higher than the voltage at the source (such as by a threshold amount), and the N-channel MOSFET is off (e.g., nonconductive) when the voltage at the gate is not higher than the voltage at the source (such as by a threshold amount). For low-side switches, such as power switches 118 and 120, the source of the MOSFET can be coupled to ground and/or to a low voltage side of a power source, so that delivering a high voltage to the gate can turn on the MOSFET and keep it on while the high voltage is maintained at the gate. However, in some instances, for high-side switches, such as power switches 114, 116, the source of the MOSFET can receive a high voltage when the switch turns on. Thus delivering a high voltage to the gate of the high-side switch can turn the switch on, but once the high voltage reaches the source the switch can turn off. Thus, it can be advantageous to provide a voltage raising circuit or feature for driving a switch, such as a high-side switch that uses an N-channel FET. In some embodiments, a charge pump circuit can be used, or a bootstrap circuit can be used, or any suitable circuitry or feature that raises the voltage applied to the gate, and a number of example embodiments are disclosed herein.

The power converter 100 can include a first bootstrap capacitor C1 140, which can be configured to provide an elevated voltage to the first power switch Q1 114. The power converter 100 can include a second bootstrap capacitor C2 142, which can be configured to provide an elevated voltage to the second power switch Q2 116. Each of the bootstrap capacitors 140, 142 can operate by charging up the bootstrap capacitor 140 or 142 during a first period of time (e.g., while the corresponding power switch 114 or 116 is off), so that energy is stored in the bootstrap capacitor 140 or 142, and then discharging the bootstrap capacitor 140 or 142 during a second period of time (e.g., while the corresponding power switch 114 or 116 is on), so that energy from the bootstrap capacitor 140 or 142 is released to raise the voltage at the gate of the corresponding power switch 114 or 116.

FIG. 3 shows the first bootstrap capacitor 140 and the second bootstrap capacitor 142 as being part of the integrated circuit 126. In some embodiments, one or both of the bootstrap capacitors 140, 142 can be external to the integrated circuit 126, such as mounted to the exterior of the PCB (e.g., at least partially overlapping the integrated circuit 126). The integrated circuit 126 can include terminals for providing signals to or from one or both of the bootstrap capacitors 140, 142 (e.g., similar to the terminals CS1 and CS2). The first bootstrap capacitor 140 and/or the second bootstrap capacitor 142 can be coupled to the integrated circuit 126 by vias, such as extending through the PCB. In some embodiments, a power converter 100 can include one of the bootstrap capacitors 140 or 142, but not both, such as if a different voltage raising approach is used for one of the power switches 114, 116.

Example Bootstrap Circuits and Control

Figure 4B:
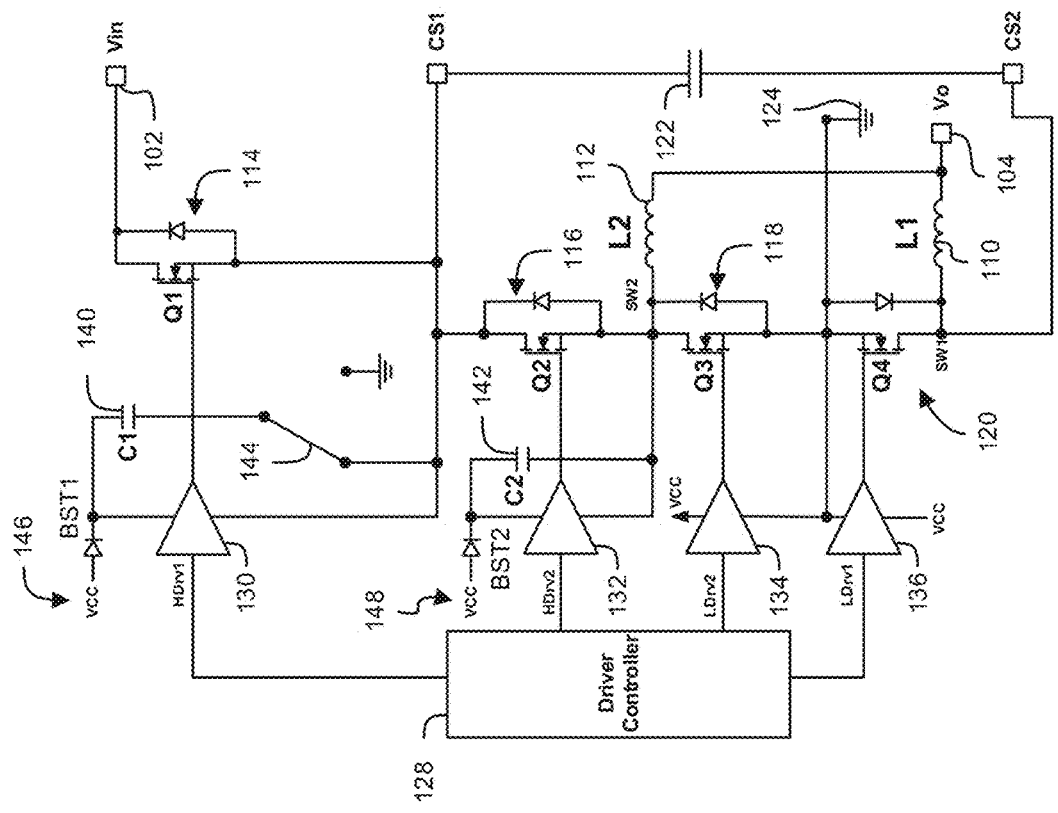
FIG. 4B shows an example embodiment of a power converter in a state for discharging a bootstrap capacitor.
Figure 4A:
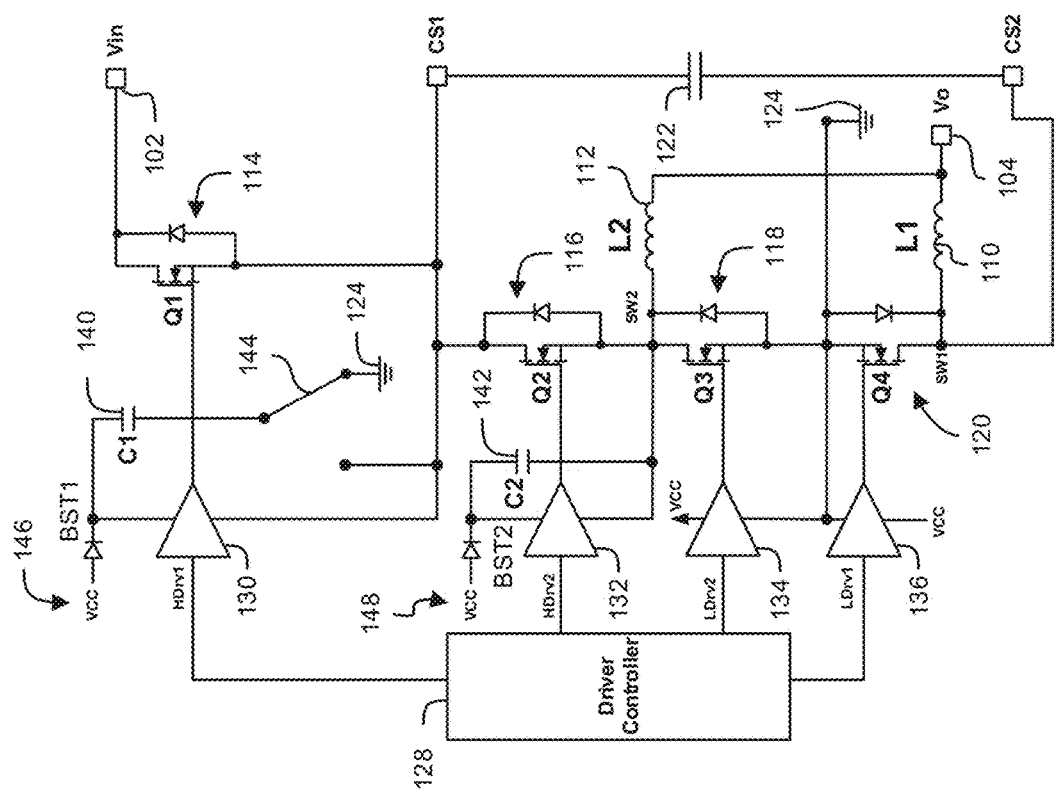
FIG. 4A shows an example embodiment of a power converter in a state for charging a bootstrap capacitor.

Operation of the first bootstrap capacitor 140 will be discussed in connection with FIGS. 4A and 4B. FIG. 4A shows a schematic diagram of an example embodiment of a power converter 100 in a first configuration that charges the first bootstrap capacitor 140. FIG. 4B shows a schematic diagram of an example embodiment of a power converter 100 in a second configuration that discharges the first bootstrap capacitor 140. The power converter 100 can have circuitry, such as including one or more switches 144, for changing the power converter between the first configuration that charges the first bootstrap capacitor 140 (e.g., FIG. 4A) and the second configuration that discharges the first bootstrap capacitor 140 (e.g., FIG. 4B).

The first bootstrap capacitor 140 can have a first side that is coupled to a voltage source 146. The first bootstrap capacitor 140 can have a second side that can be selectively coupled to ground 124 (e.g., FIG. 4A) and can be selectively coupled to the source of the first power switch 114 (e.g., FIG. 4B). In some embodiments, the voltage source 146 can provide voltage to the amplifier 130 and to the first bootstrap capacitor 140. In some embodiments, a diode can be used to enable current to flow from the voltage source 146 to the capacitor 140 and/or to the amplifier 130, and to impede current from flowing the other direction to the voltage source 146. In some embodiments, the diodes shown between the bootstrap capacitors 140, 142 and the respective voltage sources 146, 148 can be replaced with switches (e.g., MOSFETs or other transistors) that can be driven (e.g., with signals from the driver controller 128) to be on when charging the respective bootstrap capacitor 140 or 142, and to be off when the respective bootstrap capacitor 140 or 142 is discharging, as discussed herein.

In the first configuration, the one or more switches 144 can couple the first bootstrap capacitor 140 to ground 124, which can be the same ground connection 124 shown in FIGS. 1 and/or 3, or a different ground or low voltage connection. In the first configuration (e.g., FIG. 4A), current can flow between a voltage source 146 and the first bootstrap capacitor 140, and between the first bootstrap capacitor 140 and ground 124, while the first bootstrap capacitor 140 charges. The one or more switches 144 can have a first configuration that creates a path from the voltage source 146 to the first bootstrap capacitor 140 to ground 124. The first bootstrap capacitor 140 can be charged to about a voltage $V_{cc}$ of the voltage source 146. In some embodiments, a small voltage drop can be created by the diode between the voltage source 146 and the first bootstrap capacitor 140, so that the charged capacitor 140 has a voltage slightly less than, but still about the level of, the Voltage $V_{cc}$, from the voltage source 146. In some embodiments, a switch (e.g., transistor) can be used in place of the diode, as discussed, to reduce or avoid the small voltage drop. In some embodiments, the first bootstrap capacitor 140 can be charged substantially to saturation, although in some embodiments, a capacitor could be selected that would be charged only partially and have enough stored energy so that during the discharge phase the first power switch 114 can be on for the appropriate time, such during the first state of operation (e.g., FIG. 2A). In some embodiments, the path for charging the first bootstrap capacitor 140 does not go through any of the power switches 114, 116, 118, 120. In some embodiments, the one or more switches 144 does not include any of the power switches 114, 116, 118, 120.

The one or more switches 144 can be in the first configuration to charge the first bootstrap capacitor 140 during part or all of the time that the first power switch 114 is off (e.g., non-conductive or open), such as during at least a portion of the second state of operation (e.g., FIG. 2B), the third state of operation (e.g., FIG. 2C), and the fourth state of operation (e.g., FIG. 2D). In some embodiments, the one or more switches are not in the first configuration during the first state of operation (e.g., FIG. 2A), when the first power switch 113 is on (e.g., conductive or closed). For example, a low or off signal for the drive signal HDrv1 for driving the first power switch 114 can be used to set the one or more switches 144 in the first configuration (e.g., FIG. 4A). Also, drive signals for one or more of the other power switches 116, 118, 120 can be used to operate the one or more switches 144. A high or on signal for the drive signal HDrv2 for driving the second power switch 116 can be used to set the one or more switches 144 in the first configuration. The first power switch 114 is off when the second power switch 116 is on, in the third state of operation (e.g., FIG. 2C). A high or on signal for the drive signal LDrv1 for driving the fourth power switch 120 can be used to set the one or more switches 144 in the first configuration. The first power switch 114 is off when the fourth power switch 120 is on, in the second, third, and fourth states of operation (e.g., FIGS. 2B, 2C, and 2D), so using the LDrv1 signal for driving the one or more switches 144 can facilitate providing enough time in the first configuration to sufficiently charge the first bootstrap capacitor 140.

In the second configuration, the one or more switches 144 can couple the first bootstrap capacitor 140 to the source of the first power switch 114. In the second configuration (e.g., FIG. 4B), current can flow from a voltage source, such as the input 102 with voltage input $V_{in}$, through the first power switch 114, and to the first bootstrap capacitor 140. Current can flow from the first bootstrap capacitor 140 to the amplifier 130, such as to the positive voltage supply connection of the amplifier 130. In the second configuration (e.g., FIG. 4B) the energy stored in the capacitor can step up the voltage that is delivered to the amplifier 130. The increased voltage provided to the amplifier 130 can be the voltage at the source of the first power switch 114 (e.g., about $V_{in}$) plus the voltage across the first bootstrap capacitor 140 (e.g., about $V_{cc}$). The diode between the first bootstrap capacitor 140 and the voltage source 146 (or, alternatively, an open or off switch) can prevent current from flowing from the first bootstrap capacitor 140 to the voltage source 146 in the second configuration, especially since the elevated voltage (e.g., about $V_{in}+V_{cc}$) can be higher than the voltage $V_{cc}$ at the voltage source 146. The amplifier 130 can be configured to provide the elevated voltage (e.g., about $V_{in}+V_{cc}$) to the gate of the first power switch 114 (e.g., when the HDrv1 signal is high or on). The amplifier 130 for driving the first power switch 114 can have a positive or high voltage supply coupled to the voltage source 146 and to the first bootstrap capacitor 140. The amplifier 130 for driving the first power switch 114 can have a negative or low voltage supply coupled to the source of the first power switch 114. By way of example, when the first power switch 114 is on, the source of the first power switch can have a voltage of about $V_{in}$, and the voltage at the gate of about $V_{in}+V_{cc}$ can be sufficiently higher than the voltage at the source to cause the first power switch 114 to remain on (e.g., conductive). The voltage applied to the gate can be large than the source voltage by about the amount of voltage increase provided by the first bootstrap capacitor 140. In some cases, the voltage increase can drop over time as the capacitor 140 discharges, and the capacitor 140 can be selected to have enough capacity to keep the elevated voltage sufficiently high for the desired time (e.g., during the first state of operation while the first power switch 114 is on).

The one or more switches 144 can be in the second configuration (e.g., to discharge the first bootstrap capacitor 140) while the first power switch 114 is on (e.g., conductive or closed), such as during the first state of operation (e.g., FIG. 2A). In some embodiments, the one or more switches are not in the second configuration during the second state of operation (e.g., FIG. 2B), the third state of operation (e.g., FIG. 2C), and/or the fourth state of operation (e.g., FIG. 2D). For example, a high or on signal for the drive signal HDrv1 for driving the first power switch 114 can be used to set the one or more switches 144 in the second configuration (e.g., FIG. 4B). Also, drive signals for one or more of the other power switches 116, 118, 120 can be used to operate the one or more switches 144. A low or off signal for the drive signal LDrv1 for driving the fourth power switch 120 can be used to set the one or more switches 144 in the second configuration. The first power switch 114 is on when the fourth power switch 116 is off, in the first state of operation (e.g., FIG. 2A).

The one or more switches 144 can be a single switch that has the first and second configurations, or the one or more switches 144 can include multiple switches that can be controlled to have the first and second configurations. The one or more switches 114 can include one or more relays, or MOSFETs, or other FETs, or other types of transistors, or any other suitable type of switch. In some embodiments, the one or more switches 114 for the first and second configurations associated with charging and discharging the first bootstrap capacitor are not the power switches 114, 116, 118, 120. In some embodiments, the current path for charging the first bootstrap capacitor 140 (e.g., in the first configuration) does not go through any of the power switches 114, 116, 118, 120.

Figure 5:
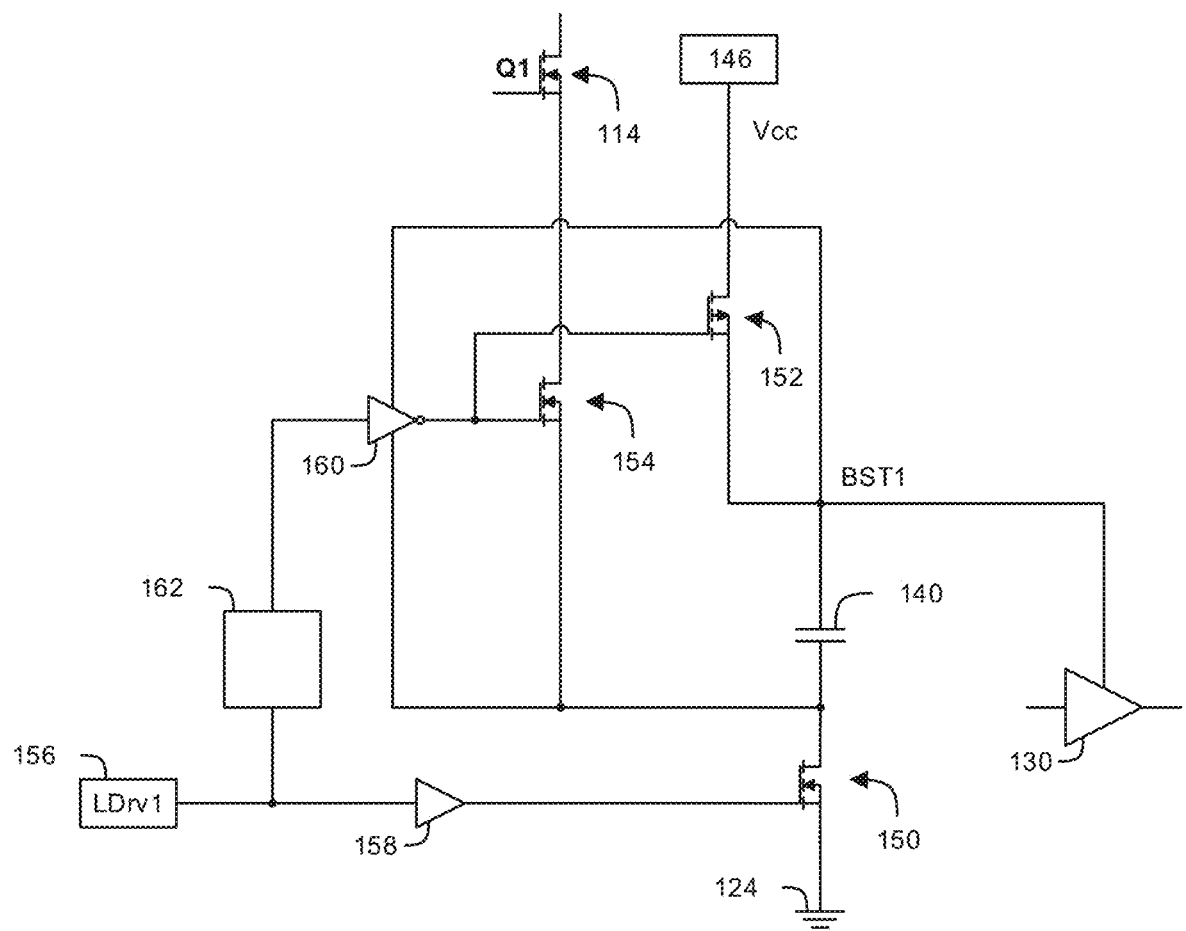
FIG. 5 shows and example embodiment of circuitry for controlling the charging and discharging of a bootstrap capacitor.

FIG. 5 is a schematic diagram of an example embodiment of circuitry for controlling the charging and discharging of the first bootstrap capacitor 140. In FIG. 5, the one or more switches 144 can include a first switch 150, a second switch 152, and a third switch 154, which can be MOSFETs, or other FETs, or any other suitable type of transistor or other switch type. By way of example, the first switch 150 can be an N-channel MOSFET, the second switch 152 can be a P-channel MOSFET, and the third switch 154 can be an N-channel MOSFET, although other configurations and switch types can be used. The first switch 150 can be coupled between the first bootstrap capacitor 140 and ground 124. The second switch 152 can be coupled between the first bootstrap capacitor 140 and the voltage source 146. The third switch 154 can be coupled between the first bootstrap capacitor 140 and the first power switch 114 (e.g., the source thereof).

A drive signal 156 can be used to control the switches 150, 152, 154 to produce the first configuration for charging the first bootstrap capacitor 140 and the second configuration for discharging the first bootstrap capacitor 140, as discussed herein. The drive signal 156 can be the LDrv1 drive signal that is used for driving the fourth power switch 120, although other drive signals can be used, as discussed herein, such as the HDrv1 drive signal associated with the first power switch 114, or the inverse thereof. An amplifier 158 can receive the drive signal 156, which can be a logic signal, and can amplify the voltage to a voltage suitable for operating the first switch 150. An amplifier 160 can receive drive signal 156, which can be a logic signal, and can amplify the voltage to a voltage suitable for operating the second switch 152 and/or the third switch 154. The amplifiers 160 can be operational amplifiers. An inverter can be used (e.g., in connection with the amplifier 160) so that different signals are provided to the first switch 150 and to the second and third switches 152, 154. Different configurations are possible, depending on the drive signal used and the types of switches used. For example, the inverter can be omitted or can be used to invert the signal to the first switch 150 instead of inverting the signal to the second and third switches 152, 154. In some cases, the amplifiers can be omitted and the drive signal 156 can have sufficient voltage for operating the switches 150, 152, 154. In some embodiments, a level shifter 162 can be used to modify the input drive signal 156 that is used, such as for the second and/or third switches 152, 154, although in some configurations the level shifter 162 can be omitted or used differently, such as for the first switch 150. The level shifter 162 can shift the input voltage signals to a level appropriate for the amplifiers 160 and/or 158, for example.

In the example embodiment of FIG. 5, the drain of the first switch 150 is coupled to the first bootstrap capacitor 140 (e.g., to a second side thereof), the source of the first switch 150 is coupled to ground 124, and the gate of the first switch 150 is coupled to the drive signal source 156, such as through the amplifier 158. The second switch 152 can have a drain that is coupled to the voltage source 146, a source that is coupled to the bootstrap capacitor 140 (e.g., to a first side thereof), and a gate that is coupled to the drive signal source 156, such as through the level shifter 162 and/or amplifier/inverter 160. The source of the second switch 152 and the first bootstrap capacitor 140 (e.g., the first side thereof) can also be coupled to the amplifier 130, such as to the positive voltage supplier of the amplifier 130, through the connection labeled BST1. BST1 is also labeled in at least FIGS. 4A and 4B for reference. The source of the second switch 152 and the first bootstrap capacitor 140 (e.g., the first side thereof) can also be coupled to the amplifier 160, such as to the positive voltage supplier of the amplifier 160. The third switch 154 can have a drain that is coupled to the source of the first power switch Q1 114, a source coupled to the bootstrap capacitor 140 (e.g., to the second side thereof), and a gate that is coupled to the drive signal source 156, such as through the level shifter 162 and/or inverting amplifier 160. The source of the third power switch 154 can also be coupled to the drain of the first switch 150, such as through a node that is between the first switch 150 and the capacitor 140. The source of the third switch 154 (e.g., as well as the drain of switch 150 and the capacitor 140) can be coupled to the amplifier 160, such as to the negative voltage supply thereof.

The drive signal 156 can have a first value (e.g., high) for the first configuration. In the first configuration, the high drive signal 156 can turn the first switch 150 on (e.g., conductive), and the high drive signal 156 (e.g., inverted to low by the inverting amplifier 160) can turn the second switch 152 on (e.g., conductive) and can turn the third switch 154 off (e.g., non-conductive). In the first configuration, current can flow from the voltage source 146, through the second switch 152 to the first bootstrap capacitor 140, and current can flow from the first bootstrap capacitor 140, through the first switch 150, to ground 124. The first bootstrap capacitor 140 can be charged in the first configuration, such as to a voltage of about $V_{cc}$, as discussed herein.

The drive signal 156 can have a second value (e.g., low) for the second configuration. In the second configuration, the low drive signal 156 can turn the first switch 150 off (e.g., non-conductive), and the low drive signal 156 (e.g., inverted to high by the inverting amplifier 160) can turn the second switch 152 off (e.g., non-conductive) and can turn the third switch 154 on (e.g., conductive). In the second configuration, the charging path from the voltage source 146, through the capacitor 140, to ground 124 is interrupted, by the first switch 150 and/or the second switch 152 being in the off state. In the second configuration, the third switch 154 can be on to couple the first bootstrap capacitor 140 to the source of the first power switch 114. The first bootstrap capacitor 140 can discharge in the second configuration. In the second configuration, current can flow from a voltage source (e.g., about $V_{in}$), through the first power switch 114, and to the first bootstrap capacitor 140. Current can flow from the first bootstrap capacitor 140 to the amplifier 130, such as through connection BST1 to the positive voltage supply connection of the amplifier 130. In the second configuration, the energy stored in the capacitor can step up the voltage that is delivered to the amplifier 130. The increased voltage provided to the amplifier 130 can be the voltage at the source of the first power switch 114 (e.g., about $V_{in}$) plus the voltage across the first bootstrap capacitor 140 (e.g., about $V_{cc}$). The amplifier 130 can be configured to provide the elevated voltage (e.g., about $V_{in}+V_{cc}$) to the gate of the first power switch 114 so that the first power switch 114 can be kept in the on state, as discussed herein. The capacitor 140 can also operate as a bootstrap capacitor for the third switch 154. In the second configuration, the capacitor 140 can step up the voltage that is supplied to the amplifier 160, so that the third switch 154 can be kept in the on state.

Many variations are possible, such as the use of different drive signals 156, different switch configuration, etc. In some embodiments, a diode can be used instead of the second switch 152, as discussed herein.

Operation of the second bootstrap capacitor 140 will be discussed. As can be seen in FIGS. 3, 4A and 4B and as described herein, in some embodiments the power converter 100 can have a state that charges the second bootstrap capacitor 142, such as while the second power switch 116 is off (e.g., non-conductive), and the power converter 100 can have a different state that discharges the second bootstrap capacitor 142, such as to provide an elevated voltage for holding the second power switch 116 in an on (e.g., conductive) state.

The second bootstrap capacitor 142 can have a first side that is coupled to a voltage source 148 (e.g., $V_{cc}$). The second bootstrap capacitor 142 can have a second side that can be selectively coupled to ground 124 when the third power switch Q3 118 is on (e.g., conductive). The second bootstrap capacitor 142 (e.g., the second side thereof) can be coupled to the source of the second power switch 116. In some embodiments, the voltage source 148 can provide voltage to the amplifier 132 and to the second bootstrap capacitor 142. In some embodiments, a diode can be used to enable current to flow from the voltage source 148 to the capacitor 142 and/or to the amplifier 132, and to impede current from flowing the other direction to the voltage source 148. In some embodiments, either of the diodes shown between the bootstrap capacitors 140, 142 and the respective voltage sources 146, 148 can be replaced with switches (e.g., MOSFETs or other transistors) that can be driven (e.g., with signals from the driver controller 128) to be on when charging the respective bootstrap capacitor 140 or 142, and to be off when the respective bootstrap capacitor 140 or 142 is discharging, as discussed herein.

In the first, second, and/or fourth states of operation (e.g., FIGS. 2A, 2B, and 2D) the third power switch 118 can be on (e.g., while the second power switch 116 is off), which can enable current to flow from the voltage source 148 to the second bootstrap capacitor 142, and from the bootstrap capacitor 142, through the third power switch 118, to ground 124, which can charge the bootstrap capacitor 142. When the third power switch 118 is on, the SW2 node can go to a voltage near ground, so that the second bootstrap capacitor C2 142 has about $V_{cc}$ on one side and about ground on the other, which can cause the second bootstrap capacitor 142 to charge up. The second bootstrap capacitor 142 can be charged to about a voltage $V_{cc}$, such as from the voltage source 148. In some embodiments, a small voltage drop can be created by the diode between the voltage source 148 and the second bootstrap capacitor 142, so that the charged capacitor 142 has a voltage slightly less than, but still about the level of, the Voltage $V_{cc}$, from the voltage source 148. In some embodiments, a switch (e.g., transistor) can be used in place of the diode, as discussed, to reduce or avoid the small voltage drop. In some embodiments, the second bootstrap capacitor 142 can be charged substantially to saturation, although in some embodiments, a capacitor 142 could be selected that would be charged only partially and have enough stored energy so that during the discharge phase the second power switch 116 can be on for the appropriate time, such during the third state of operation (e.g., FIG. 2C). The power converter can be in the state to charge the second bootstrap capacitor 142 during part or all of the time that the second power switch 116 is off (e.g., non-conductive or open), such as during at least a portion of the first state of operation (e.g., FIG. 2A), the second state of operation (e.g., FIG. 2B), and the fourth state of operation (e.g., FIG. 2D), which can facilitate providing enough time to sufficiently charge the second bootstrap capacitor 142.

In the third state of operation (e.g., FIG. 2C), the third power switch 118 can be off (e.g., non-conductive), which can disconnect the second bootstrap capacitor 142 from the ground connection 124, and the second power switch 116 can be on (e.g., conductive), which can provide a voltage through the second power switch 116 to the second bootstrap capacitor 142, which can step up the voltage and deliver the increased voltage to the amplifier 132, which can apply the increased voltage to the gate of the second power switch 116, to keep the second power switch 116 on. By way of example, the capacitor 122 can be charged in the first state of operation (e.g., FIG. 2A), such as to a voltage differential of about ½ $V_{in}$ applied across the capacitor 122, although other voltage values are possible. In the first state of operation (e.g., FIG. 2A), the voltage on the first side of the capacitor 122 can be about $V_{in}$ and the voltage on the second side of the capacitor 122 (e.g., at CS1 and/or SW1) can be about ½ $V_{in}$. The capacitor 122 can discharge in the third state of operation (e.g., FIG. 2C) and apply a voltage, such as of about ½ $V_{in}$, through the second power switch 116 to the second bootstrap capacitor 142, which can discharge to elevate the voltage, such as by about $V_{cc}$, so that an elevated voltage, such as about ½ $V_{in}+V_{cc}$, is delivered to the amplifier 132, such as to the positive voltage supply thereof. The amplifier 132 for driving the second power switch 116 can have a positive or high voltage supply coupled to the voltage source 148 and to the second bootstrap capacitor 142. The amplifier 132 for driving the second power switch 116 can have a negative or low voltage supply coupled to the source of the second power switch 116. The diode between the second bootstrap capacitor 142 and the voltage source 148 (or, alternatively, an open or off switch) can prevent current from flowing from the second bootstrap capacitor 142 to the voltage source 148 in this state, especially since the elevated voltage (e.g., about ½ $V_{in}+V_{cc}$) can be higher than the voltage $V_{cc}$ at the voltage source 148.

The amplifier 132 can be configured to provide the elevated voltage (e.g., about ½ $V_{in}+V_{cc}$) to the gate of the second power switch 116 (e.g., when the HDrv2 signal is high or on). The amplifier 132 for driving the second power switch 116 can have a high voltage supply coupled to the voltage source 148 and to the second bootstrap capacitor 142. The amplifier 132 for driving the second power switch 116 can have a low voltage supply coupled to the source of the second power switch 116. By way of example, when the second power switch 116 is on, the source of the second power switch can have a voltage of about ½ $V_{in}$ (e.g., applied by the capacitor 122), and the voltage at the gate of about ½ $V_{in}+V_{cc}$ can be sufficiently higher than the voltage at the source to cause the second power switch 116 to remain on (e.g., conductive). The voltage applied to the gate can be larger than the source voltage by about the amount of voltage increase provided by the second bootstrap capacitor 142. In some cases, the voltage increase can drop over time as the capacitor 142 discharges, and the capacitor 142 can be selected to have enough capacity to keep the elevated voltage sufficiently high for the desired time (e.g., during the third state of operation while the second power switch 116 is on).

Additional Example Bootstrap Circuits and Control

Figure 6:
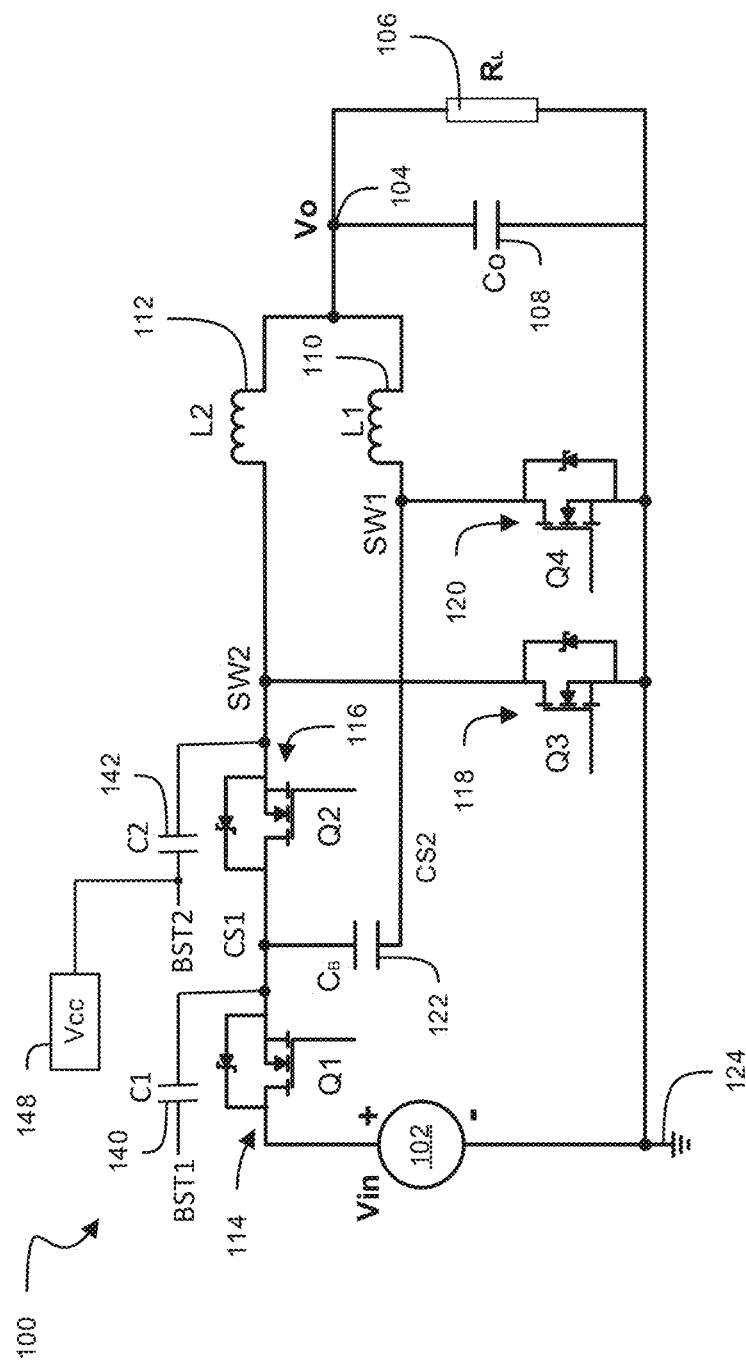
FIG. 6 shows another example embodiment of a power converter that includes bootstrap capacitors.
Figure 7:
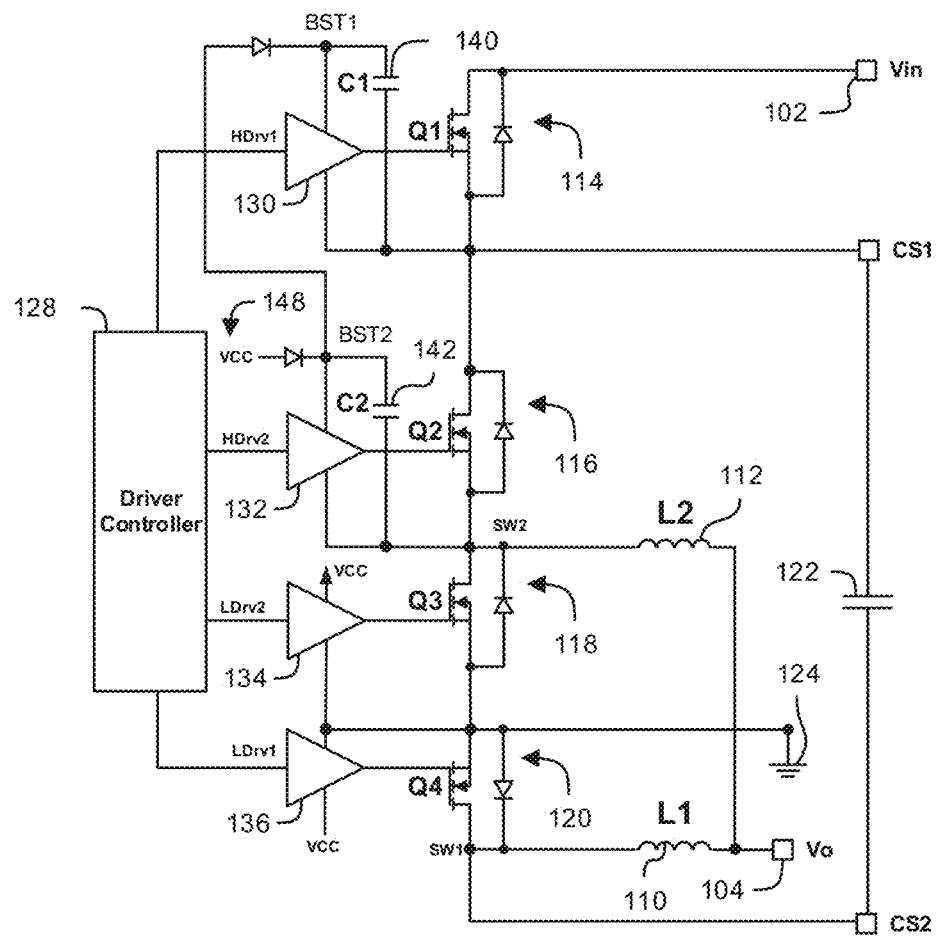
FIG. 7 shows another example embodiment of a power converter that includes bootstrap capacitors.
Figure 8:
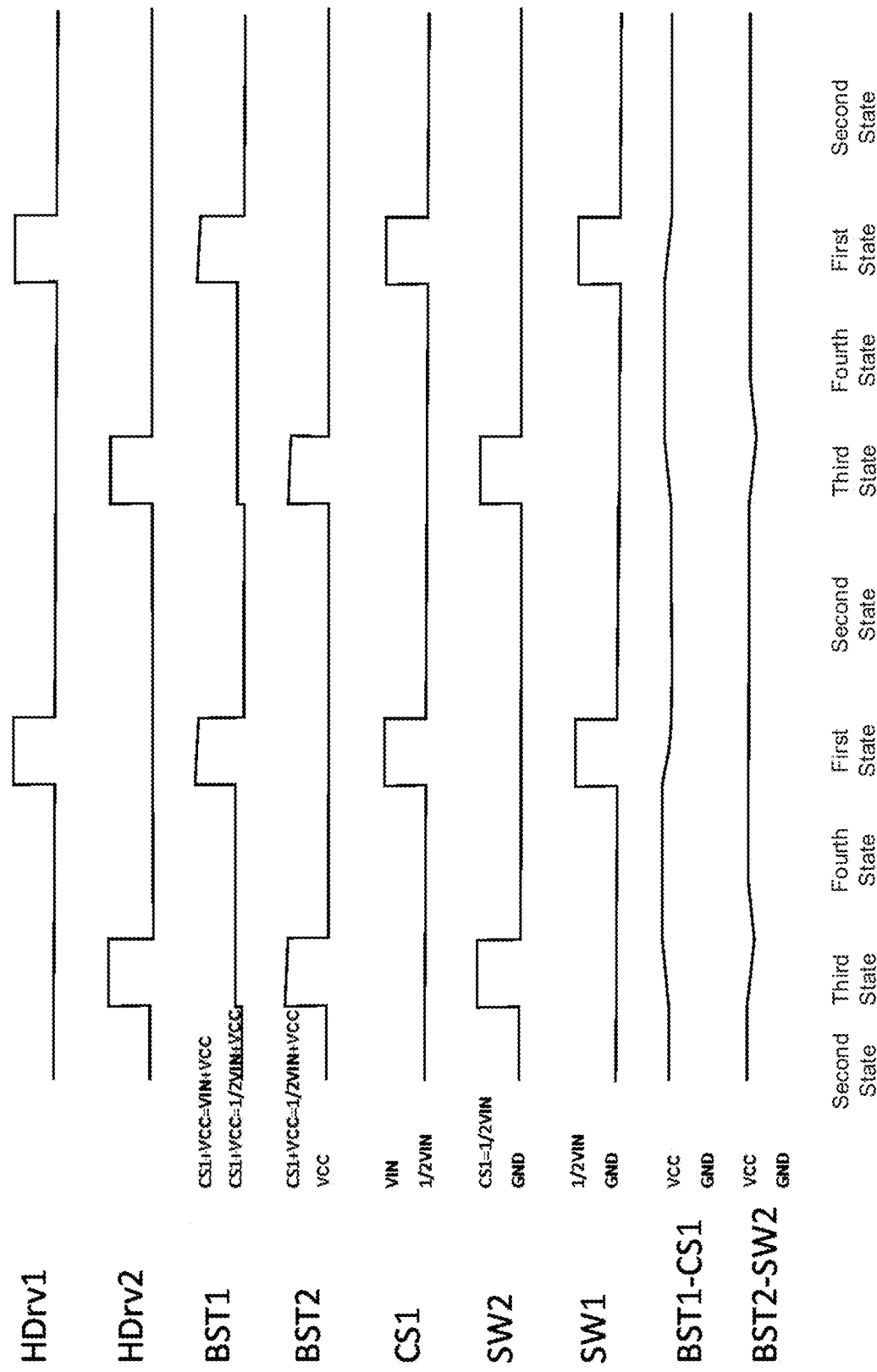
FIG. 8 shows the values for various signals during operation of an example embodiment of a power converter.

FIGS. 6 and 7 are schematic drawings that show additional embodiments of bootstrap circuits that can be used for the power converter 100. FIG. 8 shows voltage levels for various nodes and locations at various times during steady state operation. The power converter 100 can include a first bootstrap capacitor 140, which can be used to provide a voltage increase that can keep the first power switch 114 on, as discussed herein. The first bootstrap capacitor 140 can be coupled to the source of the first power switch 114 (e.g., all the time, as opposed to other embodiments disclosed herein where the capacitor 140 can be selectively coupled and selectively detached from the source of the first power switch 114). The first bootstrap capacitor 140 can be coupled to the gate of the first power switch 114, so that the capacitor 140 can increase voltage provided to the gate when the first power switch 114 is to be in the on state. For example, a first side of the capacitor 140 can be coupled to an amplifier 130 (e.g., through the BST1 node or connection), such as to a positive (or high) voltage supply of an operational amplifier 130. A second side of the capacitor 140 can be coupled to the source of the first power switch 114.

The power converter 100 can include a second bootstrap capacitor 142, which can be used to provide a voltage increase that can keep the second power switch 116 on, as discussed herein. The second bootstrap capacitor 142 can be coupled to the source of the second power switch 116. The second bootstrap capacitor 142 can be coupled to the gate of the second power switch 116, so that the capacitor 142 can increase voltage provided to the gate when the second power switch 116 is to be in the on state. For example, a first side of the capacitor 142 can be coupled to an amplifier 132 (e.g., through the BST2 node or connection), such as to a positive voltage supply of an operational amplifier 132. A second side of the capacitor 142 can be coupled to the source of the second power switch 116. A voltage source 148 can be coupled to the capacitor 142 (e.g., to the first side thereof). A diode can be positioned to permit current to flow from the voltage source 148 to the capacitor 142 and/or to the amplifier 130, and to impede current from flowing the other direction to the voltage source 148. The diode can be replaced by a switch, as discussed herein. The second bootstrap capacitor 142 and associated circuitry can operate similar to the corresponding components of the embodiments discussed in connection with FIGS. 3 and 4A-B. When the third power switch 118 is on, the capacitor 142 can be charged (e.g., to $V_{cc}$) by current along a path from the voltage source 148, to the capacitor 142, through the third power switch 118, and to ground 124. When the second power switch 116 is on and the third power switch 118 is off, a voltage (e.g., ½ $V_{in}$) can be applied from the capacitor 122, through the second power switch 116, to the capacitor 142, which can increase the voltage (e.g., to ½ $V_{in}$+$V_{cc}$), and the increased voltage can be delivered to the amplifier 132 (e.g., through the BST2 node or connection) so that the amplifier 132 can apply the increased voltage to the gate of the second power switch 116 to keep the second power switch 116 on, as discussed herein.

In some embodiments, the second bootstrap capacitor 142 can charge the first bootstrap capacitor 140. For example, when in the third state of operation (e.g., FIG. 2C) the first bootstrap capacitor 140 can be coupled to the second bootstrap capacitor 142 so that the second bootstrap capacitor 142 charges the first bootstrap capacitor 140. When the second power switch 116 is on, current can flow between the CS1 node or location and the SW2 node or location, e.g., via the second power switch 116. Then in the first state of operation (e.g., FIG. 2A), the first bootstrap capacitor 140 can discharge to increase the voltage applied to the amplifier 130 so that the voltage delivered to the gate of the first power switch 114 is high enough to keep the first power switch on.

With reference to FIGS. 7 and 8, for example, the second bootstrap capacitor 142 (e.g., the first side thereof) can be coupled to the first bootstrap capacitor 140 (e.g., to the first side thereof). In some embodiments, a diode can permit current to flow from the second bootstrap capacitor 142 to the first bootstrap capacitor, and the diode can impede current flow in the other direction from the first bootstrap capacitor 140 to the second bootstrap capacitor 142. In some embodiments, the diode can be omitted. In some embodiments, a switch can be used instead of the diode, and the switch can be driven to be on when then first bootstrap capacitor 140 is to be charged (e.g., in the third state of operation, or when the second power switch 116 is on), and can be driven to be off when the first bootstrap capacitor 140 is to be discharged (e.g., in the first state of operation, or when the first power switch 114 is on). The drive signals HDrv1 and/or HDrv2 or some combination thereof can be used to control the switch in place of the diode between the capacitors 140 and 142.

In the third state of operation (e.g., FIG. 2C), the HDrv2 drive signal can be high and the second power switch 116 can be on. The voltage at the CS1 location and the SW2 location can be substantially equal (e.g., about ½ $V_{in}$). That voltage can be provided to the second bootstrap capacitor 142 (e.g., through the second power switch 116), and the capacitor 142 can increase the voltage (e.g., to about ½ $V_{in}$+$V_{cc}$), as discussed herein. The increased voltage can be used to keep the second power switch 116 on, as discussed herein, and the increased voltage can also be delivered to the first bootstrap capacitor 140 (e.g., to the first side thereof), to thereby charge the capacitor 140. By way of example, the voltage on the first side of the capacitor 140 can be about ½ $V_{in}$+$V_{cc}$, and the voltage on the second side of the capacitor 140 can be about ½ $V_{in}$ (e.g., provided from the capacitor 122, such as through CS1), and the capacitor 140 can be charged to a voltage of about $V_{cc}$. Thus, the second bootstrap capacitor 142 can be used to charge the first bootstrap capacitor 140, such as during the third state of operation (e.g., FIG. 2C).

Then, the first bootstrap capacitor 140 can be used to provide an elevated voltage for keeping the first power switch 114 on, such as during the first state of operation (e.g., FIG. 2A). When the first power switch 114 is on, the voltage from the input 102 (e.g., about $V_{in}$) can be provided through the first power switch 114 to the source of the first power switch 114, as well as to the first bootstrap capacitor 140 (e.g., second side thereof), and also to CS1 in some cases. The first bootstrap capacitor 140 can increase the voltage (e.g., to about $V_{in}$+$V_{cc}$), which can be provided to the amplifier 130 (e.g., through BST1). The increased voltage can be delivered to the gate of the first power switch 114, and can be sufficiently higher than the voltage at the source (e.g., by about $V_{cc}$) so that the first power switch 114 stays on.

With reference to FIG. 8, the voltage for the drive signal HDrv1 can be high for the first state of operation (e.g., to turn on the first power switch 114) and low for the second, third, and fourth states of operation (e.g., to turn off the first power switch 114). The voltage for the drive signal HDrv2 can be high for the third state of operation (e.g., to turn on the second power switch 116) and low for the first, second, and fourth states of operation (e.g., to turn off the second power switch 116). The voltage at BST1 can increase (e.g., to about $V_{in}$+$V_{cc}$) at the first state of operation. As discussed herein, the first bootstrap capacitor 140 can increase the voltage at BST1. The elevated voltage at BST1 can decrease over the course of the first state of operation, as the first bootstrap capacitor 140 partially discharges. At the second state of operation, the voltage at BST1 can drop. The voltage applied to the second side of the capacitor 140 can drop from about $V_{in}$ (e.g., applied from the input 102 through the first power switch 114) to about ½ $V_{in}$ (e.g., applied from the capacitor 122) due to the transition from the first state of operation to the second state of operation. During the second state of operation, the voltage of BST1 can be about ½ $V_{in}$+$V_{cc}$ minus the amount that capacitor 140 was discharged. During the third state of operation, the capacitor 140 can be charged up, such as to about ½ $V_{in}$+$V_{cc}$. During the third operational state, the capacitor 140 can recover the amount of charge that it lost during the first operational state. As discussed herein, the second bootstrap capacitor 142 can be used to charge up the first bootstrap capacitor 140, such as during the third state of operation. During the fourth state of operation, the voltage at BST1 can be about ½ $V_{in}$+$V_{cc}$.

The voltage at BST2 can be stable (e.g., about $V_{cc}$) during the first and second states of operation. BST2 can be coupled to the voltage source 148 that provides a voltage (e.g., of $V_{cc}$). At the third state of operation, the voltage at BST2 can increase (e.g., to about ½ $V_{in}$+$V_{cc}$). As discussed herein, the second bootstrap capacitor 142 can be used to provide an elevated voltage, such as during the third state of operation. The elevated voltage at BST2 can decrease over the course of the third state of operation, as the second bootstrap capacitor 142 partially discharges. At the fourth state of operation, the voltage at BST2 can decrease (e.g., to about $V_{cc}$). The voltage applied to the second side of the capacitor 142 can change from about ½ $V_{in}$ (e.g., applied from the capacitor 122 through the second power switch 116) to ground (e.g., applied through the third power switch 118) as a result of the transition from the third state of operation to the fourth state of operation.

The voltage as the location or node CS1 can increase (e.g., to about $V_{in}$) during the first state of operation. Voltage $V_{in}$ can be applied from the input 102, through the first power switch 114, to the location CS1 during the first state of operation. The voltage at CS1 can decrease (e.g., to about ½ $V_{in}$) at the second state of operation. The voltage at CS1 can be about ½ $V_{in}$ during the third and fourth states of operation.

The voltage at the location or node SW2 can be ground during the first, second, and fourth states of operation. When the third power switch 118 is on, the SW2 location can be coupled to ground. During the third state of operation, the third power switch 118 can be off, and SW2 can be coupled to the capacitor 122 through the second power switch 116. During the third state of operation, the voltage at SW2 can increase ½ $V_{in}$. In the third state of operation the voltages at SW2 can CS1 can be the same (e.g., coupled through the second power switch 116). When the second power switch 116 turns off and the third power switch turns on, at the fourth operational state, the voltage at SW2 can return to ground.

The voltage at the location SW1 (e.g., which can also be the voltage at CS2) can be ground during the second, third, and fourth states of operation. When the fourth power switch 120 is on, the SW1 and/or CS2 locations can be coupled to ground. During the first state of operation, the fourth power switch 120 can be off, and SW1 and/or CS2 can be increase (e.g., to about ½ $V_{in}$). In the third state of operation the voltages at SW2 and CS1 can be the same (e.g., coupled through the second power switch 116). When the fourth power switch 120 turns on again, e.g., at the second operational state, the voltage at SW1 and/or CS2 can return to ground.

The capacitor 122 can be between CS1 and CS2. During the first state of operation, the voltage between CS1 and CS2 can be about $V_{in}$–½ $V_{in}$, which equals about ½ $V_{in}$. During the second, third, and fourth states of operation, the voltage between CS1 and CS2 can be about ½ $V_{in}$–ground, which equals about ½ $V_{in}$. Accordingly, the voltage across the capacitor 122 can be about ½ $V_{in}$ during steady state operation of the power converter 100. In some cases, the capacitor 122 can be partially discharged during the third state of operation, and can be charged during the first state of operation.

FIG. 8 shows a voltage difference between BST1 (e.g., which can be the voltage applied through the amplifier 130 to the gate of the first power switch 114 when the drive signal HDrv1 is high) and CS1 (e.g., which can be the voltage at the source of the first power switch 114). The voltage difference between BST1 and CS1 can be about $V_{cc}$. During the first state of operation, the voltage difference between BST1 and CS1 can decrease as the capacitor 140 is partially discharged. During the third state of operation, the voltage difference between BST1 and CS1 can increase as the capacitor 140 is recharged. The voltage difference between BST1 (e.g., applied to the gate of power switch 114) and CS1 (e.g., at the source of the power switch 114) can be sufficiently high to keep the power switch 114 on.

FIG. 8 shows a voltage difference between BST2 (e.g., which can be the voltage applied through the amplifier 132 to the gate of the second power switch 116 when the drive signal HDrv2 is high) and SW2 (e.g., which can be the voltage at the source of the second power switch 116). The voltage difference between BST2 and SW2 can be about $V_{cc}$. During the third state of operation, the voltage difference between BST2 and SW2 can decrease as the capacitor 142 is partially discharged. During the fourth state of operation, the voltage difference between BST2 and SW2 can increase as the capacitor 142 is recharged. The voltage difference between BST2 (e.g., applied to the gate of power switch 116) and SW2 (e.g., at the source of the power switch 116) can be sufficiently high to keep the power switch 116 on.

The second bootstrap capacitor 142 can provide an elevated voltage for keeping the second power switch 116 on and to also charge the first bootstrap capacitor 140 at the same time. The second bootstrap capacitor 142 can be partially discharged by both of these functions. In some configurations, the second bootstrap capacitor 142 can be selected to have a larger capacitance than the first bootstrap capacitor 140, such as by about 20%, about 30%, about 40%, about 50%, about 60%, about 70%, about 80%, about 90%, about 100%, about 120%, about 150%, about 200%, or more, or any values or ranges therebetween, although other values could be used. The second bootstrap capacitor 142 can have sufficient capacity to replace the charge lost by the first bootstrap capacitor 140 (e.g., while keeping the first power switch 114 on) and provide charge to keep the second power switch 116 on, at the same time.

As discussed herein, in some embodiments, the integrated circuit 126 can include terminals for providing signals to or from one or both of the bootstrap capacitors 140, 142 (e.g., similar to how the external capacitor 122 can be coupled to the circuitry of the integrated circuit via the terminals CS1 and CS2). For example, the first bootstrap capacitor 140 can be coupled between the BST1 and CS1 terminals. The second bootstrap capacitor 142 can be coupled between the BST2 and SW2 terminals. The first bootstrap capacitor 140 and/or the second bootstrap capacitor 142 can be external to the integrated circuit 126, which can enable the use of bootstrap capacitors 140 and/or 142 that have sufficient capacitance and/or size to hold the associated power switches 114 and/or 116 on, as discussed herein.

Internal Bootstrap Capacitor Embodiments

In some embodiments, the power converter 100 can include a bootstrap circuit inside the integrated circuit (IC), which can also include the first power switch 114, the second power switch 116, the third power switch 118, the fourth power switch 120. In some embodiments, the IC can also include the driver controller 128, the amplifiers 130, 132, 134, and 136, the PWM pulse generator 138, or any combinations thereof, and other components of the power converter 100, as discussed herein. The one or more bootstrap capacitors 140 and/or 142 can be made from the same silicon and can reside on the same silicon chip as the corresponding power switches 114 and/or 116, or other semiconductor chip, or other components discussed herein. For example, an integrated circuit 126 similar to FIG. 3 can include one or more bootstrap capacitors 140, 142. In some implementations, because space is limited in the IC, the one or more bootstrap capacitors 140, 142 that are internal to the IC would need to be sufficiently small to fit into the IC, which can limit the amount of capacitance for the internal bootstrap capacitor(s) 140, 142.

In some cases, the internal bootstrap capacitor(s) 140 and/or 142 does not store enough energy to maintain the elevated voltage for the full time that the corresponding power switch(es) 114 and/or 116 are on. The bootstrap capacitor 140 or 142 can be used to provide an elevated voltage to turn on the corresponding power switch 114 or 116, and the bootstrap capacitor 140 or 142 can then be disconnected from the power switch 114 or 116. The capacitance that is internal to the power switch 114 or 116 can maintain the power switch 114 or 116 in the on (e.g., conductive) state for the remainder of the time appropriate for the state of operation.

Figure 9:
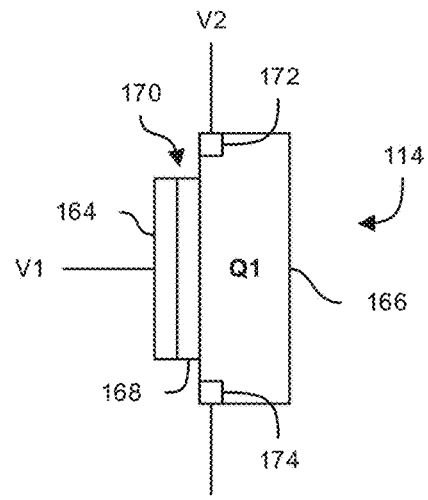
FIG. 9 shows an example embodiment of a power switch with an internal capacitance.

With reference to FIG. 9, the power switch 114 can be a FET (e.g., an N-channel MOSFET) that has an internal capacitance, such as an internal gate capacitance. Although the first power switch 114 is shown in FIG. 9, the second power switch 116 can be similar and can have an internal gate capacitance. The power switch 114 can have a gate portion 164 that is separated from a body portion 166 by an insulating (e.g., dielectric) layer 168, which can form a gate capacitor 170. The power switch 114 can also have a drain portion 172 and a source portion 174. In some cases, the gate capacitance can be between the gate portion 164 and the source portion 174. By way of example, when a voltage is applied to the gate portion 164 of the power switch 114, the internal gate capacitor 170 can first charge up, and then after the gate capacitor 170 is charged, the gate voltage can increase. Then, when the gate voltage increases to a threshold amount (e.g., relative to the source voltage at the source portion 174), the power switch 114 can turn on (e.g., to provide conductivity between the drain portion 172 and the source portion 174). Accordingly, the actual activation of the power switch 114 can be delayed slightly from the time that the elevated voltage is applied to the gate, while the internal gate capacitor 170 of the switch 114 charges.

As discussed herein, a bootstrap capacitor 140 can be used to apply an elevated first voltage V1 to the gate portion 164 of the power switch 114. The elevated voltage V1 can be applied for sufficient time for the gate capacitor 170 to be charged to the level of the elevated voltage V1 (e.g., substantially to saturation). The gate voltage can increase to a threshold level above the source voltage (e.g., to the elevated first voltage V1), and the power switch 114 can turn on, which can enable a second voltage V2 to pass through the power switch 114 from the drain portion 172 to the source portion 174. The source portion 174 can then have a voltage level of the second voltage V2. The elevated first voltage V1 can be sufficiently higher than the second voltage V2 (e.g., due to the bootstrap capacitor 140, in some embodiments) so that the power switch 114 can be in the on (e.g., conductive) state. The gate portion 164 can then be disconnected from the elevated first voltage V1. For a time, the charge stored on the gate capacitor 170 can keep the gate voltage elevated above the first voltage V1 sufficiently to keep the power switch 114 on. The amount of time that the gate capacitor 170 can keep the power switch 114 on can depend on the amount of charge stored on the gate capacitor 170 (e.g., its capacitance and the level of the elevated first voltage V1), and the rate at which the charge on the gate capacitor 170 is dissipated after being disconnected from the first voltage V1. The power converter 100 (e.g., the integrated circuit 126 thereof) can be configured so that the gate capacitor 170 of the power switch 114 can keep the power switch 114 on for long enough to satisfy the duration of the first state of operation (e.g., FIG. 2A). For example, when disconnected from the elevated first voltage V1, the gate portion 164 can be coupled to a lower voltage through a resistor with enough resistance to produce a low enough discharge current from the gate capacitor 170, that the gate capacitor 170 can retain enough charge for long enough to keep the power switch 114 on during the first state of operation (e.g., FIG. 2A). When it is time to turn off the power switch 114 (e.g., when transitioning to the second state of operation of FIG. 2B), the gate capacitor 170 can be discharged, such as by coupling the gate portion 164 to a lower voltage or ground. The power switch 116 can operate similarly, such as during the third state of operation (e.g., FIG. 2C).

Figure 10:
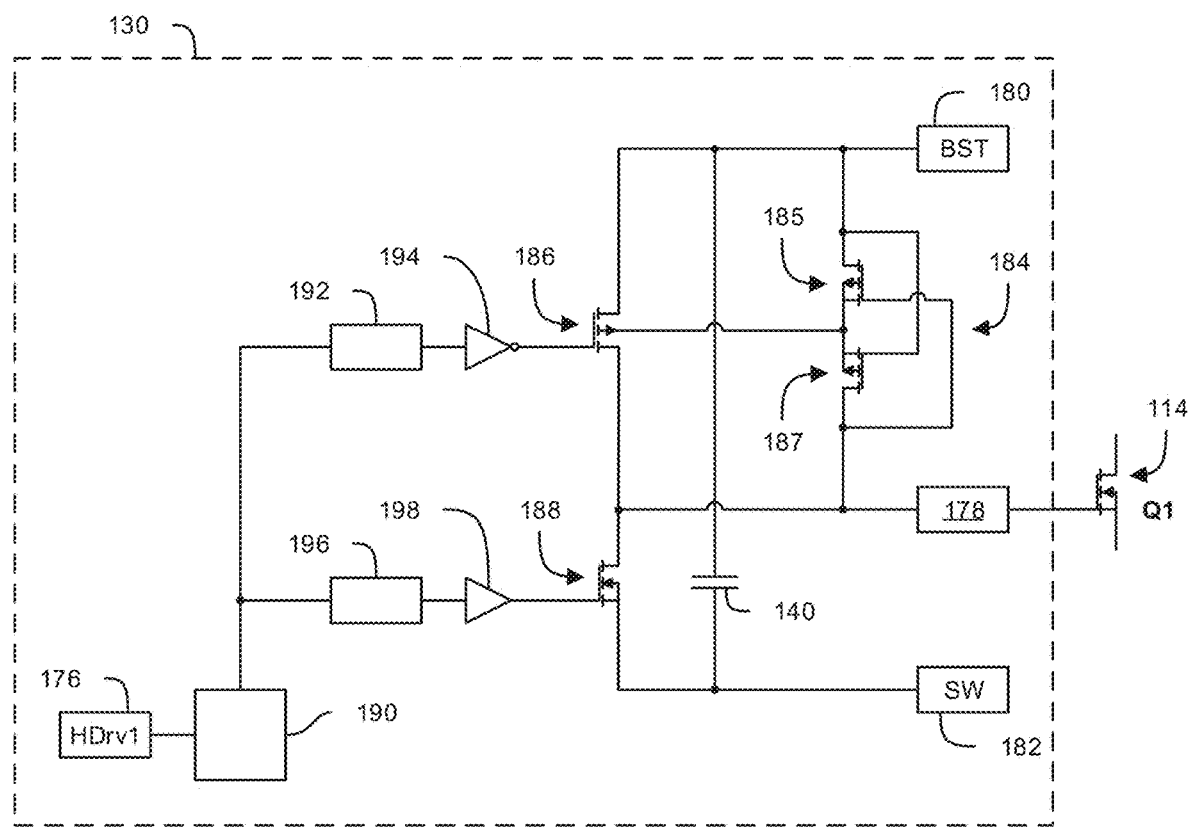
FIG. 10 shows an example embodiment of circuitry for operating a power switch using a bootstrap capacitor.

FIG. 10 shows an example embodiment of a circuit for controlling or driving the first power switch 114, and the second power switch 116 can also be controlled or driven similarly. For example, the circuit of FIG. 10 can be the corresponding amplifier 130 that is discussed herein. The amplifier 130 can be an operational amplifier. The circuit can receive an input 176, which can be a drive signal (e.g., HDrv1), such as from a driver controller 128. The circuit can have output 178 for sending a signal to control the power switch 114 (Q1), such as to the gate of the switch 114. The circuit can include a positive or high voltage supply 180, which can be coupled to a bootstrap supply voltage node (BST) (e.g., BST1). The circuit can include a negative or low voltage supply 182, which in some cases can be coupled to a switching node (SW) (e.g., CS1, SW1, or SW2). A bootstrap capacitor 140 can be coupled between the positive or high voltage supply 180 (e.g., BST) and the negative or low voltage supply 182 (e.g., SW). The bootstrap capacitor 140 can be an integrated part of the amplifier 130, or in some cases, the bootstrap capacitor 140 can be external to the amplifier 130, but still coupled between the high and low voltage supplies 180 and 182. The bootstrap capacitor 140 can be part of the same IC as the amplifier 130, or in some cases could be an external bootstrap capacitor 140.

The circuit can include a pull-up switch 186, which can be coupled between the positive or high voltage supply 180 (e.g., BST) and the output 178, and a pull-down switch 188, which can be coupled between the negative or low voltage supply 182 (e.g., SW) and the output 178. When the pull-up switch 186 is on (e.g., and the pull-down switch 188 is off), the output 178 can be coupled to the positive or high voltage supply 180 (e.g., BST), which can send a high output signal via the output 178 to the power switch 114. When the pull-down switch 188 is on (e.g., and the pull-up switch 186 is off), the output 178 can be coupled to the negative or low voltage supply 182 (e.g., SW), which can send a low output signal via the output 178 to the power switch 114. Turning on the pull-up switch 186 can turn on the power switch 114, and turning on the pull-down switch 188 can turn off the power switch 114. In some embodiments, the pull-up switch 186 and/or the pull-down switch 188 can be be MOSFETs, or other FETs, or any other suitable type of transistor or other switch type. By way of example, the pull-up switch 186 can be a P-channel MOSFET, and the pull-down switch 188 can be an N-channel MOSFET, although other configurations and switch types can be used. For example, the pull-up switch 186 can be an N-channel MOSFET, and the pull-down switch 188 can be a P-channel MOSFET, for example, different (e.g., inverted) drive signals are provided to the switches 186, 188. The pull-up switch 186 and the pull-down switch 188 can be the same type of switch, and the drive circuitry can be configured to provide appropriate drive signals to operate the switches 186 and 188 as disclosed herein.

In some embodiments, the circuit can include a level shifter 190, a pull-up drive signal generator 192, an amplifier 194, a pull-down drive signal generator 196, and an amplifier 198. The level shifter 190 can be used to modify the signal provided at the input 176 (e.g., HDrv1), such as by shifting the level of the voltage signals, although in some configurations the level shifter 190 can be omitted or used differently. For example, the level shifter 190 can adjust the input signals so that they are appropriate for the pull-up drive signal generator 192, amplifier 194, pull-down drive signal generator 196, and/or amplifier 198. The pull-up drive signal generator 192 can receive the input signals, such as from the input 176 or the level shifter 190, and the pull-up drive signal generator 192 can output a signal for controlling the pull-up switch 186. The amplifier 194 can amplify the signal from the pull-up drive signal generator 192 (e.g., which can be a logic signal) so that it has sufficient voltage for operating the pull-up switch 186. The pull-down drive signal generator 196 can receive the input signals, such as from the input 176 or the level shifter 190, and the pull-down drive signal generator 196 can output a signal for controlling the pull-down switch 188. The amplifier 198 can amplify the signal from the pull-down drive signal generator 196 (e.g., which can be a logic signal) so that it has sufficient voltage for operating the pull-down switch 188. The amplifiers 194 and 198 can be operational amplifiers. An inverter can be used (e.g., in connection with the amplifier 194), which can cause different signals to be provided to the pull-up switch 186 and the pull-down switch 188. Many variations are possible. For example, the amplifier 198 can include the inverter instead of the amplifier 194, or neither or both of the amplifiers 194 and 198 can include inverters, for example depending on the types of switches 186 and 188 used and the operation of the drive signal generators 192 and 196. Various components can be rearranged, or in some cases omitted. The drive signal generators 192 and 196 can output sufficient voltage to operate the corresponding switches 186 and 188. The signals could be amplified (e.g., by amplifiers 194 and 198, or a common amplifier) before being delivered to the drive signal generators 192 and 196.

The pull-up switch 186 can have its well isolated and connected to a well switch 184. The well switch 184 can include a first switch 185 and a second switch 187, which can be MOSFETs, or other FETs, or any other suitable type of transistor or other switch type. By way of example, the switches 185 and 187 can be a P-channel FETs (e.g., MOSFETs). The drain of the first switch 185 can be coupled to the high voltage supply 180 (e.g., the BST signal), the source of the first switch 185 can be coupled to the well of the pull-up switch 186, and the gate of the first switch 185 can be coupled to the output signal 178. The drain of the second switch 187 can be coupled to the output signal 178, the source of the second switch 187 can be coupled to the well of the pull-up switch 186, and the gate of the second switch 187 can be coupled to the high voltage supply 180 (e.g., the BST signal). The first and second switches 185, 187 can select the higher voltage signal between the high voltage supply 180 (e.g., the BST signal) and the output signal 178, and can supply the higher voltage signal to the well of the pull-up switch 186. The well switch 184 can bias the well of the switch 186 to the higher of the two voltage signals 178 and 180. This configuration can impede the gate capacitance of switch 114 from unintentionally discharging. If the well and source of switch 186 were shorted and the well switch 184 were omitted, then even when the switch 186 is off, the body diode formed by the source and well of the switch 186 could let the voltage held on the gate capacitance of power device 114 discharge.

Figure 11:
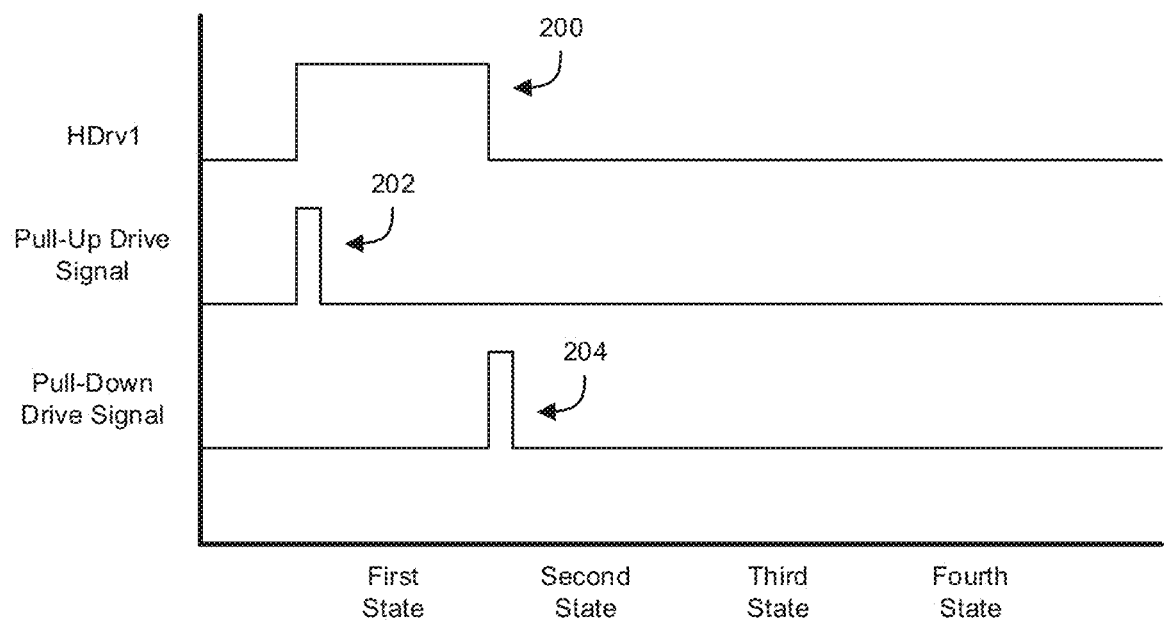
FIG. 11 shows the values for various signals during operation of a first power switch in an example embodiment of a power converter.

FIG. 11 shows signals associated with example embodiments of a pull-up drive signal generator 192 and a pull-down drive signal generator 196, such as for controlling a first power switch 114. The drive signal (e.g., HDrv1) can be a high signal 200 at the first state of operation, and low for the second, third, and fourth states of operation. The pull-up drive signal generator 192 can produce a low output signal in response to a low input signal (e.g., low HDrv1). In the embodiment of FIG. 11, the pull-up drive signal generator 192 can produce a pulse 202 of a high signal in response to the transition from a low input signal to a high input signal (e.g., the rising edge of HDrv1). The high output pulse 202 from the pull-up drive signal generator can turn on the pull-up switch 186. Rather than keep the pull-up switch 186 on during the full time of the high drive signal HDrv1 200 (as can be done in some other embodiments described herein, such as those having larger external bootstrap capacitor(s)), in the embodiment of FIG. 11, the pull-up drive signal generator 192 can complete the high signal pulse 202 and drop the output to a low signal while the drive signal HDrv1 is still high. The high signal pulse 202 can last for a sufficient time to charge the associated power switch 114, 116 (Q1 or Q2) to the appropriate level.

The pull-down drive signal generator 196 can produce a low signal while the drive signal HDrv1 is high (e.g., during the first state of operation). When the drive signal (e.g., HDrv1) transitions from the high signal 200 to a low signal (e.g., for the transition from the first state of operation to the second state of operation), the pull-down drive signal generator 196 can produce a high output signal pulse 204, which can turn on the pull-down switch 188. Rather than keep the pull-down switch 186 on during the full time that the drive signal HDrv1 is low (which could be done in some embodiments), in the embodiment of FIG. 11, the pull-down drive signal generator 196 can complete the high signal pulse 204 and drop the output to a low signal while the drive signal HDrv1 is still low. In some cases, the high output pulse 204 from the pull-down drive signal generator 196 can be similar to the high output pulse 202 from the pull-up drive signal generator 192, except that it occurs at a different time and location. Many variations are possible. The high and low signals could be inverted depending on the types of switches or other components used. In some implementations, the pull-down drive signal can be held high for a longer time (e.g., for the full second state of operation, or for the full time that the HDrv1 signal is low).

The bootstrap capacitor 140 can be charged up before the drive signal (e.g., HDrv1) goes high (e.g., before the first state of operation at the far left side of FIG. 11). The states can repeat, and the bootstrap capacitor 140 can be charged up in a previous fourth state of operation or other previous state. The bootstrap capacitor 140 can charge up when current flows from the BST node (e.g., at the high voltage supply 180) to the bootstrap capacitor 140, and from the bootstrap capacitor 140 to the SW node (e.g., the low voltage supply 182). By way of example, the low voltage supply 182 (e.g., SW node) can be coupled to ground (or to some other relatively low voltage), and the high voltage supply 180 (e.g., BST) can be coupled to $V_{cc}$ (or some other relatively high voltage), which can cause the bootstrap capacitor 140 to charge up (e.g., to about $V_{cc}$). The first side of the bootstrap capacitor 140 can be at a higher voltage (e.g., about $V_{cc}$) can the second side of the bootstrap capacitor (e.g., about ground). The pull-up switch 186 can be off while the bootstrap capacitor 140 charges up. The pull-down switch 188 can be off while the bootstrap capacitor 140 charges up. In some situations, the pull-down switch 188 could be on while the bootstrap capacitor 140 charges up. The power switch 114 can be off (e.g., during the second, third, or forth states of operation discussed herein) when the bootstrap capacitor 140 charges up. The bootstrap capacitor 140 can be an internal component of the IC (e.g., of the amplifier 130).

When the drive signal (e.g., HDrv1) goes to a high signal 200, the pull-up drive signal generator 192 can produce a high signal pulse 202 that can turn on the pull-up switch 186. When the pull-up switch 186 is on, it can connect the high voltage supply (e.g., BST, which can have a voltage of about ½ $V_{in}$+$V_{cc}$ at this time) to the gate of the power switch 114.

Since the gate of the power switch 114 is higher than the source (which can be ½ $V_{in}$ at this time), the power switch 114 can turn on. In some cases, the gate capacitor 170 can be charged to a first voltage (e.g., about ½ $V_{in}$+$V_{cc}$), such as when the power switch 114 turns on. When the power switch 114 is on, the bootstrap capacitor 140 can discharge to provide an elevated voltage to the gate of the power switch 114. In some cases, the source of the power switch 114 can be coupled to the low voltage supply 182 (e.g., SW). When the power switch 114 is on, a voltage (e.g., about $V_{in}$) can pass from the drain to the source. The second side of the bootstrap capacitor 140 can be provided with a voltage (e.g., about $V_{in}$, such as from the source of the power switch 114), which can cause the bootstrap capacitor 140 to discharge, thereby elevating the voltage (e.g., by about $V_{cc}$ since that was the voltage that the bootstrap capacitor was charged to). The elevated voltage (e.g., about $V_{in}$+$V_{cc}$) can be delivered through the pull-up switch 186 to the gate of the power switch 114. The gate capacitor 170 of the power switch 114 can be charged to the elevated voltage level (e.g., about $V_{in}$+$V_{cc}$). In some cases, the gate voltage can be raised to the elevated voltage, which can keep the power switch 114 on for a time (e.g., since the elevated gate voltage of about $V_{in}$+$V_{cc}$ is higher than the source voltage of about $V_{in}$).

Rather than keep the pull-up switch 186 on during the full time that the first power switch 114 is to be on (e.g., during the first state of operation), the high output pulse 202 provided to the pull-up switch 186 can end while the drive signal (e.g., HDrv1) is still a high signal 200, as shown in FIG. 11. When the high output pulse 202 ends, the lower signal provided to the pull-up switch 186 can turn off the pull-up switch 186. During the time between the end of the pulse 202 and the end of the drive signal 200, the pull-up switch 186 and the pull-down switch 188 can be off. The charge that was previously delivered to the gate of the power switch 114 (e.g., to charge up the gate capacitor 170) can be substantially isolated or held in the power switch 114 during this time. Since the power switch 114 is only intended to be on for a short amount of time, the charge stored on the gate capacitor 170 can be sufficient to keep the power switch 114 on for the intended time.

Various elements of the power converter 100 can be configured to enable the internal gate capacitance to hold the power switch 114 on long enough (e.g., during the first state of operation). For example, the power switch 114 can be configured to have sufficient gate capacitance, the bootstrap capacitor 140 can have sufficient capacitance, and the elevated voltage can be sufficiently elevated (e.g., a high enough $V_{cc}$ value), and/or the high output pulse 202 can be long enough to sufficiently charge the gate capacitor 170, to enable the power switch 114 to remain on for sufficient time, as described herein. Various different values can be used for these components or features, depending on the particular configuration. In some cases, the gate of the power switch 114 can be initially charged to a voltage that is elevated (e.g., over the source voltage) by at least about 1 volt, about 1.5 volts, about 2 volts, about 2.5 volts, about 3 volts, about 3.5 volts, about 4 volts, about 4.5 volts, about 5 volts, about 5.5 volts, about 6 volts, about 6.5 volts, about 7 volts, or more, to have sufficient charge to keep the power switch 114 on (e.g., during the first state of operation), or any values or ranges therebetween, although other values could be used, such as depending various factors so that the voltage is high enough to turn on the power switch 114 to the desired strength for the desired period of time. The elevated gate voltage can drop over time after the pull-up switch 186 is turned off, but since the power switch 114 only stays on for a short time, the internal capacitance of the gate can be sufficient.

When the drive signal HDrv1 transitions to a low signal, the pull-down drive signal generator 196 can produce a high signal (e.g., the high signal pulse 204 in FIG. 11), which can turn on the pull-down switch 188. The pull-down switch 188 can couple the gate of the power switch 114 to a relatively low voltage source, such as the low voltage supply 182 (e.g., SW). Some or all of the remaining charge on the gate of the power switch 114 can be discharged by a current through the pull-down switch 188. Once, the gate voltage of the power switch 114 has dropped to within a threshold of the source voltage, the power switch 114 can turn off. In some cases, the gate capacitor 170 can be discharged to ground or to some voltage that is sufficiently low to turn off the power switch 114.

In some embodiments, the high signal pulse 204 for turning on the pull-down switch 188 can turn off after a short period of time. The pull-down switch 188 can be on for a sufficient amount of time to discharge the gate of the power switch 114 enough to turn off the power switch 114, without fully discharging the gate capacitor 170. Thus, the gate capacitor 170 can be more quickly charged up during the next time the pull-up switch 186 is on. In some embodiments, the pull down switch 188 can be pulsed on by the high signal pulse 204. In other embodiments, the pull down switch 188 can be held on for a longer time. The pull down switch 188 can be on (e.g., pulsed or otherwise) for a sufficient amount of time for the gate charge to be depleted from the power switch 114 to a level that is low enough to completely turn off the power switch 114. Once the power switch 114 is off, the bootstrap capacitor voltage may continue to deplete without adversely affecting operation. In some cases, the pull-down switch 188 can be held on for a longer time (e.g., for the full second state, or for the full second, third, and fourth states, or any time therebetween), which can discharge the gate capacitor 170 more completely. The duration of the pulses 202 and/or 204 can be determined by feedback. For example, when the pulse 202 is high and the pull-up switch 186 is on, the gate voltage is can increase, and the system can turn off the pulse 202 when the gate voltage is above a threshold voltage. When the pulse 204 is high and the pull-down switch 188 is on, the gate voltage can decrease, and the system can turn off the pulse 204 when the gate voltage is below a threshold voltage. For example, the pulse 202 can end (e.g., which can stop the discharging of the gate capacitor 170) when the voltage of the output 178 equals the voltage at the source of the first power switch 114. In some embodiments, the duration of the pulses 202 and/or 204 can be defined by a timer (e.g., set time durations).

In some cases the pull-down switch 188 is not pulsed on. For example, the bootstrap capacitor voltage can be depleted, which can cause the waveform to appear as though it is being pulsed. In some embodiments, the bootstrap capacitor 140 would not become depleted, such as for some embodiments where the bootstrap capacitor 140 is charged during the second, third, and fourth states of operation (e.g., see FIG. 5). In some embodiments (e.g., FIG. 7), the bootstrap capacitor 140 is only charged during the third state of operation, and can become depleted. In some cases, there can be additional circuits or components that are powered using the bootstrap capacitor 140 (e.g., the level shifter). During both the first and second states, these circuits can discharge the bootstrap capacitor 140. The bootstrap capacitor 140 can be selected to have sufficient charge to charge up the gate of the power switch 114 in the first state of operation, to provide additional charge to other circuits in the first state, and to discharge the gate of the power switch 114 in the second state. During the remainder of the second state, it can be acceptable for the bootstrap capacitor 140 to discharge as the gate of power switch 114 has already been discharged. The functionality can be similar but somewhat different for operation of second power switch 116. For the second power switch 116, as soon as the fourth state of operation is entered, the bootstrap capacitor 142 will be recharged, thus preventing any further discharging of the bootstrap capacitor 142.

When the power switch 114 is off, the bootstrap capacitor 140 can be recharged. For example, the low voltage supply 182 can be coupled to the source of the power switch 114, and can be ground (or some other relatively low voltage) when the power switch 114 is off. The higher voltage (e.g., from BST) on the first side of the capacitor 140 and the lower voltage (e.g., from SW) on the second side of the capacitor 140 can cause the bootstrap capacitor 140 to charge up. Since the bootstrap capacitor 140 is used to charge up the internal gate capacitor 170 of the power switch 114, a relatively low capacity bootstrap capacitor 140 can be used, and the bootstrap capacitor 140 can be small enough to be incorporated into the IC. In some cases, the bootstrap capacitor 140 can have sufficient capacitance that is holds its voltage enough that it does not need to be recharged after each time it charges up the gate capacitor 170 of the power switch 114.

Charging of the gate capacitor 170 of the first power switch 114 can be triggered by the rising edge of the drive signal (e.g., HDrv1). The bootstrap capacitor 140 can elevate the charge on the gate capacitor 170 so that the charge on the gate capacitor 170 can keep the power switch 114 on (e.g., during the remainder of the first state of operation). Discharging of the gate capacitor 170 of the first power switch 114 can be triggered by the falling edge of the drive signal (e.g., HDrv1). The bootstrap capacitor 170 can have relatively low capacity and small size, and can be incorporated into the IC, because in some cases it only has to charge up the gate capacitor 170 of the power switch 114. This approach can work, in some cases because of the low parasitics in the system. In some cases, if an external bootstrap capacitor were used, it would need to have a larger capacitance (e.g., larger size) so that it could have more charge and overcome the higher parasitics associated with using the external capacitor. Using a bootstrap capacitor that is internal to the IC can yield lower parasitics, which can enable the use of a smaller capacitor, which can enable the capacitor to be integrated into the IC.

Many variations are possible, for example, in some embodiments, the pull-up switch 186 can be held on during the time that the power switch 114 is to be on (e.g., during the first state of operation for the first power switch 114), or the pull-down switch 188 could be held on during the time that the power switch 114 is to be off.

In some embodiments, the second power switch 116 can be controlled in a manner similar to the first power switch 114, for example as discussed in connection with FIGS. 9, 10, and 11. A circuit similar to FIG. 10 can be used to control the second power switch 116. For controlling the first power switch 114, the input can be HDrv1, the high voltage supply 180 can be BST1, the low voltage supply 182 can be CS1, the bootstrap capacitor can be capacitor 140, and the output 178 can be coupled to the gate of the first power switch 114. By comparison, for controlling the second power switch 116, the input 176 can be HDrv2, the high voltage supply 180 can be BST2, the low voltage supply 182 can be SW2, the bootstrap capacitor can be capacitor 142, and the output 178 can be coupled to the gate of the second power switch 116.

Figure 12:
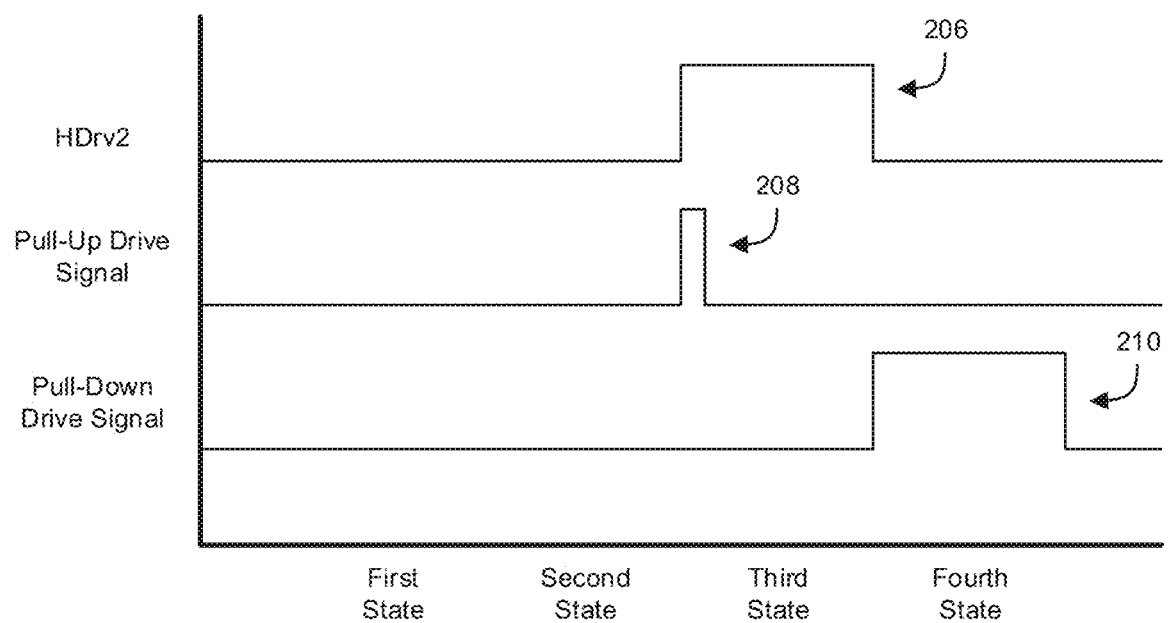
FIG. 12 shows the values for various signals during operation of a second power switch in an example embodiment of a power converter.

FIG. 12 shows signals associated with example embodiments of a pull-up drive signal generator and a pull-down drive signal generator, such as for controlling a second power switch 116. The drive signal (e.g., HDrv2) can be a high signal 206 at the third state of operation, and low for the first, second, and fourth states of operation. The pull-up drive signal generator 192 can produce a low output signal in response to a low input signal (e.g., low HDrv2). In the embodiment of FIG. 12, the pull-up drive signal generator 192 can produce a pulse 208 of a high signal in response to the transition from a low input signal to a high input signal 206 (e.g., the rising edge of HDrv2). The high output pulse 208 from the pull-up drive signal generator can turn on the pull-up switch 186. Rather than keep the pull-up switch 186 on during the full time of the high drive signal HDrv2 206 (as can be done in some other embodiments), in the embodiment of FIG. 12, the pull-up drive signal generator 192 can end the high signal pulse 208 and drop the output to a low signal while the drive signal HDrv2 is still high. The high signal pulse 208 can have durations similar to the discussion herein relating to the high signal pulse 208, and can last for a percentage of the high drive signal HDrv2 similar to the discussion relating to the pulse 202.

The pull-down drive signal generator 196 can produce a low signal while the drive signal HDrv2 is high (e.g., during the third state of operation). When the drive signal (e.g., HDrv2) transitions from the high signal 208 to a low signal (e.g., for the transition from the third state of operation to the fourth state of operation), the pull-down drive signal generator 196 can produce a high output signal 210, which can turn on the pull-down switch 188. In the embodiment of FIG. 12, the pull-down switch 188 can be held on (e.g., during the fourth state of operation). The high output signal 210 can last for the fourth state of operation. For example, the transition to the first state of operation can cause the high output signal 210 to end, and the pull-down switch 188 to turn off. The high output signal 210 can last for different amounts of times in other embodiments, such as for a short pulse similar to the pulse 204, or for the full time that the second power switch is off (e.g., during the fourth, first, and second states of operation), or any amounts of time therebetween. In some embodiments, the bootstrap capacitor 142 can charge during the fourth state of operation, and will not deplete any further than it was at the end of the third state of operation. The second power switch 116 can be biased properly in the fourth state of operation because the switches 186 and 188 are biased properly.

The bootstrap capacitor 142 can be charged while the second power switch 116 is off, and can be discharged to elevate the voltage provided to the gate of the power switch 116 to charge up the internal gate capacitor 170 of the second power switch 116, similar to the discussion relating to FIGS. 9, 10, and 11. The charge on the gate capacitor 170 of the second power switch 116 can keep the second power switch 116 on for a time (e.g., during the third state of operation), and the gate capacitor 170 can be discharged to turn the second power switch 116 off, similar to the discussion relating to FIGS. 9, 10, and 11. Charging of the gate capacitor 170 of the second power switch 116 can be triggered by the rising edge of the drive signal (e.g., HDrv2). The charge on the gate capacitor 170 can keep the power switch 116 on (e.g., during the remainder of the third state of operation). Discharging of the gate capacitor 170 of the second power switch 116 can be triggered by the falling edge of the drive signal (e.g., HDrv2). The gate of the second power switch 116 can be held low (e.g., such as during the fourth state of operation or longer).

In some cases, a shared bootstrap capacitor can be used for both the first and second power switches 114 and 116, for example, since the first and second power switches 114 and 116 can be on at different times. The shared bootstrap capacitor can be used to turn on the first power switch 114 during a first state of operation (e.g., FIG. 2A), can be used to turn on the second power switch 114 during a third state of operation (e.g., FIG. 2C), and can be charged during one or both of the second and fourth states of operation (e.g., FIGS. 2B and 2D). A shared bootstrap capacitor could be used with a suitable isolation approach and sufficient time in the second and fourth states to charge the shared bootstrap capacitor.

Current Sensing

In some embodiments, the power converter 100 can perform current sensing. In some embodiments, the power converter 100 can include a communication output that can be used to output information about the current through the power converter 100. The power converter 100 can measure current on each channel and can report out the current information (e.g., when requested). The current reporting can be of either channel, or both channels individually, or the sum of both channels, or the average of both channels, or the total current through the power converter, or the output current from the power converter 100. The channels can correspond to current associated with the two inductors 110 (e.g., first channel of current) and 112 (e.g., second channel of current).

Figure 13:
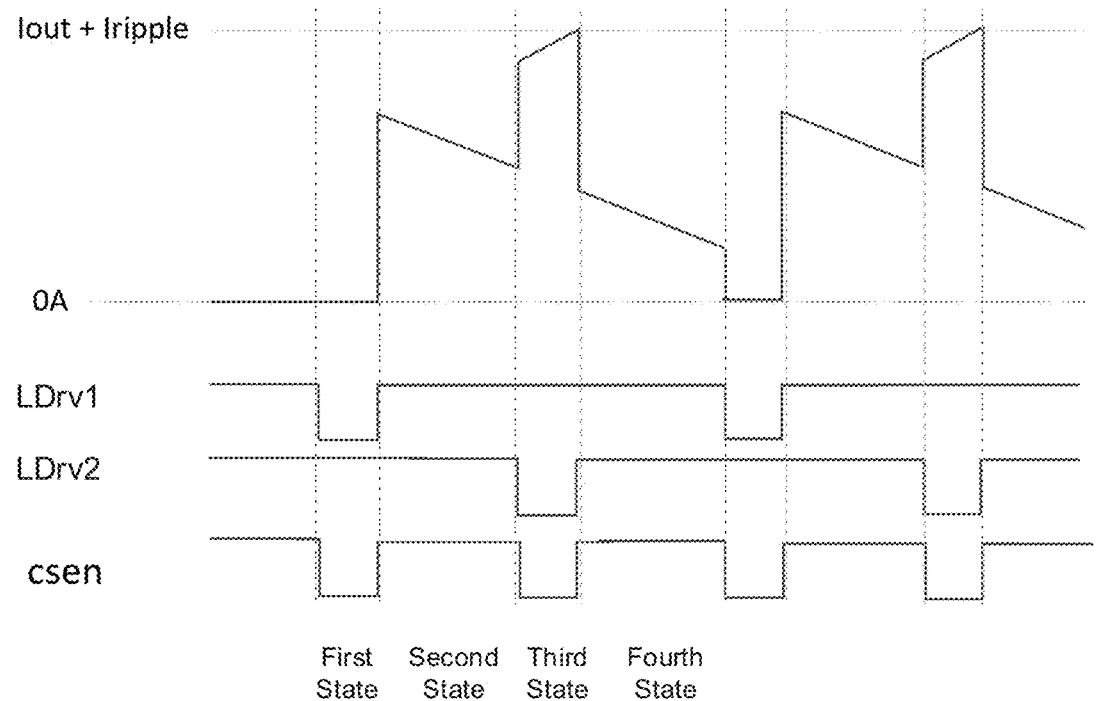
FIG. 13 shows the values for current and various other signals during operation of an example embodiment of a power converter.

For the AC coupled power converters, the shape of the current can be different from some other power converters. FIG. 13 shows an example current shape for an embodiment of an AC coupled power converter (e.g., current through the fourth power switch 120). FIG. 13 also shows signals for other components in the AC coupled power converter. In the AC coupled power converter of FIG. 13, during the first state of operation, the first power switch 114 and the third power switch 118 can be on, and the current through power switch 120 will be about 0 amps because it is off. At the second state of operation, the third power switch 118 and the fourth power switch 120 can be on, and the current can jump to a first value and then decay over time. At the third state of operation, the second power switch 116 and the fourth power switch 120 can be on, which can cause the current to jump to a second, higher value and then increase over time to a third, even higher value. At the fourth state of operation, the third power switch 118 and the fourth power switch 120 can be on, which can cause the current to drop and then decay over time (e.g., at approximately the same pace or slope at during the second state of operation). Then the power converter 100 can return to the first state of operation, and the current can drop (e.g., to about zero amps).

Figure 14:
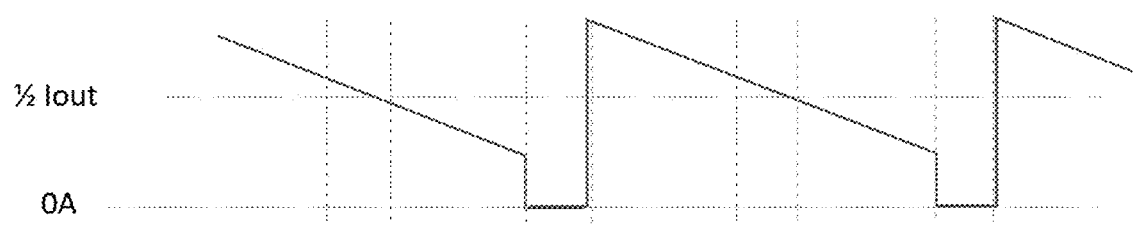
FIG. 14 shows the values for current during operation of an example embodiment of a power converter.

The currents in FIGS. 13 and 14 are not the inductor currents, and thus do not directly represent the output current. FIG. 13 shows the current through power switch 120, while FIG. 14 shows the current through power switch 118. The inductor currents (e.g., whose sum is the output current) are being sensed individually by monitoring the current through the third and fourth power switches 118 and 120. Aside from the third state of operation, the current through power switch 120 can look like a non-AC coupled converter. There is no current sensed in the first state of operation, because power switch 120 is off. During the second and fourth state of operation, the sensed current is equal to the inductor current. During the third state of operation, however, due to the AC-coupled architecture, the current through the power switch 120 is the sum of both inductor 110 current and inductor 112 current. This is because power switch 120 is delivering both inductor 110 current, and is also delivering the current for inductor 112 via flying capacitor 122 and power switch 116.

In FIG. 13, the signal labeled "csen" shows when current sensing is enabled, in some embodiments. For example, the current sensing can be enabled during the second state of operation and during the fourth state of operation, but not during the first state of operation or during the third state of operation. For example, current sensing can be enabled when the low drive signals LDrv1 and LDrv2 are both high, or when both of the third and fourth power switches 118 and 120 are on. The current sensing can be enabled after, such as a short time (e.g., about 1 ns to 10 ns, or about 5 ns, or any other suitable time) after, one of the low drive signals LDrv1 or LDrv2 goes high, and current sensing can be disabled before, such as a short time (e.g., about 1 ns to 10 ns, or about 5 ns, or about 2 ns, or any other suitable time) before, one of the low drive signals LDrv1 or LDrv2 goes low.

FIG. 14, by comparison, shows an example current shape for the current flowing through the third power switch 118. In FIG. 14, the current can jump up to a first value, and then decay over time, and the current can then drop (e.g., to about zero amps), and the pattern can repeat. The current of the power converter in FIG. 14 does not jump a second time up to the second current value or increase to the third current value, as in FIG. 13. For the AC-coupled architecture, the current through the power switch 118 can look similar to or the same as the current through a non-AC coupled power converter.

Figure 15:
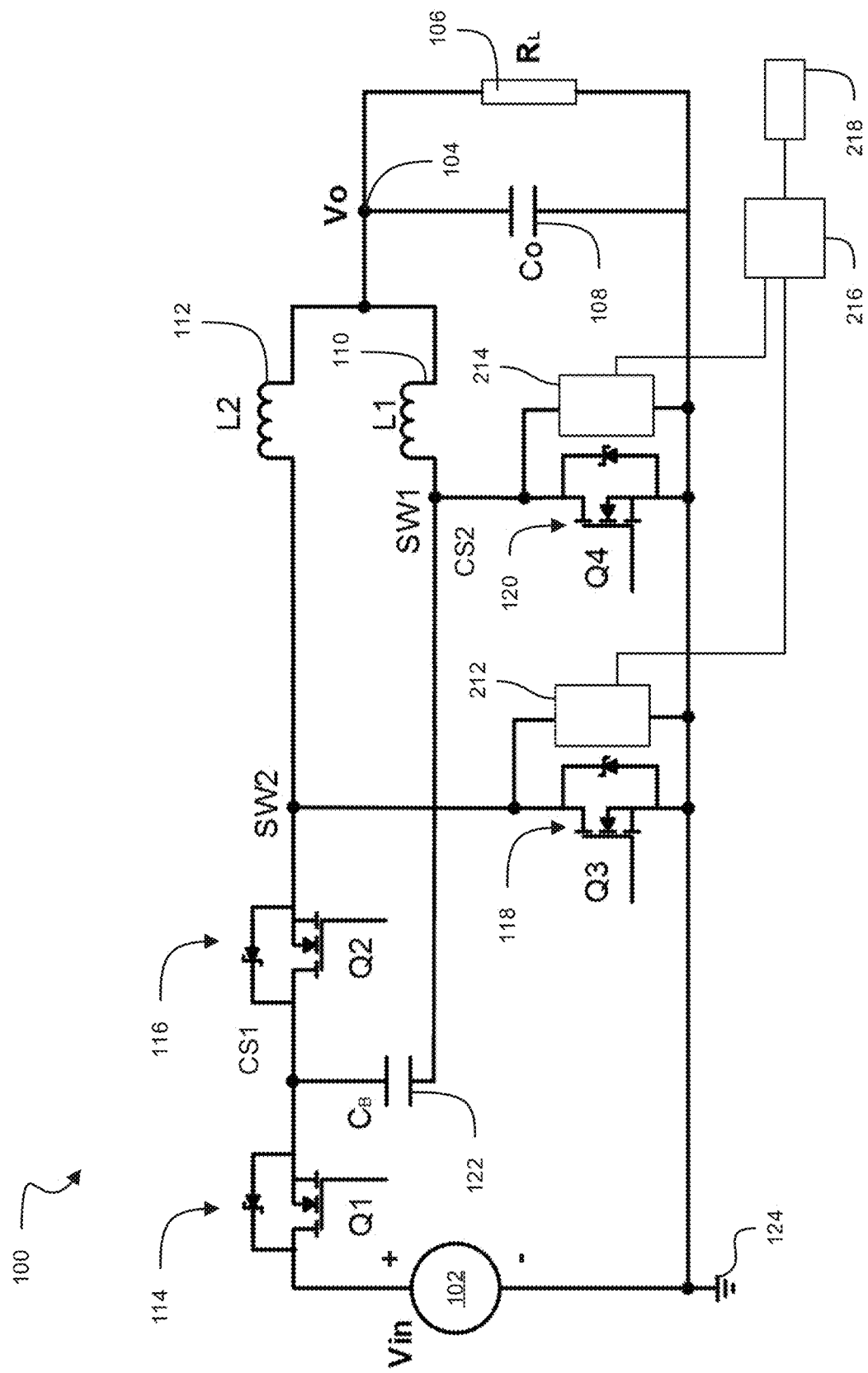
FIG. 15 shows an example embodiment of a power converter configured to provide current sensing.
Figure 16:
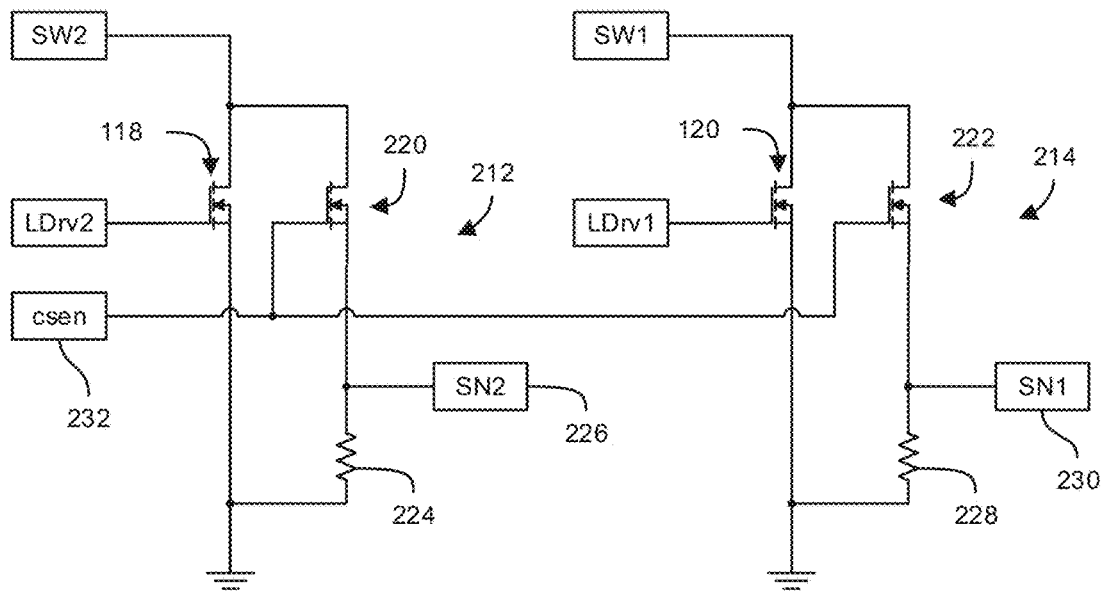
FIG. 16 shows an example embodiment of current sensing circuitry.

FIG. 15 shows an example embodiment of a power converter 100 that is configured to perform current sensing. In some embodiments, the power converter 100 can use one or more current mirrors to determine the current through portions of the power converter 100. The power converter can be similar to the power converter of FIG. 1, or various other power converter 100 embodiments disclosed herein. The power converter 100 can include a first sensing circuit 212 for measuring current through the third power switch 118 (e.g., by using a current mirror to mirror the current through the third power switch 118), and a second current sensing circuit 214 for measuring current through the fourth power switch 120 (e.g., by using a current mirror to mirror the current through the fourth power switch 120). One or more components of a first current sensing circuit 212 can be coupled in parallel with the third power switch 118. One or more components of the second current sensing circuit 214 can be coupled in parallel with the fourth power switch 120. As shown in FIG. 16, the first current sensing circuit 212 can include a first sensing MOSFET (or other switch type) 220 which can be configured to conduct current when the third power switch 118 conducts current, but at a smaller amount. The second current sensing circuit 214 can include a second sensing MOSFET (or other switch type) 222 which can be configured to conduct current when the fourth power switch 120 conducts current, but at a smaller amount. In some cases, a ratio of 740 to 1 can be used for the ratio between the current through the third or fourth power switch 118 or 120 and the mirrored current through the corresponding sensing switch 220 or 222. Various other ratios could be used, such as about 100:1, about 200:1, about 300:1, about 400:1, about 450:1, about 500:1, about 550:1, about 600:1, about 650:1, about 700:1, about 750:1, about 800:1, about 850:1, about 900:1, about 950:1, about 1000:1, about 1100:1, about 1200:1, about 1300:1, or more, or any values or ranges therebetween, although other ratios could be used, depending on the design and capabilities of the power converter 100. For example, ratios much higher than 1:1 can be used to reduce the solution footprint and power losses. However, high ratio values can negatively affect current sensing accuracy. Any suitable ratio can be used depending on the design and capabilities of the power converter.

The power converter 100 can include current sensing processing circuitry 216, which can process signals from one or both of the current sensing circuits 212 and/or 214 to determine a current (e.g., a current through the power converter 100). The current sensing processing circuitry 216 can apply a gain to the signals from the current sensing circuits 212 and 214, can invert the signals in some cases, and/or can combine (e.g., average) the signals. The power converter 100 can include an output 218 for outputting information regarding the determined current. The output 218 can use wired or wireless communication. In some cases the output 218 can use a Power Management Bus (PMBUS), and the communication interface can be configured to implement an inter-integrated circuit (I2C) protocol, in some implementations. Any suitable communication interface or output mechanism can be used to deliver the information regarding the current.

FIG. 16 shows an example embodiment of a portion of a power converter 100 that includes current sensing circuitry, such as for the current sensing circuits 212 and 214 of FIG. 15. As with some other embodiments, the third power switch 118 can be coupled between the node SW2 and ground, and the fourth power switch 120 can be coupled between the node SW1 and ground. The third power switch 118 can receive a drive signal (e.g., LDrv2), such as at a gate of the third power switch 118, to control the third power switch 118. The fourth power switch 120 can receive a drive signal (e.g., LDrv1), such as at a gate of the fourth power switch 120, to control the fourth power switch 120.

A first sensing switch 220 (e.g., a sensing MOSFET) can be coupled in parallel with the third power switch 118. A drain of the first sensing switch 220 can be coupled to the node SW2 and to the drain of the third power switch 118. A source of the first sensing switch 220 can be coupled to ground and to the source of the third power switch 118. A sensing resistor 224 can be coupled between the source of the first sensing switch 220 and ground. Current that flows through the sensing switch 220 can flow through the sensing resistor 224, which can result in a voltage drop. Thus, voltage signal (e.g., SN2) at an output 226 of the current mirror 212 can provide a voltage value that is indicative of the current through the sensing switch 220, which can be proportional to (and thus indicative of) the current through the third power switch 118. The current mirror 212 can be used to determine the current through the third power switch 118 and to output a corresponding voltage value.

A second sensing switch 222 (e.g., a sensing MOSFET) can be coupled in parallel with the fourth power switch 120. A drain of the second sensing switch 222 can be coupled to the node SW1 and to the drain of the fourth power switch 120. A source of the second sensing switch 222 can be coupled to ground and to the source of the fourth power switch 120. A sensing resistor 228 can be coupled between the source of the second sensing switch 222 and ground. Current that flows through the second sensing switch 222 can flow through the sensing resistor 228, which can result in a voltage drop. Thus voltage signal (e.g., SN1) at an output 230 of the current mirror 214 can provide a voltage value that is indicative of the current through the second sensing switch 222, which can be proportional to (and thus indicative of) the current through the fourth power switch 120. The current mirror 214 can be used to determine the current through the fourth power switch 120 and to output a corresponding voltage value.

A current sensing enable signal 232 (e.g., csen) can be delivered to the gate of one or both of the first and second sensing switches 220 and 222. The current sensing enable signal 232 can be on or high when LDrv1 and LDrv2 are both on or high, and the current sensing enable signal 232 can be off or low when either of LDrv1 and LDrv2 are off or low. Thus, the current sensing can be performed only when both of the third and fourth power switches 118 and 120 are on, in some embodiments. When the current sensing enable signal is on or high, the sensing switches 220 and 222 can be turned on, for example to enable mirrored current to flow through the sensing switches 220 and 222.

Figure 17:
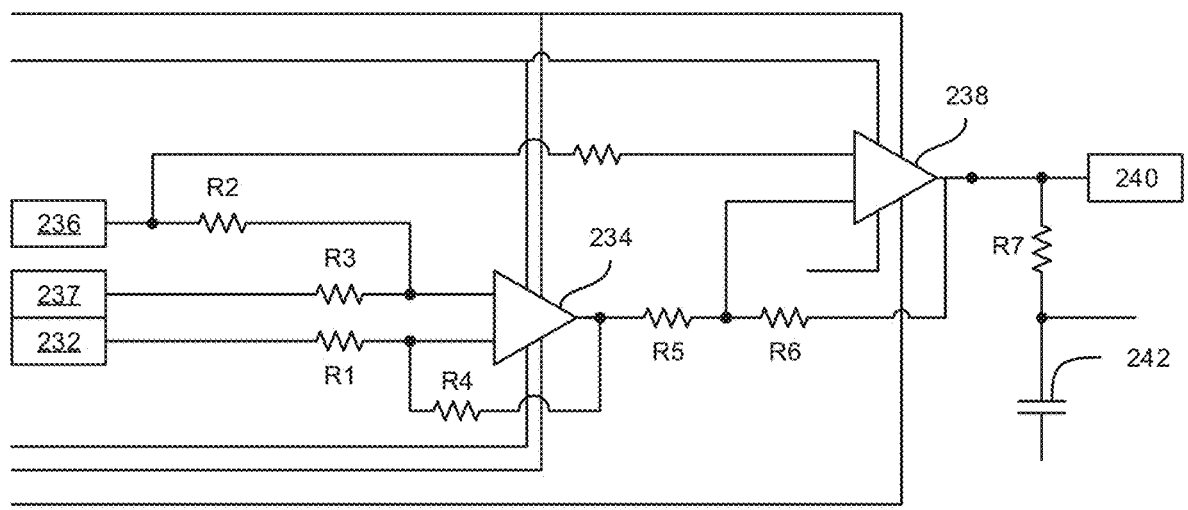
FIG. 17 shows an example embodiment of circuitry for applying gain to a signal indicative of the current.

In some embodiments, the power converter 100 can apply a gain to the one or more signals from the current sensing circuits 212 and/or 214, such as to the voltage signals SN2 and/or SN1. FIG. 17 shows an example embodiment of a circuit for applying gain to a voltage signal (e.g., SN2 or SN1), which can be indicative of current (e.g., through the third power switch 118 or the fourth power switch 120). The power converter 100 can have a separate gain circuit for each of the current sensing circuits 212, 214. A first gain circuit (e.g., of FIG. 17 or 18) can operate on the voltage signal SN2 from the first current sensing circuit 212, which can be indicative of current through the third power switch 118 (e.g., a second channel). A second gain circuit (e.g., of FIG. 17 or 18) can operate on the voltage signal SN1 from the second current mirror 214, which can be indicative of current through the fourth power switch 120 (e.g., a first channel). In some cases, the voltage signals SN2 and/or SN1 can be negative values, and the gain circuit (e.g., of FIG. 17 or 18) can invert the voltage signals as well as applying the gain, to produce a gained up positive voltage value that is indicative of current in the power converter 100.

With reference to FIG. 17, an input voltage signal (e.g., SN2 or SN1) can be provided to an input 232 of the gain circuit. The input voltage signal 232 can be coupled through a first resistor R1 to a first terminal (e.g., a negative terminal) of a first amplifier 234, which can be an operational amplifier. The gain circuit can include a bias voltage 236, which can be coupled through a resistor R2 to a second terminal (e.g., a positive terminal) of the first amplifier 234. The second terminal of the first amplifier 234 can also be coupled through a third resistor R3 to an additional input 237. Input 237 can be a lower tap for resistor 224 or 228 (e.g., shown in FIG. 16), which in this case is labeled as ground. The signal can be referenced to the power switch 118 ground and the power switch 120 ground, respectively. The output of the first amplifier 234 can be coupled through a fourth resistor to the first terminal of the first amplifier 234. The amplifier 234 can be configured to apply a gain to the signal at the input 232 (e.g., a gain of 4, although other gain amounts can be used). The gain circuit of FIG. 17 can include a second amplifier 238. The output of the first amplifier 234 can be coupled, through a fifth resistor R5, to a first terminal (e.g., a negative terminal) of the second amplifier 238. The second terminal (e.g., a positive terminal) of the second amplifier 238 can be coupled to a node between the second resistor R2 and the input 236 (e.g., a bias voltage). The output of the second amplifier 238 can be coupled, through a sixth resistor R6, to the to the first terminal of the second amplifier 238. The output of the second amplifier 238 can be coupled, through the sixth resistor R6 and the fifth resistor R5, to the output of the first amplifier 234. The output of the second amplifier 238 can be coupled to an output 240, which can output a positive voltage signal with the gain applied, for example. In some cases, the second amplifier 238 can apply a gain to the output of the first amplifier 234. In some embodiments, the first amplifier 234 can apply a gain of 4 and the second amplifier 238 can apply a gain of 70, which yield a total gain of 280 for the gain circuit of FIG. 17, although various other amounts of gain can be applied instead. In some embodiments, a capacitor 242 can be coupled, via a seventh resistor R7, to the output 240 and the output of the second amplifier 238. The capacitor 242 can be a smoothening capacitor to smooth the output signal 240. Filtering can be used, for example, to average the output over a time interval.

Figure 18:
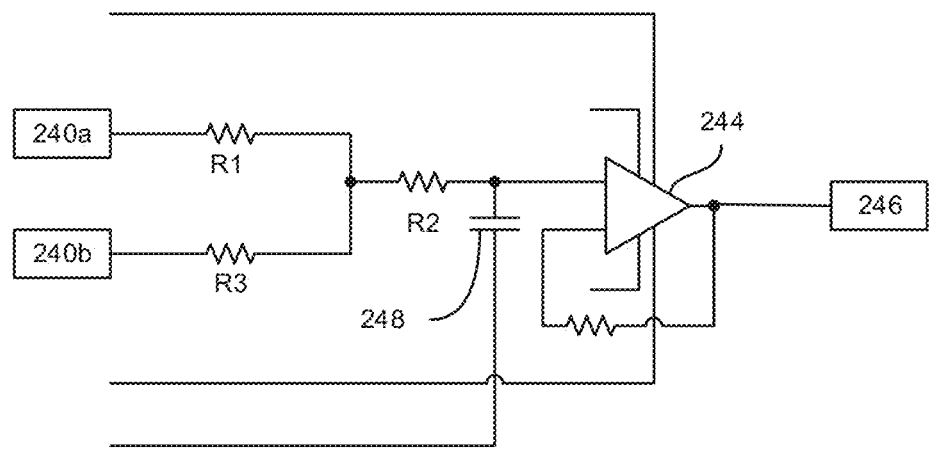
FIG. 18 shows an example embodiment of circuitry combining current sensing values from multiple channels.

In some embodiments, the power converter 100 can include combining or averaging circuitry. FIG. 18 shows can example embodiment of combining or averaging circuitry. The combining circuitry can receive two inputs, such as a first input 240a (which can be a signal or processed signal from the first current sensing circuit 212) and a second input 240b (which can be a signal or processed signal from the second current sensing circuit 214). The inputs 240a and 240b can be inverted and/or gained signals, such as received from corresponding gain circuits such as the circuit shown in FIG. 17. The first input 240a can be coupled to a second terminal (e.g., a positive terminal) of an amplifier 244, through a first resistor R1 and a second resistor R2. The second input 240b can be coupled to the second terminal of the amplifier 244, through a third resistor R3 and the second resistor R2. A capacitor 248 can be coupled to a location between the second resistor R2 and the second terminal of the amplifier 244. The other end of capacitor 248 may go to ground, for example, or another voltage signal. This other voltage signal could be whatever voltage is desired for the output 246 to be with respect to, in an AC coupled sense. The output of the amplifier 244 can be coupled to the first terminal (e.g., a negative terminal) of the amplifier 244. The output of the amplifier 244 can provide a combined output signal 246 that combines the signals 240a and 240b. The circuit of FIG. 18 can output an average of the first input 240a and the second input 240b.

By way of example, the signal SN2 at 226 can be provided by the following equation: $SN2=I_3/740 \times 0.1$, where $I_3$ is the current through the third power switch 118, where dividing by 740 is due to the 740:1 ratio provided by the current mirror, and where multiplying by 0.1 is due to the sensing resistor 224. Similarly, the signal SN1 at 230 can be provided by the following equation: $SN1=I_4/740 \times 0.1$, where $I_4$ is the current through the fourth power switch 120. The SN1 and SN2 signals can be provided to gains circuits according to FIG. 17 (e.g., as the input 232). The outputs Vgain at 240 can be provide by the following equations: $Vgain_2=Vb-SN2 \times 280$ and $Vgain_1=Vb-SN1 \times 280$, where Vb is the bias voltage at 236. The bias voltage can be 250 mV, for example, although various other values could be used. The $Vgain_1$ and $Vgain_2$ signals can be provided to the signal combining circuit, for example as inputs 240a and 240b of FIG. 18. The combining circuit can provide a combined signal $C_{save}$ that can be provided by the following equation: $C_{save}=\frac{1}{2}(Vgain_1+Vgain_2)$. The $C_{save}$ signal can be a voltage that is indicative of an average current through the power converter 100.

Figure 19:
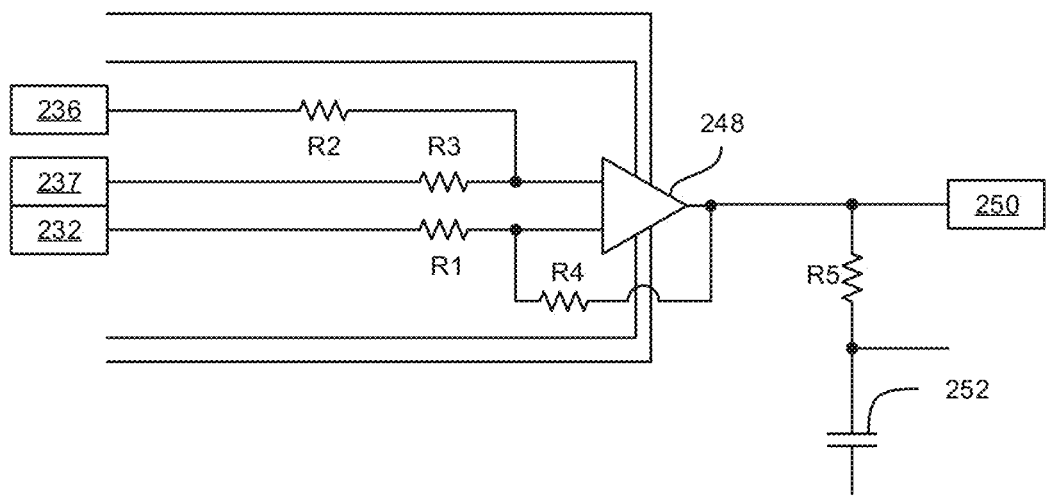
FIG. 19 shows another example embodiment of circuitry for applying gain to a signal indicative of the current.

Many variations are possible. Various different values can be used for the gain, mirror current ratio, sense resistor value, bias voltage, etc. FIG. 17 shows a two-stage gain circuit that has two amplifiers 234 and 238. FIG. 19 shows an example embodiment of an alternative, single stage gain circuit that includes one amplifier 248, which can provide a gain of 300. Other amounts of gain could be applied. An input voltage signal (e.g., SN2 or SN1) can be provided to an input 232 of the gain circuit. The input voltage signal 232 can be coupled through a first resistor R1 to a first terminal (e.g., a negative terminal) of the amplifier 248, which can be an operational amplifier. The gain circuit can include a bias voltage 236, which can be coupled through a resistor R2 to a second terminal (e.g., a positive terminal) of the amplifier 248. The second terminal of the amplifier 248 can also be coupled through a third resistor R3 to an additional input 237. Input 237 can be a lower tap for resistor 224 or 228 of FIG. 16, which in this case is labeled as ground. It can be referenced to the ground of the power switch 118 and the power switch 120, respectively. The output of the amplifier 248 can be coupled through a fourth resistor to the first terminal of the amplifier 248. The amplifier 248 can be configured to apply a gain to the signal at the input 232 (e.g., a gain of 300, although other gain amounts can be used). The output of the amplifier 248 can be coupled to an output 250, which can output a positive voltage signal with the gain applied, for example. In some embodiments, a capacitor 252 can be coupled, via a fifth resistor R5, to the output 250 and the output of the amplifier 248, similar to FIG. 17.

Figure 20:
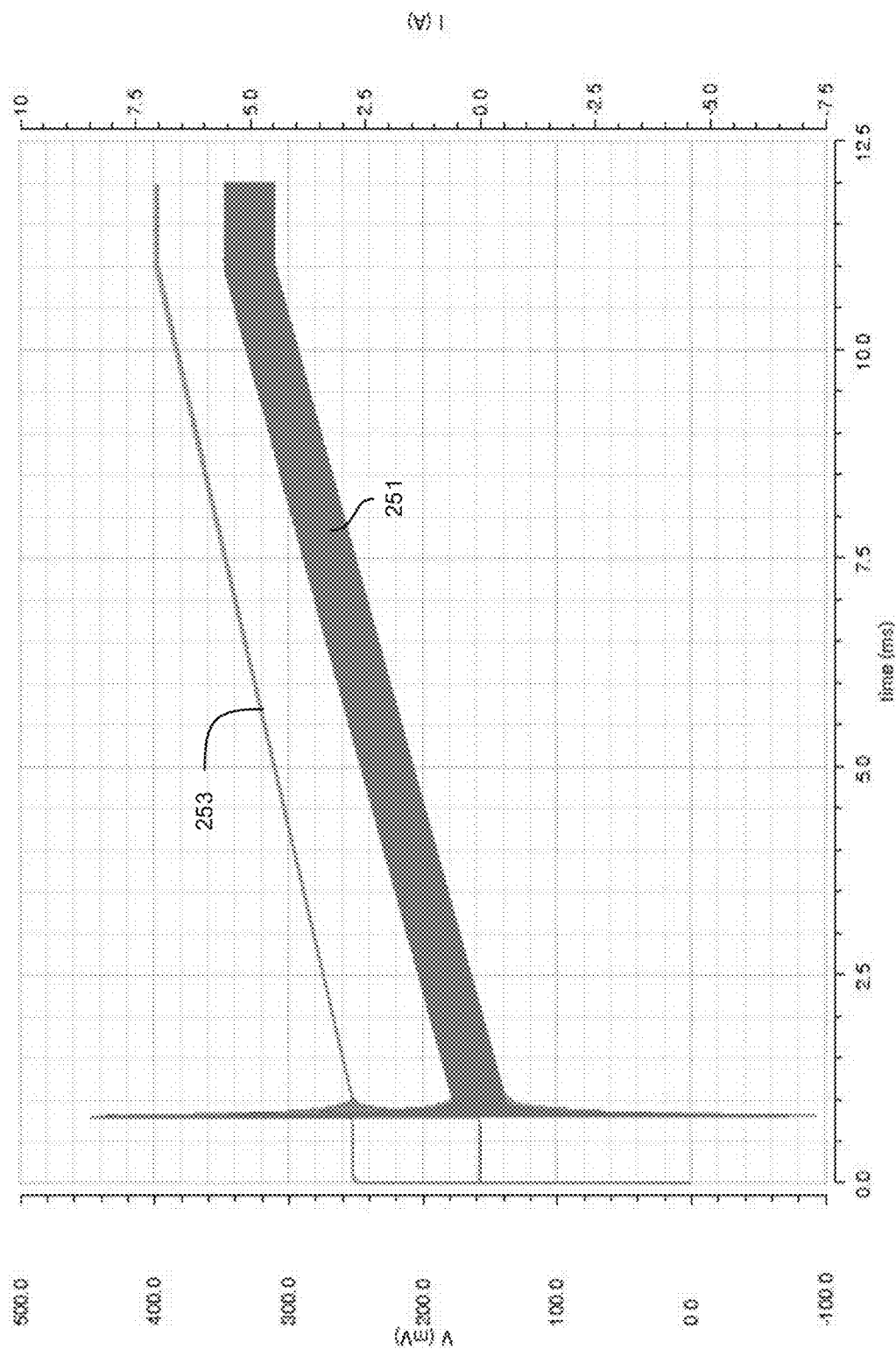
FIG. 20 shows a plot of the actual current through the power converter and the sensed current.

FIG. 20 is a graph showing the actual current 251 that is output from each phase of the power converter 100 as it increased from about 0 amps to about 10 amps. FIG. 20 shows the current going through each inductor 110 and 112. Thus, the 5 A shown in FIG. 20 corresponds to an output of 10 A (e.g., with about 5 A for each inductor 110 and 112). FIG. 20 also shows the sensed voltage that is indicative of the current using the approach described in connection with FIGS. 15-19. When the actual output current 251 is about 0 amps, the sensed voltage 253 can be about 250 mV. As the actual output current 251 increases to about 5 amps per phase, the sensed voltage 253 can increase to about 400 mV. The sensed voltage 253 can be proportional to the actual output current 251. Accordingly, a current sensing system can read the sensed voltage 253 to determine the output current 251.

In some situations, errors can be more likely to occur when the power switches are in the off state, so the power converter 100 can be configured to measure the current when both the third power switch 118 (Q3) and the fourth power switch 120 (Q4) are on, which can be the second and fourth states of operation. Other embodiments can measure the current at other times, such as during the first or third states of configuration. Various methods and devices can be used to measure the output current of the power converter 100.

Current Sensing Using the Fourth Power Switch

In some embodiment, a single current mirror or sensing circuit can be used, for determining current through only the fourth power switch 120. As shown in FIG. 2C, in the third state of operation (e.g., with the second and fourth power switches 116 and 120 on and the first and third power switches 114 and 118 off) the total load current can go through the fourth power switch 120. According, the current through the fourth power switch 120 (Q4) can provide the sum for both channels of current. For example, in the third state of operation, the capacitor 122 $C_B$ can charge the second inductor 112 (L2), e.g., via a charge path of the fourth power switch 120, the capacitor 122, the second power switch 116, and then the second inductor 112. At the same time, L1 can be discharging through the fourth power switch 120 (Q4). Therefore, during this state, the fourth power switch carries the total current associated with both the first inductor 110 (L1) and the second inductor 112 (L2). The current across the fourth power switch 120 can be measured similar to other embodiments disclosed herein, such as similar to the embodiments disclosed in connection with FIGS. 15-19, except that the current sensing can be performed at a different time (e.g., during a third state of operation) and the sensing of current at the third power switch 118 can be omitted.

Figure 21:
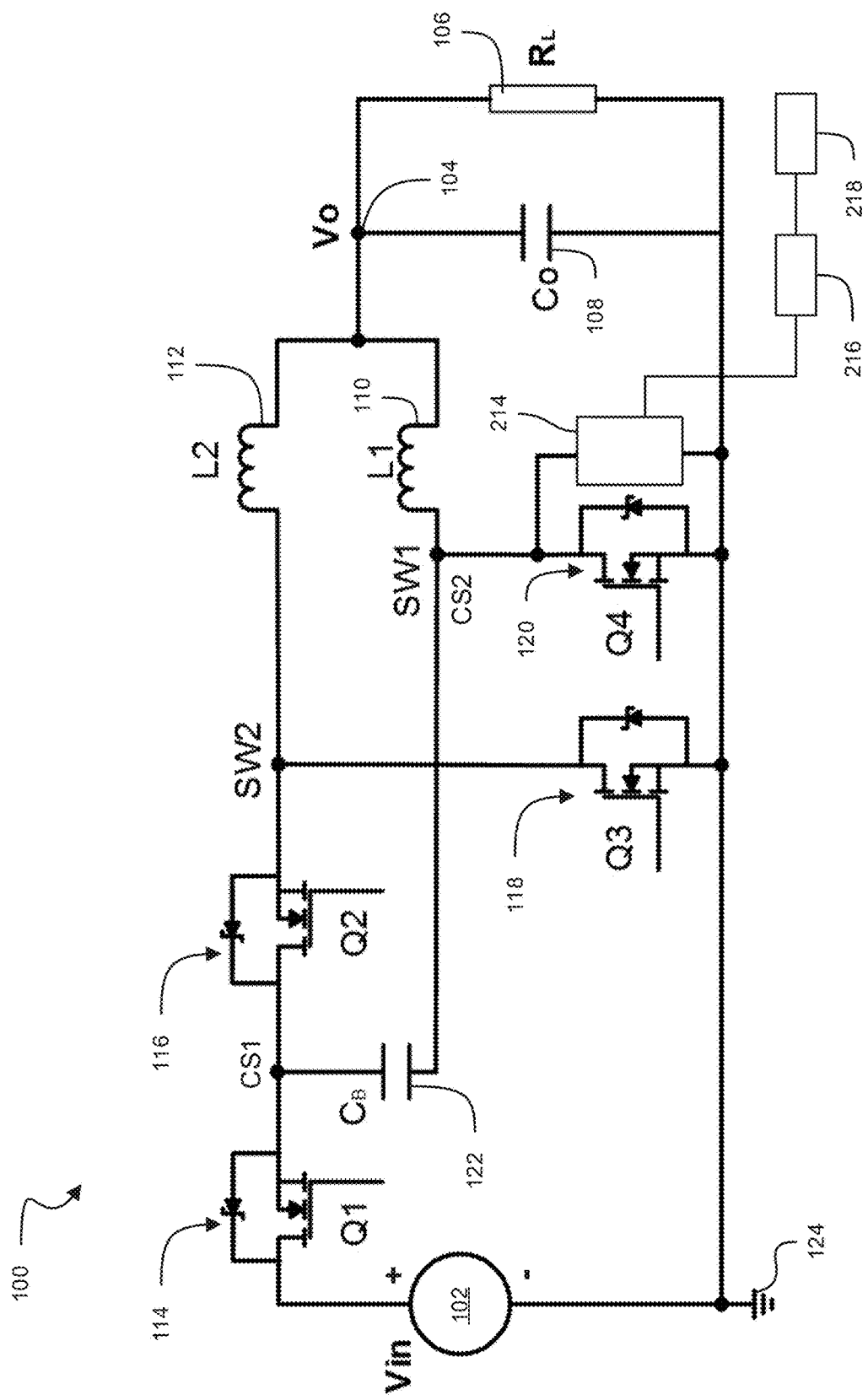
FIG. 21 shows another example embodiment of a power converter configured to provide current sensing.

FIG. 21 shows an example embodiment of a power converter 100, which can be configured to sense a current across the fourth power switch 120. The power converter 100 can include a current mirror 214 or other current sensing circuit for the fourth power switch, which can be similar to FIGS. 15 and 16. The current mirror 212 from FIGS. 15 and 16 can be omitted. The current mirror 214 or sensing circuit can be similar to the right side of FIG. 16. The "csen" signal at 232 can operate differently than in FIG. 16, so that the current for the fourth power switch 120 is measured at the third state of operation. The "csen" signal can be high or on when the LDrv1 and HDrv2 signal are high or on (e.g., to close or turn on the second and fourth power switches 116 and 120). When either of the LDrv1 or HDrv2 signals is low or off, the "csen" signal can be low or off. The power converter 100 can include a current sensing processing circuitry 216 which can invert the raw signal (e.g., a voltage signal) and/or can apply gain to the signal, as discussed herein. The combiner or averaging circuit (e.g., of FIG. 18) can be omitted when the current is measured at only the fourth power switch 120. The power converter 100 can include an output 218 for outputting information regarding the determined current, as discussed herein. Any other suitable method or technique could be used to measure the voltage for the fourth power switch 120.

Current Sensing Using the AC Coupling Capacitor

In some embodiments, the voltage across the capacitor 122 can be sensed, and the current through the power converter 100 (e.g., total output current) can be calculated from the determined voltage across the capacitor 122. As discussed herein, the power converter 100 can include a capacitor 122, which can AC couple the first power switch 114 to the first inductor 110. A first side of the capacitor 122 can be coupled to a node between the first power switch 114 and the second power switch 116. A second side of the capacitor 122 can be coupled to a node between the first inductor 110 and the fourth power switch 120. In some cases, the capacitor 122 can be considered a flying capacitor.

Figure 22:
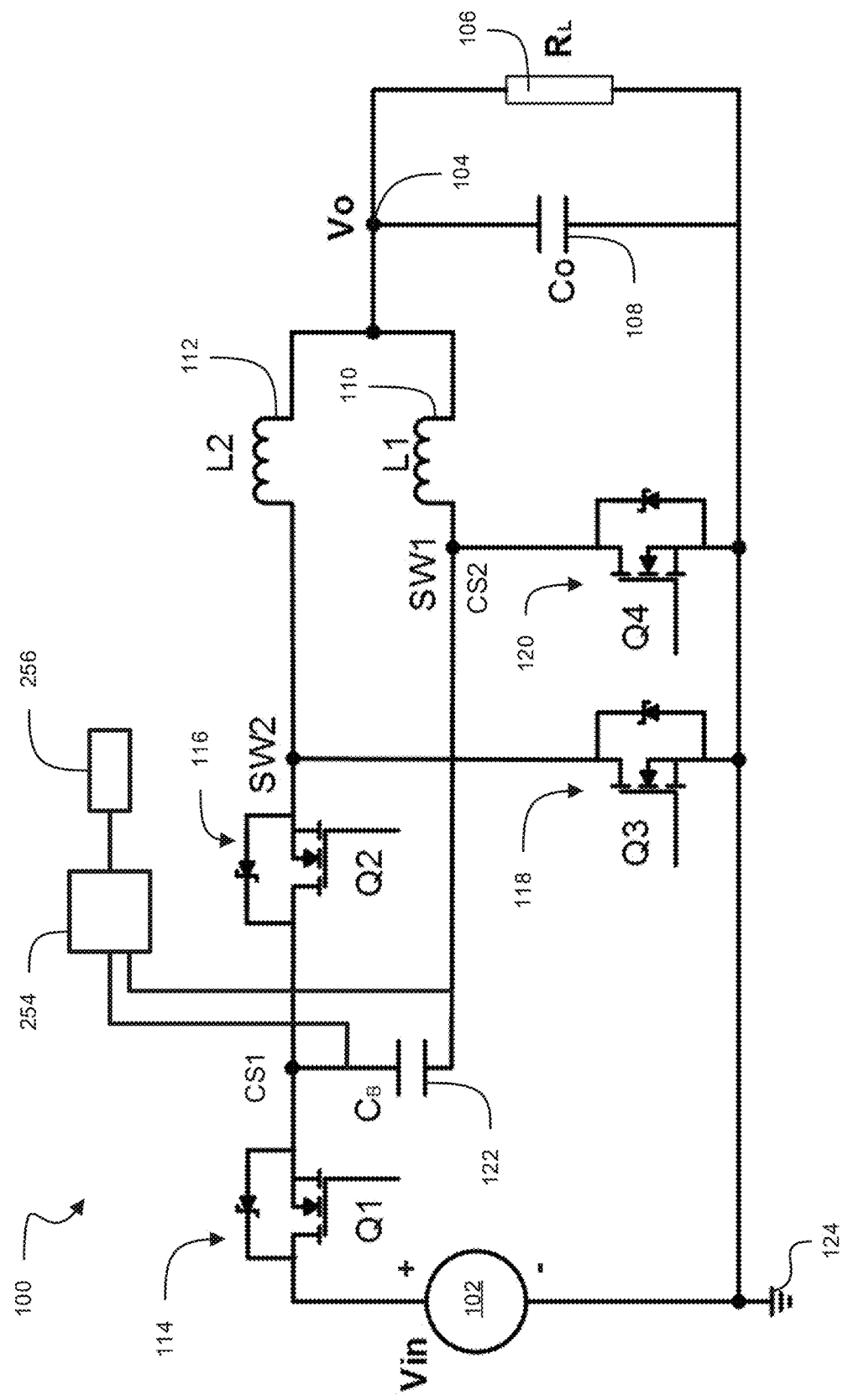
FIG. 22 shows another example embodiment of a power converter configured to provide current sensing.

FIG. 22 shows an example embodiment of a power converter 100 that is configured to sense the voltage across the capacitor 122. A first line can be used to measure a voltage on the first side of the capacitor 122. A second line can be used to measure a voltage on the second side of the capacitor 122. The power converter 100 can include a current sensing processing circuitry 254 and an output 256. The current sensing processing circuitry 254 can be coupled to the first side of the capacitor 122 and to the second side of the capacitor 122, so that it can determine voltage differential across the capacitor 122. The current sensing processing circuitry 254 can determine the current (e.g., the total output current) based on the voltage values, such as based on the changes in the voltage values over time. The output can output the current information, as discussed herein.

Figure 23:
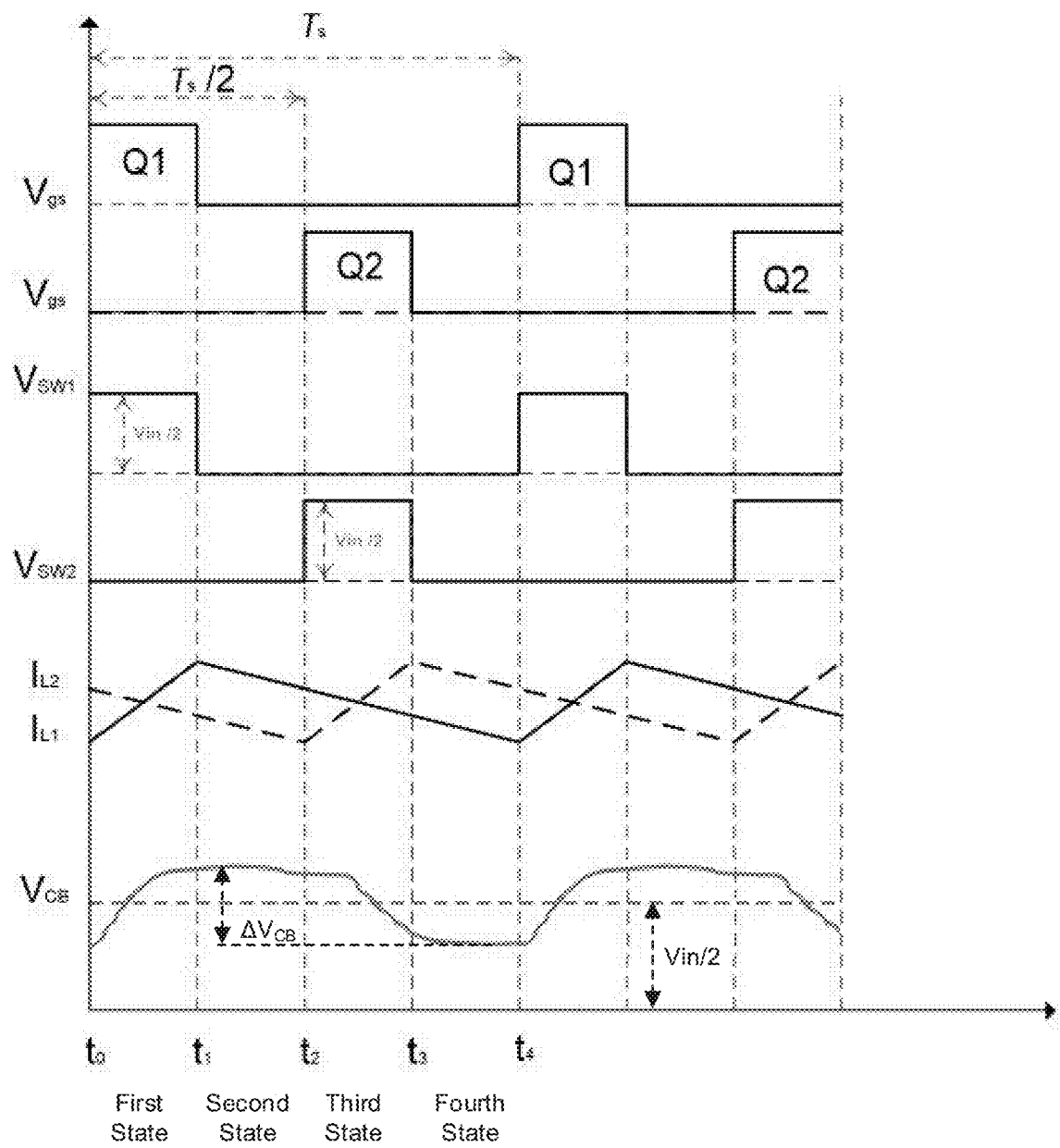
FIG. 23 shows the values for various signals during operation of an example embodiment of a power converter.

FIG. 23 shows the values of various parameters of an example embodiment of a power converter as it transitions between the four states of operation. FIG. 23 shows that during the first state of operation, the voltage $V_{gs}$ between the gate and source of the first power switch 114 (Q1) goes high, which can turn on the first power switch 114. The voltage $V_{SW1}$ at the node SW1 can raise (e.g., from ground to $V_{in}/2$). The current $I_{L1}$ through the first inductor 110 can increase during the first state of operation. As shown in FIG. 2A, the current through the first inductor L1 goes through the capacitor 122, which can increase the voltage differential $V_{CB}$ across the capacitor 122, as shown in FIG. 23. The more current flows through the power converter 100 during the first state of operation, the more the voltage $V_{CB}$ on the capacitor 122 will increase. During the second and fourth states of operation, both of the first and second power switches 114 and 116 are off, and the inductors 110 and 112 are driven in the opposite direction. The current through the inductors $I_{L1}$ and $I_{L2}$ can both decay during the second and fourth states of operation. $V_{CB}$ can remain approximately constant. During the third state of operation, the voltage $V_{gs}$ between the gate and source of the second power switch 116 (Q2) can be high, which can turn on the second power switch 116. The voltage $V_{SW2}$ at the node SW2 can increase (e.g., from ground to $V_{in}/2$). The current $I_{L2}$ through the second inductor 112 can increase during the third state of operation. As shown in FIG. 2C, the capacitor 122 can discharge to drive the current $I_{L2}$ through the second inductor 112 in the third state of operation, which can cause the voltage $V_{CB}$ of the capacitor 122 to decrease, as shown in FIG. 23. The more current that flows through the power converter 100 during the third state of operation, the more the voltage $V_{CB}$ of the capacitor 122 will decrease. Accordingly, the amount of change in the voltage $V_{CB}$ across the capacitor 122 can be indicative of the current through the power converter 100. In FIG. 23, $\Delta V_{CB}$ indicates the voltage difference between the highest voltage $V_{CB}$ and the lowest voltage $V_{CB}$ that occur during the switching cycle through the four states of operation.

With reference to FIGS. 22 and 23, the current sensing processing circuitry 254 can sense and monitor the voltage $V_{CB}$ across the capacitor 122, and can determine the current through the power converter 100 based at least in part on the sensed or monitored voltage values for $V_{CB}$. For example, the current through the power converter 100 during a first switching cycle (e.g., through the four states of operation) can be determined based at least in part on the voltage difference $\Delta V_{CB}$, the difference between the highest voltage $V_{CB}$ and the lowest voltage $V_{CB}$ that occurred during the switching cycle through the four states of operation. Many variations are possible. For example, a first current during a first portion of the switching cycle can be determined based at least in part on an amount that the voltage $V_{CB}$ rises, and a second current during a second portion of the switching cycle can be determined based at least in part on an amount that the voltage $V_{CB}$ drops. The current (i) through the capacitor 122 can be determined using the following equation: $i = C_B * \Delta V / \Delta t$. In this equation CB is the capacitance of the capacitor 122, $\Delta V$ is the voltage change across the capacitor, and $\Delta t$ is the time interval that $\Delta V$ is measured over. The current through the capacitor 122 can be indicative of the output current of the power converter 100. The output current of the power converter 100 can be determined based on periodic measurements of the voltage across the capacitor 122 and the timing information of those measurements.

Capacitor Pre-Charge

When in the steady state, the capacitor 122 ($C_B$) can be charged to a voltage $V_{CB}$ of about ½ Vin. In some embodiments, the capacitor 122 can separate one or both of the third and fourth power switches 118 and 120 from the full Vin voltage, when the power converter is operating at steady state. For example, the third and/or fourth power switches 118 and 120 can received a reduced voltage (e.g., about Vin−$V_{CB}$ or about ½ Vin). It can be advantageous in some embodiments to use lower voltage switches for the third and/or forth power switches 118, 120, as compared to the first and/or second power switches 114, 116, which can receive the full Vin voltage. For example, the lower voltage switches can have reduced conduction losses for a given silicon area. However, the lower voltage switches can be damaged or destroyed if exposed to the full Vin voltage. During steady state operation, the lower voltage switches (e.g., Q3 and Q4) can be protected. However, in some configurations the third and/or forth power switches 118, 120 (Q3 and Q4) can be exposed to higher voltages during startup, before the steady state is reached. At time T0, when the startup begins, the capacitor 122 can have no charge yet. Then if the first power switch 114 (Q1) is turned on (e.g., to start the first state of operation), the full input voltage Vin would be delivered to the fourth power switch 120, which in some cases can damage the fourth power switch 120.

One solution can be to first turn on the fourth power switch 120 at startup and prior to any switching cycle. That can couple the second side of the capacitor 122 to ground. The other side of the capacitor (e.g., CS1) can be charged (e.g., to ½ Vin). This approach can work for some applications. However, some powered devices require a startup into a pre-biased output without discharging the output. The pre-bias can be a voltage present on the output 104 when the power converter 100 is turned on. Turning on switch 120 before normal operation would discharge that output, which would violate the pre-bias startup condition. Accordingly, this approach would not be acceptable for some devices. Also, in some cases, this approach could cause the voltage to go negative, which can be a problem for some devices.

Figure 24:
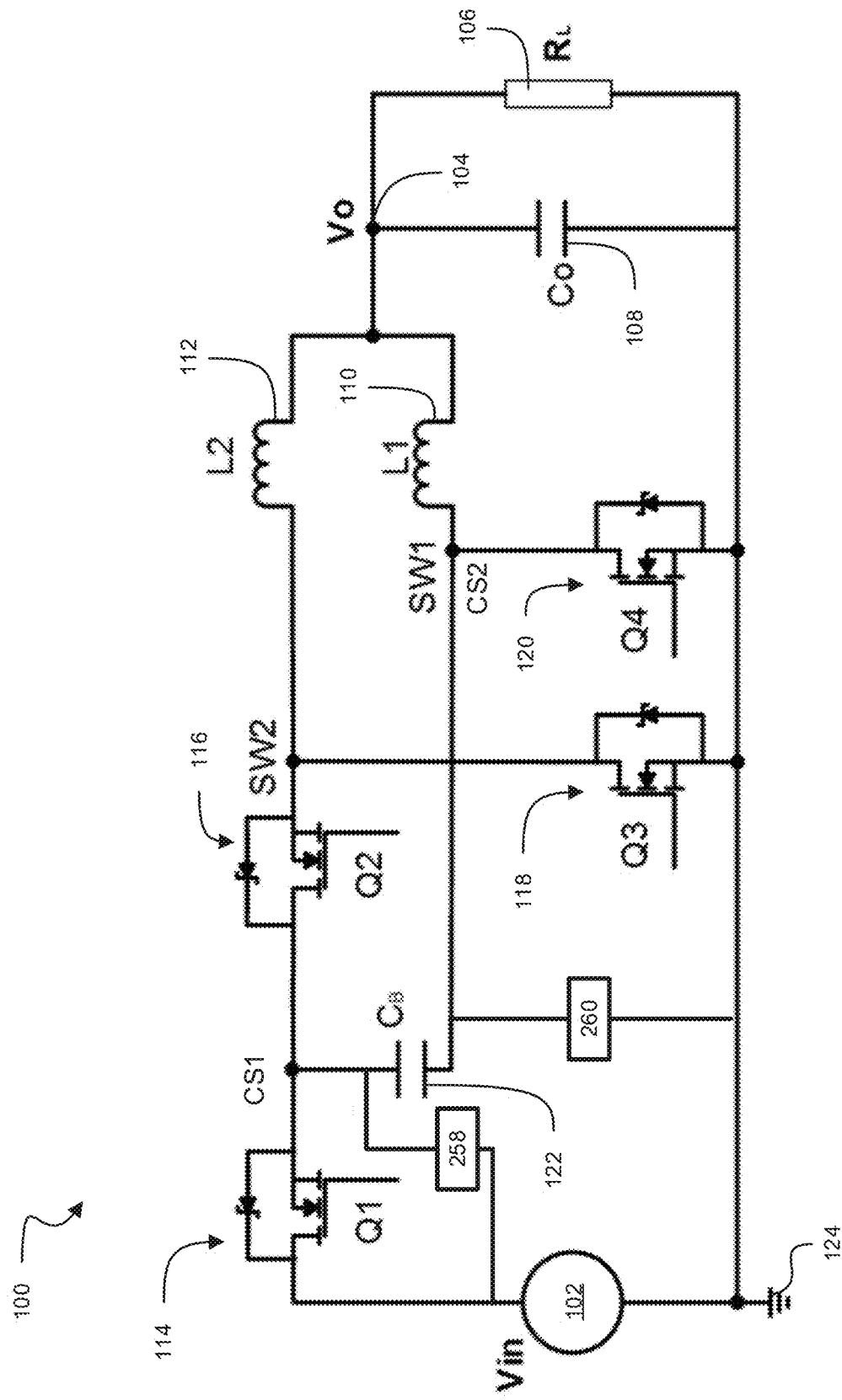
FIG. 24 shows an example embodiment of a power converter that is configured to pre-charge a capacitor.
Figure 25:
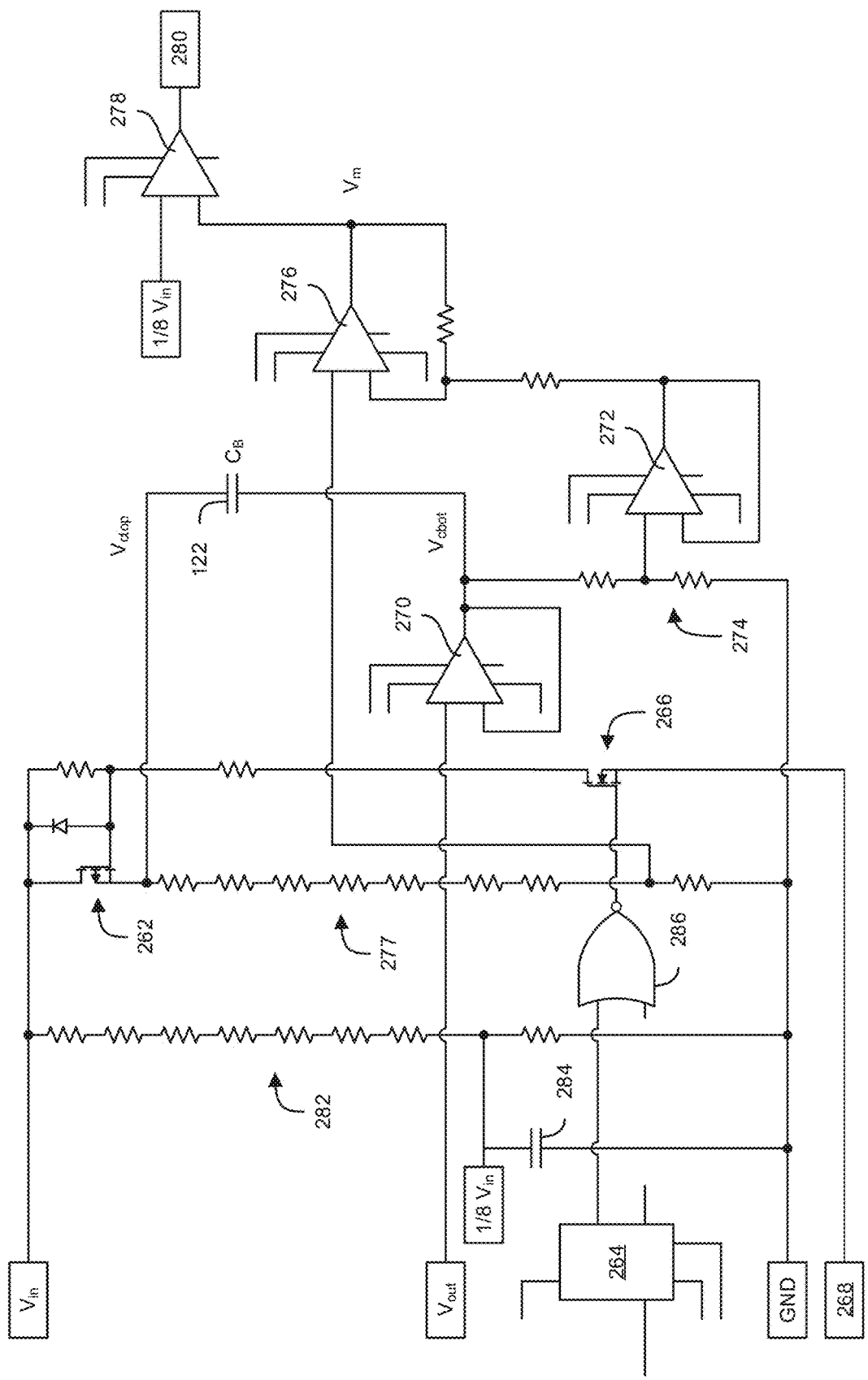
FIG. 25 shows an example embodiment of circuitry for applying pre-charge to a capacitor in a power converter.

In some embodiments, the power converter 100 can perform a pre-charge operation on the capacitor 122 before starting the switching cycles. The pre-charge operation can charge up the capacitor 122, so that when the switching cycles start, the third and/or fourth power switches are protected when the switching cycles begin. For the pre-charge operation, the power converter 100 can turn on one or more switches to provide a charging path for current to charge the capacitor 122. The power converter 100 can monitor the voltage across the capacitor 122 (e.g., similar to FIG. 22), and when the voltage across the capacitor 122 reaches a threshold, the power converter 100 can turn off the one or more switches to stop charging the capacitor. The voltage threshold for stopping the pre-charge operation can be about half of the input voltage ½ Vin. With reference to FIG. 24, a first switch 258 can selectively couple the input 102 (Vin) to the capacitor 122. A second switch 260 can selectively couple the capacitor 122 to ground (or to some other voltage lower than Vin). In some embodiments, the capacitor 122 can be coupled to a buffered version of Vout 104 (e.g., buffered by amplifier 270), as shown in FIG. 25. The buffer 270 can sync the charging current in order to keep Vout unchanged. This is to eliminate the possibility of discharging a pre-biased output Vout. Discharging the output may be acceptable for some applications, and may be unacceptable in others. Charging with a pre-biased output can be preferable over charging with no pre-bias (e.g., shorted to ground), in some cases.

To pre-charge the capacitor 122, the power converter 100 (e.g., a driver or controller thereof) can turn on the switches 258 and 260, so that current can flow from the input to the first side of the capacitor 122, and from the second side of the capacitor 122 to ground, which can charge up the capacitor 122. When the voltage across the capacitor 122 reaches a threshold (e.g., about ½ Vin), the switches 258 and 260 can turn off. The power converter 100 can then begin normal operation, such as by starting the switching cycles through the operational states discussed herein. Although not shown in FIG. 24, a voltage monitor circuit can be coupled to the capacitor 122 for determining when the voltage threshold has been reached to stop the pre-charge operation. Many variations are possible. In some embodiments, the first power switch 114 can be used as the switch 258. In some embodiments, the switch 260 (or a different switch not shown in FIG. 24) can disconnect the fourth power switch 120 from the capacitor 122 during the pre-charge operation, and can reconnect the fourth power switch 120 to the capacitor 122 after the pre-charge operation. In some embodiments, the capacitor 122 can be coupled to the output Vo or other low voltage to provide the pre-charge current path. This mode of operation (e.g., coupling the capacitor 122 to Vo) can be preferable, in some cases.

FIG. 25 shows an example embodiment of circuitry for performing the pre-charge operation. The circuitry can include a switch 262 (e.g., a P-channel MOSFET or other suitable type of switch) that can selectively couple Vin to the first (e.g., top) side of the capacitor 122. The voltage ($V_{ctop}$) on the first or top side of the capacitor 122 can increase during the pre-charge operation. The switch 262 can be controlled to turn on to start the pre-charge operation, and to turn off when the voltage across the capacitor 122 reaches a threshold, such as about ½ Vin. A controller 264 can provide signals to control the switch 262. In some embodiments, the controller 264 can provide a signal that turns on a switch 266 so that a signal 268 is delivered through the switch 266 to the switch 262 to turn on the switch 262. In some cases, the signal 268 can be tied to ground. The signal 268 can be tied to a different voltage value that is sufficiently low to allow switch 266 to turn on via the output of NOR gate 286 or other device providing a control signal to switch 266.

The second side of the capacitor 122 can be coupled to Vout (or ground or some other low voltage), such as through an amplifier 270. The amplifier 270 can be an operational amplifier. The amplifier 270 can be used as a unity gain amplifier. A first terminal (e.g., positive terminal) of the amplifier 270 can be coupled to Vout (or other low voltage), and the output of the amplifier can be coupled to the second terminal (e.g., negative terminal) of the amplifier 270. The voltage ($V_{cbot}$) on the second (e.g., bottom) side of the capacitor 122 can be coupled to ground through two resistors, with a first (e.g., positive) terminal of an amplifier 272 coupled between the resistors, to provide a voltage divider 274. The second (e.g., negative) terminal of the amplifier 272 can be coupled to the output of the amplifier 272. The amplifier 272 can operate as a unit gain amplifier, in some cases. The output of the voltage divider 274 (e.g., and the output of the amplifier 272) can be ¼ Vcbot.

The output of the amplifier 272 can be coupled to a second (e.g., negative) terminal of an amplifier 276 through a resistor. The output of the amplifier 276 can be coupled through another resistor to the second (e.g., negative) terminal of the amplifier 276. The first (e.g., positive) terminal of the amplifier 276 can receive a voltage of ⅛ $V_{ctop}$. A voltage divider 277 can provide the voltage of ⅛ $V_{ctop}$. The first (e.g., top) side of the capacitor 122 can be coupled to ground through a number of resistors, and the terminal of the amplifier 276 can be coupled between the resistors to provide the voltage divider. In the embodiment of FIG. 25, 8 resistors can be used, with 7 on one side and 1 on the other to provide ⅛ $V_{ctop}$. In some cases, fewer resistors can be used (e.g., depending on the resistance values used). In some cases, the amplifier 276 can operate as a diff amp, which can output the difference between voltage signals. The amplifier 276 can output a voltage $V_m=(\frac{1}{8}*Vctop-\frac{1}{4}*Vcbot)+\frac{1}{8}*Vctop$ which equals $\frac{1}{4}(Vctop-Vcbot)$ which is $\frac{1}{4}V_{CB}$.

The second (e.g., positive) terminal of amplifier 278 can receive the output ($V_m$) from the amplifier 276, which can be equal to ¼ the voltage across the capacitor 122 (¼ $V_{cb}$). The first (e.g., negative) terminal of the amplifier 278 can be ⅛ Vin. The circuitry can include a voltage divider 282 for providing the signal of ⅛ Vin to the amplifier 278. A number or resistors can be coupled between Vin and ground, with a connection to the amplifier 278 between the resistors. In the embodiment of FIG. 25, 8 resistors are shown, with 7 on one side and 1 on the other, to provide a voltage of ⅛ Vin. Fewer resistors could be used, depending on the resistance values used. In some cases a capacitor 284 can be coupled between the ⅛ Vin signal and ground (e.g., between the first or negative terminal of the amplifier 278 and ground. In some instances, Vin can be noisy and have significant ripple from supplying power through the converter 100 to the output 104. The capacitor 284, along with the voltage divider 282, can form a resistor-capacitor (RC) network that is used to filter out this noise and ripple. This can allow for better accuracy in the charging voltage $V_{CB}$. The amplifier 278 can operate as a comparator, which can detect whether the voltage across the capacitor $V_{cb}$ has reached a threshold, such as ½ Vin. In the embodiment of FIG. 25, the comparator amplifier 278 can detect when ¼ $V_{cb}$>=⅛ Vin, which is the same as $V_{cb}$>=½ Vin. So when the voltage of the capacitor 122 is less than half the input voltage, the output 280 of the amplifier 278 can have a first value (e.g., high), which can enable the pre-charge operation to continue. When the voltage of the capacitor 122 is reaches the value of half the input voltage, the output 280 of the amplifier 278 can have a second value (e.g., low), which can stop the pre-charge operation. For example, the output 280 can be delivered as input to the controller 264, and a high signal can enable the pre-charge operation, whereas a low signal can disable the pre-charge operation. So when the output 280 goes low, the controller 264 can stop the pre-charge operation, such as by turning off the switch 266 and/or the switch 262. In some cases, the switch 266 can be coupled to a NOR gate 286. The NOR gate 286 can turn on the switch 266 if both inputs are 0 or low. One input can be coupled to the controller 264, as shown. The controller can output a low signal to turn on the pre-charge operation. The other input to the NOR gate 286 can be coupled to the output 280. In some cases, the amplifier 278 can be configured to produce a high output 280 when the capacitor 122 voltage $V_{CB}$ reaches the threshold. That high signal output 280 can be delivered to the NOR gate 286, which can then turn off the switch 266. Many variations are possible, such as using different logic gates, or other signals. An AND gate could be used, for example, to output a high signal to turn on the switch 266 only when high signals are received from both the controller 264 and the amplifier 278. In some embodiments, the NOR gate 186 can be omitted, and the controller 264 can be configured to output the signals for controlling switch 266 without the NOR gate 186. In some cases, the controller 264 can be omitted. A d-type flip-flop can be used (e.g., in place of the controller 264) with the NOR gate 286 to control the switch 266. Many different combinations of resistor divider ratios may be used to generate the appropriate voltages and functionality.

Additional Details

The principles and advantages described herein can be implemented in various apparatuses. Examples of such apparatuses can include, but are not limited to, consumer electronic products, parts of the consumer electronic products, electronic test equipment, etc. Examples of parts of consumer electronic products can include clocking circuits, analog-to-digital converters, amplifiers, rectifiers, programmable filters, attenuators, variable frequency circuits, etc. Examples of the electronic devices can also include memory chips, memory modules, circuits of optical networks or other communication networks, cellular communications infrastructure such as base stations, radar systems, and disk driver circuits, etc. Consumer electronic products can include, but are not limited to, wireless devices, a mobile phone (for example, a smart phone), a wearable computing device such as a smart watch or an ear piece, healthcare monitoring devices, vehicular electronics systems, a telephone, a television, a computer monitor, a computer, a hand-held computer, a tablet computer, a laptop computer, a personal digital assistant (PDA), a microwave, a refrigerator, a stereo system, a cassette recorder or player, a DVD player, a CD player, a digital video recorder (DVR), a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, apparatuses can include unfinished products.

In some embodiments, the methods, techniques, microprocessors, and/or controllers described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. The instructions can reside in RAM memory, flash memory, ROM memory, EPROM memory, EEPROM memory, registers, hard disk, a removable disk, a CD-ROM, or any other form of a non-transitory computer-readable storage medium. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

The microprocessors and/or controllers described herein may implement the techniques described herein using customized hard-wired logic, one or more ASICs or FPGAs, firmware and/or program logic which causes microprocessors and/or controllers to be a special-purpose machine. According to one embodiment, parts of the techniques disclosed herein are performed in a controller in response to executing one or more sequences of instructions contained in a memory. Such instructions may be read into the memory from another storage medium, such as storage device. Execution of the sequences of instructions contained in the memory causes the processor or controller to perform the process steps described herein. In alternative embodiments, hard-wired circuitry may be used in place of or in combination with software instructions.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the techniques described herein may be implemented in analog circuitry or mixed analog and digital circuitry.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected," as generally used herein, refer to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a range of measurement error.

Although this disclosure contains certain embodiments and examples, it will be understood by those skilled in the art that the scope extends beyond the specifically disclosed embodiments to other alternative embodiments and/or uses and obvious modifications and equivalents thereof. In addition, while several variations of the embodiments have been shown and described in detail, other modifications will be readily apparent to those of skill in the art based upon this disclosure. It is also contemplated that various combinations or sub-combinations of the specific features and aspects of the embodiments may be made and still fall within the scope of this disclosure. It should be understood that various features and aspects of the disclosed embodiments can be combined with, or substituted for, one another in order to form varying modes of the embodiments. Any methods disclosed herein need not be performed in the order recited. Thus, it is intended that the scope should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Any headings used herein are for the convenience of the reader only and are not meant to limit the scope.

Further, while the devices, systems, and methods described herein may be susceptible to various modifications and alternative forms, specific examples thereof have been shown in the drawings and are herein described in detail. It should be understood, however, that the disclosure is not to be limited to the particular forms or methods disclosed, but, to the contrary, this disclosure covers all modifications, equivalents, and alternatives falling within the spirit and scope of the various implementations described. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including ambient temperature and pressure.

What is claimed is:

1. A power converter comprising:
an input configured to receive an input voltage;
an output configured to output an output voltage that is different than the input voltage;
a first inductor;
a second inductor;
a first power switch that is a high-side switch;
a second power switch that is a high-side switch;
a third power switch, wherein the second power switch and the third power switch are configured to control current through the second inductor;
a fourth power switch, wherein the first power switch and the fourth power switch are configured to control current through the first inductor;
a driver configured to operate the first, second, third, and fourth power switches to change the input voltage to provide the output voltage;
a first bootstrap capacitor coupled to the first power switch, wherein the first bootstrap capacitor charges during a state when the first power switch is off, and wherein the first bootstrap capacitor discharges during a state when the first power switch is on to provide an elevated voltage to maintain the first power switch on; and a second bootstrap capacitor coupled to the second power switch, wherein the second bootstrap capacitor charges during a state when the second power switch is off, and wherein the second bootstrap capacitor discharges during a state when the second power switch is on to provide an elevated voltage to maintain the second power switch on;

wherein the driver is configured to provide:
a first state of operation wherein:
the first power switch is on;
the second power switch is off;
the third power switch is on; and
the fourth power switch is off;
a second state of operation wherein:
the first power switch is off;
the second power switch is off;
the third power switch is on; and
the fourth power switch is on;
a third state of operation wherein:
the first power switch is off;
the second power switch is on;
the third power switch is off; and
the fourth power switch is on; and
a fourth state of operation wherein:
the first power switch is off;
the second power switch is off;
the third power switch is on; and
the fourth power switch is on.

2. The power converter of claim 1, further comprising one or more switches that have:
a first configuration that couples the first bootstrap capacitor to ground so that the first bootstrap capacitor charges; and
a second configuration that couples the first bootstrap capacitor to the first power switch so that the first bootstrap capacitor discharges to maintain the first power switch on.

3. The power converter of claim 1, further comprising:
a first switch electrically coupled between the first bootstrap capacitor and ground;
a second switch electrically coupled between a voltage source and the first bootstrap capacitor; and
a third switch electrically coupled between the first bootstrap capacitor and a source terminal of the first power switch;
wherein the first switch and the second switch are on while the third switch is off in a first configuration so that the first bootstrap capacitor is coupled between the voltage source and ground so that the first bootstrap capacitor charges; and
wherein the first switch and the second switch are off while the third switch is on in a second configuration so that the first bootstrap capacitor discharges to provide an elevated voltage to keep the first power switch on.

4. The power converter of claim 1, further comprising:
a first switch electrically coupled between the first bootstrap capacitor and ground;
a second switch electrically coupled to the first bootstrap capacitor;
wherein the first switch is on while the second switch is off in a first configuration so that the first bootstrap capacitor is coupled between a voltage source and ground so that the first bootstrap capacitor charges; and wherein the first switch is off while the second switch is on in a second configuration so that the first bootstrap capacitor provides an elevated voltage to keep the first power switch on.

5. The power converter of claim 1, wherein the first bootstrap capacitor and the second bootstrap capacitor are coupled so that the second bootstrap capacitor charges the first bootstrap capacitor in the state when the second power switch is on.

6. The power converter of claim 5, where the first bootstrap capacitor is electrically coupled to a source terminal of the first power switch all the time.

7. The power converter of claim 1, wherein the first bootstrap capacitor is integrated into the same integrated circuit as the first power switch and the driver.

8. The power converter of claim 1, wherein the first power switch and the second power switch are N-channel FETs.

9. The power converter of claim 1, wherein the power converter is a buck converter configured so that the output voltage at the output that is lower than the input voltage at the input.

10. The power converter of claim 1, further comprising an AC coupling capacitor that is coupled between the first power switch and the first inductor.

11. The power converter of claim 1, comprising:
a printed circuit board (PCB) comprising:
a lower printed circuit board (PCB) part; and
an upper printed circuit board (PCB) part;
embedded circuitry that is between the lower PCB part and the upper PCB part, the embedded circuitry comprising:
the first power switch;
the second power switch;
the third power switch;
the fourth power switch; and
the driver.

12. The power converter of claim 11, wherein the first inductor and the second inductor are positioned over the upper PCB part, wherein vias electrically couple the first inductor and the second inductor to the embedded circuitry, wherein a footprint of the first inductor at least partially overlaps a footprint of the embedded circuitry, and wherein a footprint of the second inductor at least partially overlaps a footprint of the embedded circuitry.

13. A power converter comprising:
an input configured to receive an input voltage;
an output configured to output an output voltage that is different than the input voltage;
a first inductor;
a second inductor;
a first power switch that is a high-side switch;
a second power switch that is a high-side switch;
a third power switch, wherein the second power switch and the third power switch are configured to control current through the second inductor;
a fourth power switch, wherein the first power switch and the fourth power switch are configured to control current through the first inductor;
a driver configured to operate the first, second, third, and fourth power switches to change the input voltage to provide the output voltage;
a first bootstrap capacitor coupled to the first power switch, wherein the first bootstrap capacitor charges during a state when the first power switch is off, and wherein the first bootstrap capacitor discharges during a state when the first power switch is on to provide an elevated voltage to maintain the first power switch on;

a second bootstrap capacitor coupled to the second power switch, wherein the second bootstrap capacitor charges during a state when the second power switch is off, and wherein the second bootstrap capacitor discharges during a state when the second power switch is on to provide an elevated voltage to maintain the second power switch on;
a first switch electrically coupled between the first bootstrap capacitor and ground;
a second switch electrically coupled between a voltage source and the first bootstrap capacitor; and
a third switch electrically coupled between the first bootstrap capacitor and a source terminal of the first power switch;
wherein the first switch and the second switch are on while the third switch is off in a first configuration so that the first bootstrap capacitor is coupled between the voltage source and ground so that the first bootstrap capacitor charges; and
wherein the first switch and the second switch are off while the third switch is on in a second configuration so that the first bootstrap capacitor discharges to provide an elevated voltage to keep the first power switch on.

14. The power converter of claim 13, wherein the first power switch and the second power switch are N-channel FETs.

15. The power converter of claim 13, wherein the power converter is a buck converter configured so that the output voltage at the output that is lower than the input voltage at the input.

16. The power converter of claim 13, further comprising an AC coupling capacitor that is coupled between the first power switch and the first inductor.

17. The power converter of claim 13, comprising:
a printed circuit board (PCB) comprising:
a lower printed circuit board (PCB) part; and
an upper printed circuit board (PCB) part;
embedded circuitry that is between the lower PCB part and the upper PCB part, the embedded circuitry comprising:
the first power switch;
the second power switch;
the third power switch;
the fourth power switch; and
the driver.

18. The power converter of claim 17, wherein the first inductor and the second inductor are positioned over the upper PCB part, wherein vias electrically couple the first inductor and the second inductor to the embedded circuitry, wherein a footprint of the first inductor at least partially overlaps a footprint of the embedded circuitry, and wherein a footprint of the second inductor at least partially overlaps a footprint of the embedded circuitry.

19. A power converter comprising:
an input configured to receive an input voltage;
an output configured to output an output voltage that is different than the input voltage;
a first inductor;
a second inductor;
a first power switch that is a high-side switch;
a second power switch that is a high-side switch;
a third power switch, wherein the second power switch and the third power switch are configured to control current through the second inductor;
a fourth power switch, wherein the first power switch and the fourth power switch are configured to control current through the first inductor;
a driver configured to operate the first, second, third, and fourth power switches to change the input voltage to provide the output voltage;
a first bootstrap capacitor coupled to the first power switch, wherein the first bootstrap capacitor charges during a state when the first power switch is off, and wherein the first bootstrap capacitor discharges during a state when the first power switch is on to provide an elevated voltage to maintain the first power switch on;
a second bootstrap capacitor coupled to the second power switch, wherein the second bootstrap capacitor charges during a state when the second power switch is off, and wherein the second bootstrap capacitor discharges during a state when the second power switch is on to provide an elevated voltage to maintain the second power switch on;
a printed circuit board (PCB) comprising:
a lower printed circuit board (PCB) part; and
an upper printed circuit board (PCB) part; and
embedded circuitry that is between the lower PCB part and the upper PCB part, the embedded circuitry comprising:
the first power switch;
the second power switch;
the third power switch;
the fourth power switch; and
the driver;
wherein the first inductor and the second inductor are positioned over the upper PCB part, wherein vias electrically couple the first inductor and the second inductor to the embedded circuitry, wherein a footprint of the first inductor at least partially overlaps a footprint of the embedded circuitry, and wherein a footprint of the second inductor at least partially overlaps a footprint of the embedded circuitry.

20. The power converter of claim 19, further comprising one or more switches that have:
a first configuration that couples the first bootstrap capacitor to ground so that the first bootstrap capacitor charges; and
a second configuration that couples the first bootstrap capacitor to the first power switch so that the first bootstrap capacitor discharges to maintain the first power switch on.

21. The power converter of claim 19, further comprising:
a first switch electrically coupled between the first bootstrap capacitor and ground; and
a second switch electrically coupled to the first bootstrap capacitor;
wherein the first switch is on while the second switch is off in a first configuration so that the first bootstrap capacitor is coupled between a voltage source and ground so that the first bootstrap capacitor charges; and
wherein the first switch is off while the second switch is on in a second configuration so that the first bootstrap capacitor provides an elevated voltage to keep the first power switch on.

22. The power converter of claim 19, wherein the first bootstrap capacitor and the second bootstrap capacitor are coupled so that the second bootstrap capacitor charges the first bootstrap capacitor in the state when the second power switch is on.

23. The power converter of claim 22, where the first bootstrap capacitor is electrically coupled to a source terminal of the first power switch all the time.

24. The power converter of claim 19, wherein the first bootstrap capacitor is integrated into the same integrated circuit as the first power switch and the driver.

25. The power converter of claim 19, wherein the first power switch and the second power switch are N-channel FETs.

26. The power converter of claim 19, wherein the power converter is a buck converter configured so that the output voltage at the output that is lower than the input voltage at the input.

27. The power converter of claim 19, further comprising an AC coupling capacitor that is coupled between the first power switch and the first inductor.

* * * * *